US012387858B2

(12) United States Patent
Johansen et al.

(10) Patent No.: US 12,387,858 B2
(45) Date of Patent: *Aug. 12, 2025

(54) SYSTEM AND METHOD FOR FORMING WIRE AND CABLE

(71) Applicants: DAIKIN INDUSTRIES, LTD., Osaka (JP); DAIKIN AMERICA, INC., Orangeburg, NY (US)

(72) Inventors: Nicholas Johansen, Decatur, AL (US); Kenjiro Tanimoto, Osaka (JP)

(73) Assignees: DAIKIN INDUSTRIES, LTD., Osaka (JP); DAIKIN AMERICA, INC., Orangeburg, NY (US)

( * ) Notice: Subject to any disclaimer, the term of this patent is extended or adjusted under 35 U.S.C. 154(b) by 553 days.

This patent is subject to a terminal disclaimer.

(21) Appl. No.: 17/343,323

(22) Filed: Jun. 9, 2021

(65) Prior Publication Data

US 2021/0398716 A1 Dec. 23, 2021

Related U.S. Application Data

(60) Provisional application No. 63/041,878, filed on Jun. 20, 2020.

(51) Int. Cl.

| | |
|---|---|
| ***H01B 11/02*** | (2006.01) |
| ***H01B 13/00*** | (2006.01) |
| ***H01B 13/02*** | (2006.01) |

(52) U.S. Cl.

CPC ......... *H01B 13/0036* (2013.01); *H01B 11/02* (2013.01); *H01B 13/0207* (2013.01); *H01B 13/0285* (2013.01)

(58) Field of Classification Search

None

See application file for complete search history.

(56) References Cited

U.S. PATENT DOCUMENTS

| | | | | |
|---|---|---|---|---|
| 4,329,539 | A * | 5/1982 | Tanaka | H10N 60/80 72/286 |
| 5,539,851 | A * | 7/1996 | Taylor | G02B 6/4416 385/101 |
| 6,064,008 | A | 5/2000 | Craton | |
| 6,139,957 | A | 10/2000 | Craton | |

(Continued)

FOREIGN PATENT DOCUMENTS

| | | | |
|---|---|---|---|
| CN | 103606409 | A | 2/2014 |
| EP | 1 998 341 | A1 | 12/2008 |

(Continued)

OTHER PUBLICATIONS

Influence of cryogenic cooling rate on mechanical properties of tool steels. (Year: 2017).*

(Continued)

*Primary Examiner* — Farah Taufiq

(74) *Attorney, Agent, or Firm* — Sughrue Mion, PLLC

(57) ABSTRACT

A system and method for manufacturing wire and cable products with a polymer cable component is provided. The systems and methods include increasing the hardness of a polymer cable component in order to reduce compression and deformation of the cable components during manufacturing. In some instances, the hardness is temporarily increased prior to or during the process of creating twisted pair or during the cabling process.

6 Claims, 23 Drawing Sheets

(56) References Cited

U.S. PATENT DOCUMENTS

| | | | |
|---|---|---|---|
| 9,390,842 B2 | 7/2016 | Hayashishita et al. | |
| 10,026,522 B1 | 7/2018 | Gebs | |
| 2001/0000930 A1 | 5/2001 | Kim | |
| 2003/0150638 A1 | 8/2003 | Patel | |
| 2008/0066947 A1 | 3/2008 | Glew | |
| 2008/0073105 A1 | 3/2008 | Clark et al. | |
| 2008/0264671 A1 | 10/2008 | Kenny et al. | |
| 2009/0069480 A1 | 3/2009 | Zangara et al. | |
| 2009/0229852 A1 | 9/2009 | Thuot et al. | |
| 2010/0181012 A1 | 7/2010 | Hiel et al. | |
| 2012/0261158 A1 | 10/2012 | Daniel et al. | |
| 2016/0053596 A1* | 2/2016 | Rey | E21B 43/26 166/302 |
| 2017/0178763 A1 | 6/2017 | Nilsson et al. | |
| 2018/0154616 A1* | 6/2018 | Ogura | G06F 3/0445 |
| 2018/0155568 A1* | 6/2018 | Katagiri | H01B 1/22 |
| 2018/0301245 A1 | 10/2018 | Glew | |
| 2019/0237217 A1 | 8/2019 | Shroll et al. | |
| 2019/0279785 A1 | 9/2019 | Wiekhorst et al. | |
| 2019/0333658 A1* | 10/2019 | Yamazaki | H01B 13/0036 |
| 2019/0341174 A1* | 11/2019 | Smith | H01B 12/16 |
| 2020/0185123 A1* | 6/2020 | Jung | C08K 9/04 |
| 2020/0185213 A1* | 6/2020 | Jung | H01K 1/58 |

FOREIGN PATENT DOCUMENTS

| | | |
|---|---|---|
| EP | 2 908 145 A1 | 8/2015 |
| JP | 5-159634 A | 6/1993 |
| WO | 2008/133846 A1 | 11/2008 |
| WO | 2014/057565 A1 | 4/2014 |
| WO | 2019/208401 A1 | 10/2019 |

OTHER PUBLICATIONS

Hardness and Temperature of polymer (Year: 2020).*

Composite Material (Year: 2020).*

Office Action issued Jun. 22, 2023 in U.S. Appl. No. 17/946,616.

Ehtasham Mustafa, et al., "Investigation of Electrical and Mechanical Properties of Low Voltage Power Cables under Thermal Stress", IEEE, International Conference on Diagnostics in Electrical Engineering (Diagnostika), Pilsen, Czech Republic, 2020, pp. 1-4 (4 pages).

International Search Report dated Nov. 15, 2021 in International Application No. PCT/US21/36595.

International Preliminary Report on Patentability dated Dec. 13, 2022 with the Written Opinion of the International Searching Authority in related Application No. PCT/US2021/036595.

Notice of Allowance issued Oct. 20, 2023 in U.S. Appl. No. 17/946,616.

Corrected Notice of Allowability issued Nov. 6, 2023 in U.S. Appl. No. 17/946,616.

Extended European Search Report issued May 29, 2024 by European Patent Office in European Application No. 21826204.6.

* cited by examiner

SYSTEM AND METHOD FOR FORMING WIRE AND CABLE

CROSS-REFERENCE TO RELATED APPLICATION

This application claims the benefit of U.S. Provisional Patent Application No. 63/041,878, filed Jun. 20, 2020, which is incorporated by reference herein in its entirety.

FIELD OF THE DISCLOSURE

This disclosure relates to creating communications cables, and more specifically to modulating the hardness of polymer cable components to create high performance communications cables with reduced crush ratios.

BACKGROUND

When transmitting power or signals, various avenues can be utilized. The inventions disclosed herein generally focus on wire and cable products which utilized insulated coated conductors to transmit electrical current.

In designing wire and cable products, many factors must be considered. Applications such as ethernet, CATV, and factory-floor based systems can dictate certain design features such as the size, electrical properties, and physical attributes. In the case of size, it can be important the cable fits in standard connectivity, tubing, raceways, and conduit. For electrical properties, capacitance, inductance, DC resistance, current, and voltage carrying capacity can be design considerations. For certain specialized high bandwidth cables, additional electrical parameters such as attenuation, velocity of propagation, delay skew, impedance, insertion loss, and noise mitigation may be important. For physical attributes, resistance to flame and smoke, chemical resistance, ozone resistance, moisture resistance, and/or pull strength are common attributes to consider. Fortunately, there are many tools and equations available to assist the design engineer when considering the best options to construct wire and cable products.

The process for making wire and cable is typically continuous in nature. Continuous manufacturing lines typically include a pay-out where a material is paid-out or dispensed to initiate the line process. There may be an accumulator which helps to reserve a portion of the material being paid out to facilitate consistent line speeds. There is typically a take-up at the end of the line which may also have an accumulator so that the manufactured product can be made at a consistent line speed and the finished product can be taken up onto rolls or other forms of packaging. These types of operations can include insulating, twinning, cabling, braiding, jacketing, and putting up wire and cable products into set lengths, among others. For most wire and cable products, the first step is the insulating process. This is where the conductor is coated or covered with a polymer material to electrically insulate the conductor.

During and after the insulating process, forces will likely be encountered that can impact the ability of the end product to meet the intended specification. For instance, in the case of coaxial type cables, it is desirable to add a foil and/or metal braid to protect the inner insulation layer and the electrical signal contained within. It is well known that metal braiding equipment can create indentations along the surface of the insulator it is encasing. In other words, the bare strands of braided shielding wire will deform the surface of the insulator below as the insulator surface is often softer than the metal wire being applied onto it. These deformations in the insulation can impact the ability of the final cable to transmit a signal as capacitance and insertion losses increase. To account for these depressions, a design engineer may add extra insulation material to account for the impression depth.

In the case of a multi-conductor cable, various insulated conductors are brought together through a twisting mechanism, often referred to as a twinner, buncher, or cabler. The forces encountered in each of these mechanisms can compress and deform the polymer components of a cable. Again, the cable designer is likely to add insulation to compensate for any compression, thus increasing size and cost of the end product. Similar compression forces may be experienced during the jacketing and the put-up operations. To compensate for any deformation caused by the compression forces thicker and/or stiffer jacketing layers may be used, which adds both size and cost to the final product.

Sometimes adverse or compressive forces acting upon a cable component can be cyclical in nature. For instance, if a wheel is not properly aligned, it may wobble back and forth as it transverses in a circular rotation. This can create a sinusoidal deformation of material. If this sinusoidal pattern matches the intended frequency of an application (or any harmonic thereof), signal integrity can be compromised. Existing methods to help reduce the impact of such forces, whether consistent or sinusoidal in nature include reducing manufacturing line speed. Speed can be reduced to alleviate and reduce compression forces caused by manufacturing equipment as the product is made. It is common for equipment to run at a fraction of its potential speed for this reason. This is not desirable however, as the equipment cannot be utilized to its full potential.

Another way in which compressive forces can potentially create problems is with capacitive targets. Capacitance is a function of the distance between metal surfaces, and the characteristics of the materials between those metal surfaces. In the case of wire and cable, a conductive surface can include, among other things, two conductors in close proximity or a shield and a conductor in close proximity. The distance between these conductive surfaces is a key design consideration in making a wire and cable product. So care is taken to insure the proper conductor to conductor distance is achieved.

In some embodiments, two insulated conductors are formed together to create a twisted pair. Similarly, many insulated conductors may be formed together to create a multi-conductor cabled unit. In the case of two insulated conductors twisted together, a helical pattern is achieved along the length of the twisted pair unit. A twisted pair unit typically consists of metal conductors, insulation material, and air which is contained in the interstices of the two generally circular insulated conductors. It is well known that air is a highly desirable dielectric material. For instance, air has a dielectric of 1.0, where materials such as polyolefin has a typical dielectric range between 2.3 and 2.6. So, the more air preserved within the interstices of the twisted pair unit, the more desirable the electrical result. However, as compression forces encountered during the cabling process bring these insulated conductors closer together, the insulation material can be displaced into these interstices, thus reducing the total air content. The result can be a higher, generally less desirable, capacitance, and in some cases a reduced signal velocity which can reduce a signal's ability to propagate.

Insulated conductors, such as twisted pair communications cables, is used for high frequency signal transmission, typically in plenum areas of buildings. In twisted pair data cable embodiments, an individual conductive wire is insulated using a polymer and then two such insulated conductors are twisted around each other to form a single twisted pair. Twisted pair cable is typically composed of multiple twisted pairs contained within a single outer jacket to form a cable. Each twisted pair within a cable may be twisted at a different lay (conventionally measured in mm/turn) to reduce electrical coupling between adjacent twisted pairs (i.e. crosstalk).

The process of twisting individual insulated conductors together often compresses the polymer insulation layers. The magnitude of the force compressing the insulation layers varies with twisting equipment and the tightness of the twist, (i.e., the number of turns per inch). The compression force caused by twisting the insulated conductors results in a deformation of the insulating layer and a decrease in the thickness of the insulation layers separating the two conductors. This results in an increased capacitance measured between the two conductive wires, thus lowering the overall impedance of the twisted pair unit.

It also should be mentioned that in the case of torsional forces (a type or force encountered when insulated conductors are twisted together) deformation may not be uniform. This is because insulation may be displaced disproportionally depending on the direction of the torsional force. This is especially undesirable in balanced pair applications. For example, in some applications involving a twisted pair unit with two insulated conductors, it is desirable that the signal in each of the two insulated conductors be a mirror image of the other. In this way, electrical noise which couples with each insulated conductor of the twisted unit couples in the same way, thereby allowing electronic filtering mechanisms to cancel the noise element out. When the shape of one insulated conductor in a pair is disproportional, it becomes challenging to subtract any noise elements from the desired signal. Often specifications for wire and cable products have both near end and far end crosstalk specifications to ensure the amount of noise between transmitting pairs will be low enough not to hinder signal transmission. If insulated conductors are not well balanced, the ability of meeting these specifications can become more difficult.

When a cable designer considers how much additional insulation material is needed to offset any insulation displacement or deformation that results from forces encountered during the manufacturing process, the softness of the insulation material must be understood. Since these are displacements and deformations that are generally permanent in nature, it is most appropriate to understand the hardness of the compound. Hardness, often expressed in Pascal's, measures a material's resistance to surface deformation. In other words, hardness is resistance to localized surface deformation. Indentation hardness can be measured in various methods including Britnell, Meyer, Vickers, Rockwell, and/or Shore Durometer. For polymer materials such as, for example, Fluorinated Ethylene Propylene (FEP), Polyethylene (PE), Polypropylene (PP), Polyether ether ketone (PEEK), Polyether ketone ketone (PEKK), polyvinylchloride (PVC), etc., the Shore D hardness scale is commonly used. For other materials such as rubbers, other Shore scales can be used, such as Shore A. In the case of Shore D, the testing protocol is defined in ASTM D2240 and/or ISO 868, and will be used as a baseline hardness reference herein.

It is understood that changes in ambient temperature conditions can impact the softness of materials. For instance, in warm weather climates, temperature control of a manufacturing floor can be necessary during months in which ambient temperatures are seasonally high, thereby reducing the hardness of any polymer materials on the manufacturing floor. Additionally, when a cable component is subjected to compression, torsion, or other deforming forces, heat is generated within the cable component. In some applications, the forces involved increase the temperature of the component above ambient temperature as it is deformed, thereby reducing the hardness of the component and increasing its susceptibility to deformation at that deformation event as well as any subsequent deformation events.

Conversely, if compounds are cooled below ambient temperature, the hardness of a compound can be increased. This hardening can make the material more resistant to compressive forces which can deform or cause indentations in a material.

It is not necessary for the temperature adjustment to last beyond a compressive event. Since the deformations discussed herein are permanent in nature (i.e. not elastic), the disclosed method need only apply prior to, or during the compressive event. Once the compressive event is over, the material may be allowed to return to ambient temperature. Other methods described previously are more permanent in nature (such as slowing a machine, adding a skin layer, or adding harder materials to an insulation). By utilizing a temporary adjustment in material hardness, many adverse impacts of these solutions can be avoided.

It is desirable in the industry to have a method of hardening a compound or reducing the compression forces applied that costs less than adding insulation to counter the effect of deforming a polymer cable component. It is also desirable that any method incorporated to reduce the impact of compression forces upon the insulation can fit within a current machinery footprint with little to no modification in the positioning of the equipment itself. One such method is to control the temperature of a compound to create a shift in the hardness of the compound. It is understood that a harder compound will be less impacted a compression force than a softer compound. When using the Shore D scale, higher numbers indicate a harder state of the compound. This assumes the same material type, where the only change is the temperature of the material itself.

As explained previously, reducing the deformation caused by forces encountered during the manufacturing process can improve performance and reduce cost. By shifting a materials hardness via a temporary temperature change, both can be achieved.

By increasing the hardness of a polymer cable components, the deformation of a polymer insulation layer, cross web filler, polymer tube, or other polymer cable component can be reduced. This deformation is typically caused by compression or torsion forces during manufacturing operations such as, twisting, braiding, mechanical devices such as sheaves (wheels) and take ups.

What is needed is a cost-effective way to increase the harness of a material. What is needed is a method to cool an insulation material at or near the point at which a compression force is applied. In this way, the hardness of the material can be increased relative to what it would be at ambient temperature and any deformation caused by compression forces can be reduced.

SUMMARY

This disclosure relates generally to the creation of wire and cable products incorporating a method to temporarily alter a material's hardness and/or Young's modulus.

Some disclosed embodiments relate to methods and devices for raising the hardness and/or Young's modulus of a polymer insulation that may be used in-line as part of a continuous or semi-continuous manufacturing process. Some disclosed embodiments relate to methods of reducing the impact of a compressive force on a polymer cable component comprising, providing a polymer cable component with a first hardness, wherein the first hardness is the hardness of the polymer cable component under ambient conditions; temporarily changing the hardness of the polymer cable component to a second hardness, wherein the second hardness is different than the first hardness; subjecting the polymer cable component to a compressive force; and allowing the polymer cable component to return to the first hardness.

Some disclosed embodiments relate to methods for forming twisted pairs comprising providing a first polymer insulated conductor comprising a first conductor electrically insulated by a first polymer insulation layer and a second polymer insulated conductor comprising second conductor electrically insulated by a second polymer insulation layer; exposing the first insulated conductors to a cryogenic fluid; and twisting the first and second polymer insulated conductors around each other to form a twisted pair.

In some embodiments a polymer cable component, such as a polymer insulated conductor is exposed to a chilled fluid for different periods of time in order to adjust the hardness of the polymer cable component. In some embodiments a polymer cable component, such as a polymer insulated conductor is exposed to a chilled fluid for different periods of time in order to create a cable with a reduced delay skew.

Some disclosed embodiments relate to methods of manufacturing communications cables to reduce deformation of a polymer cable component and preserver the roundness of the insulated conductors and other cable components.

Some disclosed embodiments relate to the equipment of a system for manufacturing wire and cable products with improved electrical properties. Some of these embodiments relate to a cooling vessel and/or secondary structure for retaining a cooling medium such as, for example, a chilled fluid or a chilled solid surface.

Some disclosed embodiments relate to methods of manufacturing communications cables with reduced fuel load. Some of these embodiments relate to methods of forming wire and cable products with less total polymer insulation relative to traditional cables such that the cables with less total polymer insulation have a lower total fuel load and improved flammability and/or smoking characteristics.

Some disclosed embodiments relate to methods of manufacturing communications cables at faster speed. Some of these embodiments relate to operating a twinning apparatus at faster speed, which typically increases the compression forces on the polymer insulation layer. Some of these embodiments relate to hardening the polymer insulation prior to twinning so that the twinner can be run at faster speeds and produce cables with a tolerable amount of deformation and the desired electrical properties.

The disclosed inventions may be applied to any form of polymer cable component or cable construction including, for examples, solid, foam, profile extrusion, insulation layers, hollow tubes, cross-webs, rod fillers, films, tapes, coaxial constructions involving a braiding process, and/or multi-layered insulation.

In addition to reducing the deformation of insulation layers as insulated wires are twisted into twisted pairs, the disclosed invention may be used to reduce the deformation of any polymer material that is exposed to compressive forces such as, for example, braid impressions or mechanical systems such as take ups, sheaves, or wheels.

The above presents a simplified summary in order to provide a basic understanding of some aspects of the claimed subject matter. This summary is not an extensive overview. It is not intended to identify key or critical elements or to delineate the scope of the claimed subject matter. Its sole purpose is to present some concepts in a simplified form as a prelude to the more detailed description that is presented later.

BRIEF DESCRIPTION OF THE DRAWINGS

The accompanying drawings incorporated in and forming a part of this specification illustrate several aspects of the disclosure, and together with the description serve to explain the principles of the disclosure.

DETAILED DESCRIPTION

Figure 1:
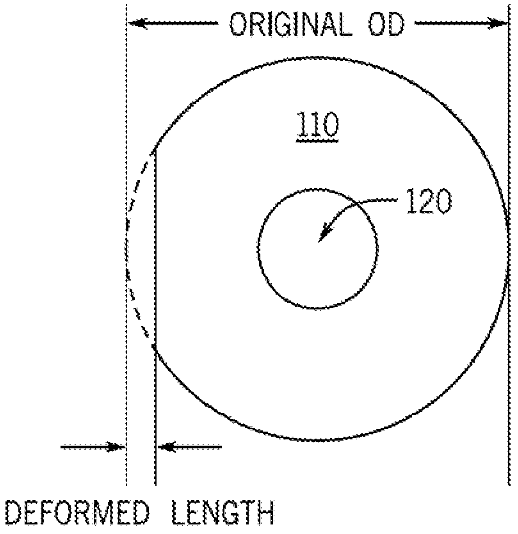
FIG. 1 illustrates a schematic cross section view of an embodiment of an insulated conductor in accordance with this disclosure.

The embodiments set forth below represent the necessary information to enable those skilled in the art to practice the disclosure and illustrate the best mode of practicing the disclosure. Upon reading the following description in light of the accompanying drawings, those skilled in the art will understand the concepts of the disclosure and will recognize applications of these concepts not particularly addressed herein. It should be understood that these concepts and applications fall within the scope of the disclosure and the accompanying claims.

Unless otherwise defined, all terms (including technical and scientific terms) used herein have the same meaning as commonly understood by one of ordinary skill in the art of this disclosure. It will be further understood that terms, such as those defined in commonly used dictionaries, should be interpreted as having a meaning that is consistent with their meaning in the context of the specification and should not be interpreted in an idealized or overly formal sense unless expressly so defined herein. Well known functions or constructions may not be described in detail for brevity or clarity.

The terms "about" and "approximately" shall generally mean an acceptable degree of error or variation for the quantity measured given the nature or precision of the measurements. Typical, exemplary degrees of error or variation are within 20 percent (%), preferably within 10%, and more preferably within 5% of a given value or range of values. Numerical quantities given in this description are approximate unless stated otherwise, meaning that the term "about" or "approximately" can be inferred when not expressly stated. Numerical quantities in the claims are exact unless stated otherwise.

It will be understood that when a feature or element is referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments.

The terminology used herein is for the purpose of describing particular embodiments only and is not intended to be limiting. As used herein, the singular forms "a", "an" and "the" are intended to include the plural forms as well, unless the context clearly indicates otherwise.

The terms "first", "second", and the like are used herein to describe various features or elements, but these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the present disclosure.

Terms such as "at least one of A and B" should be understood to mean "only A, only B, or both A and B." The same construction should be applied to longer lists (e.g., "at least one of A, B, and C").

The term "consisting essentially of" means that, in addition to the recited elements, what is claimed may also contain other elements (steps, structures, ingredients, components, etc.) that do not adversely affect the operability of what is claimed for its intended purpose as stated in this disclosure. This term excludes such other elements that adversely affect the operability of what is claimed for its intended purpose as stated in this disclosure, even if such other elements might enhance the operability of what is claimed for some other purpose.

In some places reference is made to standard methods, such as but not limited to methods of measurement. It is to be understood that such standards are revised from time to time, and unless explicitly stated otherwise reference to such standard in this disclosure must be interpreted to refer to the most recent published standard as of the time of filing.

This disclosure describes embodiments of a method and system for creating wire and cable products with improved electrical performance and/or improved manufacturing characteristics. While the disclosed invention is generally discussed in the context of twinning polymer insulated wires to form a twisted pair, it will be appreciated that the disclosed invention is adaptable to many applications beyond the twinning of insulated conductors including, for example, polymer insulation layers, foamed insulation layers, foam skins, cross webs, polymer tape, hollow tubes, rod fillers, jacketing, and other polymer cable components.

When polymer cable components, such as insulated conductors are subjected to a compression force, such as when twinning wires to form a twisted pair, the polymer component can be compressed or otherwise deformed. For polymer insulation layers, this deformation can disrupt the conductor to conductor spacing of the conductive wires and impact the electrical performance of the wires or resulting cable.

FIG. 1 schematically illustrates a cross section of an insulated wire with a polymer insulation layer 110 around a conductor 120. When an insulated wire is subjected to forces, the insulation layer 110 may be deformed. The degree to which the insulation layer 110 is deformed may be described by the crush ratio. The crush ratio is defined as the Deformed Length/Original OD*100 and expressed as a percentage.

Figure 2A:
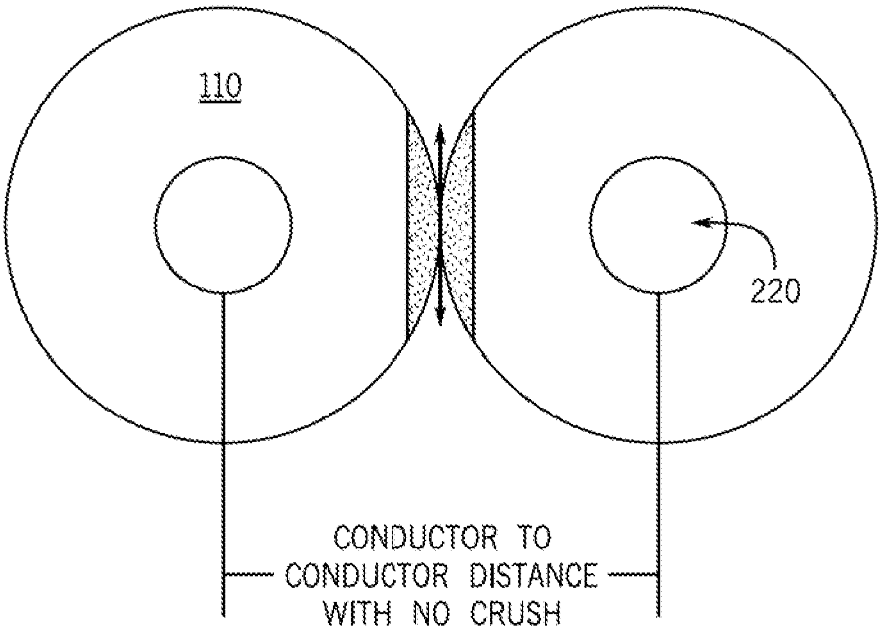
FIGS. 2A and 2B illustrate schematic cross section views of embodiments of a twisted pair.

FIG. 2A schematically illustrates a cross section of two insulated wires, each with a polymer insulation layer 210 around a conductor 220. FIG. 2A shows the two insulated wires in contact with each other and with the circular polymer insulation layers not deformed. The shaded area of the polymer insulation layers 210 in FIG. 2A shows the area that is deformed by compression forces when the two wires are twinned together.

Figure 2B:
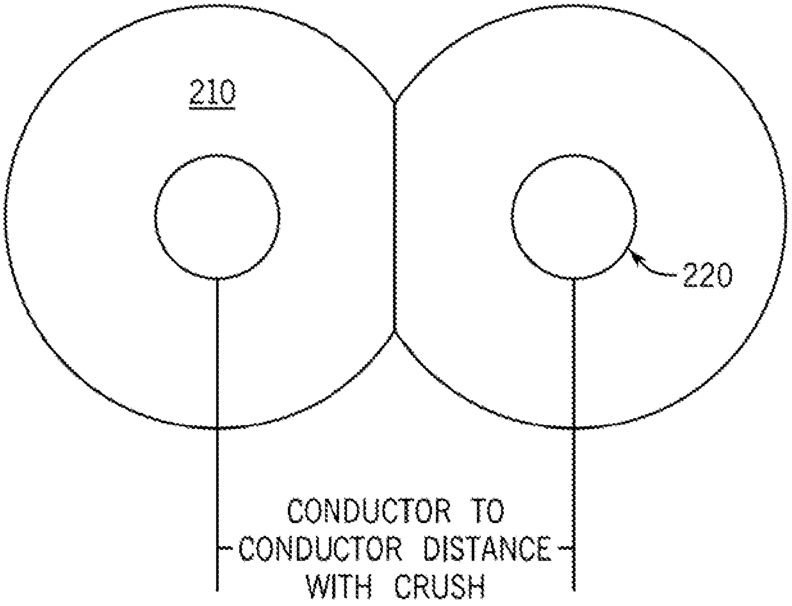

FIG. 2B schematically illustrates a cross section of two insulated wires, each with a polymer insulation layer 210 around a conductor 220. FIG. 2B shows the two wires in contact with each other after compression forces have caused a deformation in the polymer insulation layers.

Comparing the conductor to conductor distance of the crushed wires in FIG. 2B to the uncrushed wires in FIG. 2A shows that the distance between the two conductors is reduced by the deformation of the two insulation layers. This type of compression can occur when the wires are twinned together or during other compressive events. This decrease in conductor to conductor distance has a negative impact on the electrical performance of the twinned wires and any resulting cables.

The forces applied to a polymer cable component are dependent on the type and manufacturer of equipment utilized by any particular wire and cable company. For instance, there are many different types of cabling machines. Each of those machines will exhibit unique forces against the various elements being cabled. When wire and cable manufacturers determine how much additional insulation to incorporate into a design to offset deformation, it is largely experience, coupled with the knowledge of the harness of a material, that will ultimately determine how much added insulation will be needed.

Within the industry, the term "wall thickness" is used to capture how much insulation and/or jacketing material is needed to produce the desired product. Most application designs will have an absolute minimum wall thickness, an average minimum wall thickness, a nominal wall thickness, and an absolute maximum wall thickness. When compensating for deformation and depressions in the insulation layers, nominal wall thickness is typically considered.

The softer the insulation material, typically the greater the amount of additional wall thickness necessary to compensate for the wall thickness lost to compression under a given set of conditions. As an example, FEP is a softer insulation that HDPE or PP, and will require a greater amount of additional insulation. Understanding the hardness of an insulation material is useful in determining the amount of compensation needed. If the amount of deformation is better controlled, the amount of additional insulation needed can be reduced. This will help with both the size and cost of the final product. In some embodiments, the amount of additional insulation added to produce the desired cable is reduced by at least about 0.0005 inches, or at least about 0.001 inches, at least about 0.003 inches, at least about 0.005 inches, at least about 0.01 inches relative to a cable produced under the same conditions but without using the cooling techniques described herein.

Softer insulation polymers such as fluorinated ethylene propylene (FEP) are more likely to have increased deformation when a force is applied to the insulation layer relative to insulation layers made with harder polymers. Foam insulation layers may also be more susceptible to deformation than solid polymers.

The resistance to deformation of an insulation layer can generally be measured or described in terms of the hardness of the insulation material. As discussed, hardness is a measure of the resistance to localized plastic deformation induced by mechanical indentation or abrasion. In general, different materials differ in their hardness. In some embodiments, Young's modulus may impact the degree of deformation that occurs as a result of compression force. The Young's modulus is a mechanical property that measures the stiffness of a solid material in the elastic region, rather than the plastic region. It defines the relationship between stress (force per unit area) and strain (deformation) in a material. The higher the Young's modulus, the less a material will elastically deform under the same force.

One way to increase the hardness and the Young's modulus of a polymer insulation layer is to cool the polymer material. This cooling can be accomplished by any reasonable method such as, for example, exposing the material directly or indirectly to a chilled fluid such as a chilled liquid or gas. In some embodiments, a polymer cable component can be exposed to chilled water or aqueous solution. In some embodiments, a polymer cable component can be exposed to a cryogenic fluid, such as liquid nitrogen. In some embodiments, a polymer cable component can be exposed to a chilled gas or vapor. In some embodiments, a polymer cable component can be exposed to one or a plurality of chilled wheels, rollers, tubes, or other solid surfaces. In some embodiments, a polymer cable component may be cooled indirectly. For example, a polymer cable component may pass through the interior of a tube while the exterior of the tube is being cooled. The atmosphere within the tube will be chilled and thereby, cool the polymer cable component. The inventions described herein are generally described in the context of a cryogenic fluid, but it will be appreciated that any of these methods may also or alternatively be used.

In some circumstances, the time required to cool the entire thickness of a polymer insulation layer may be impractical. In one embodiment, the disclosed invention cools the outer surface of an insulation layer without cooling the interior bulk of the insulation layer to the same degree. In some embodiments, cooling only the outer portion of the insulation layer helps to reduce the total deformation of the insulation layer as the outer surface is typically the portion of the insulation layer that is most subjected to compression forces during manufacturing.

Figure 3:
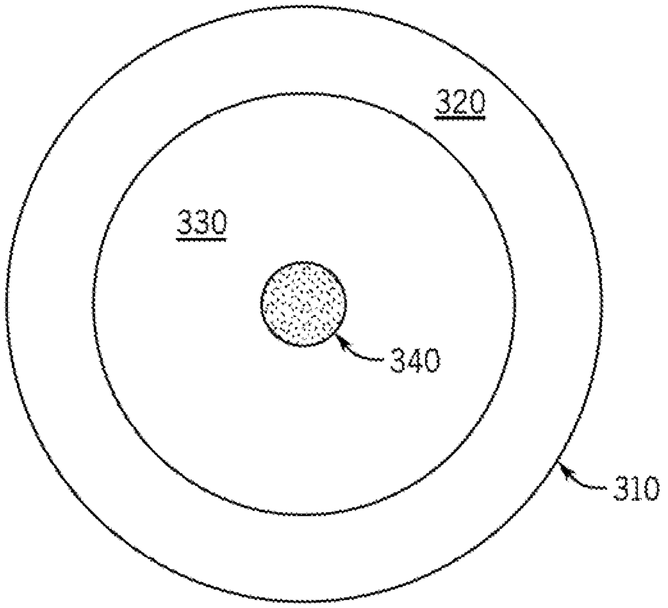
FIG. 3 illustrates a schematic cross section view of an embodiment of an insulated conductor in accordance with this disclosure.

FIG. 3 schematically illustrates a cross section of an insulated wire with a polymer insulation layer around a conductor 340. The insulation layer of the embodiment depicted in FIG. 3 is a single homogeneous polymer layer, however FIG. 3 shows the homogeneous insulation layer as being divided into discrete concentric portions for clarity. The exterior surface 310 of the polymer insulation layer is generally exposed to the outside environment and is subjected to any outside compression forces first. The outer portion 320 of the insulation layer is immediately under the exterior surface. The interior bulk of the insulation layer 330 surrounds the conductor 340 and is the least subject to external compression forces because the exterior surface 310 and outer portion 320 of the insulation layer must both be deformed before impacting the interior bulk 330.

When a polymer insulated wire is exposed to a chilled liquid or a cryogenic fluid, such as, for example, liquid nitrogen, the exterior surface 310 cools rapidly as it is in direct contact with the cryogenic fluid. The outer portion 320 of the insulation layer will be cooled next as heat is pulled out of the insulation layer and into the cryogenic fluid. The speed at which the outer portion of the insulation layer cools will vary based on the thermal conductivity of the polymer material forming the insulation layer. The interior bulk 330 of the insulation layer will cool after the exterior surface and the outer portion. It will be appreciated that a temperature gradient, rather than a sharp line, will be formed separating the outer portion 320 from the interior bulk 330.

As the exterior surface and outer portion of the insulation layer are cooled, the hardness of these portions of the insulation layer will be increased. In some embodiments, this creates a hardened "skin" on the outer portions of the insulation layer which surround the comparatively higher temperature interior bulk of the insulation layer.

If the insulation layer is kept in contact with a cryogenic fluid long enough, eventually, the entire bulk of the insulation layer will be cooled, and the hardness of the entire insulation layer will increase. However, wire and cable manufacturing facilities generally produce cable at a relatively high speed. In order to cool the entire thickness of an insulation layer while the cable is moving at a relatively high speed, the length of cooling equipment may need to be longer than is desirable for certain applications. By using embodiments of the disclosed invention, the length of the necessary cooling equipment may be reduced, and the deformation of the insulation layer may be minimized. By creating a hardened skin within the homogeneous polymer insulation layer, the crush ratio can be reduced when insulated wires are twinned together or when polymer insulated wire is exposed to other outside compression forces.

It will be appreciated that when a polymer insulated conductor is removed from the cryogenic fluid or other cooling medium and exposed to ambient atmosphere, the polymer insulation will begin returning to ambient temperature. As the temperature increases, the hardness of the polymer insulation decreases, and the polymer insulation will become more susceptible to being deformed by a compression force. In some embodiments of the disclosed inventions, a polymer insulation layer or layers are cooled shortly before being subject to a compression event such as, for example, twinning to form a twisted pair. In some applications, the speed at which an insulated conductor is moving and the distance between a cooling vessel and twinner take-up will determine the time that a polymer insulated conductor is exposed to ambient atmosphere after being cooled, but before being subjected to a compression force. In some embodiments, the end of the cooling vessel is less than 10 feet from the point at which the polymer insulated conductor is subjected to a subsequent compressive force. In some embodiments, the end of the cooling vessel is less than 8 feet, 6 feet, 4 feet, or 2 feet away from the point at which the polymer insulated conductor is subjected to a subsequent compressive force.

It will be understood that the harness of a given material is dependent on the temperature of that material. Accordingly, as the temperature of a given material increases and decreases, the hardness decreases and increases respectively. In some embodiments, a material will be cooled, thereby raising the hardness, shortly before a compressive force and then be allowed to return to ambient temperature. Increasing the hardness at the time of the compressive force can help the material to resist deformation by the compressive force even though the hardness is only increased temporarily.

It will be appreciated that the disclosed inventions do not require a change to the composition of the polymer insulation material. The composition of the polymer insulation layer remains unchanged while the polymer insulation is cooled, thereby increasing its hardness. The composition of the polymer insulation layer remains unchanged as the insulation is subjected to any compression or deformation forces and as the polymer insulation is allowed to return to ambient temperature, thereby reducing its hardness.

In some embodiments, a conductor may be insulated by more than one layer of insulation. In some embodiments, a conductor may be insulated by, for example, a polymer foam layer and also a solid polymer layer. In some embodiments, multiple layers of polymer insulation may be made of different polymers. In some embodiments, multiple layers of polymer insulation may be made of the same polymer. Each layer of insulation may be a different thickness than any other insulation layer or may be about the same thickness.

It will be appreciated that thicker polymer insulation layers may require more time to reach a higher hardness relative to a thinner polymer insulation layer because the temperature gradient will need to propagate into the bulk of a thicker polymer insulation layer. In some embodiments, the exposure time for which an insulated conductor is exposed to a cryogenic fluid may be adjusted based on the thickness of a polymer insulation layer.

In some embodiments, some of each of the conductors of multiple twisted pairs contained within a single cable may be exposed to cryogenic fluids for different amounts of time. By controlling the amount of time a conductor is exposed to a cryogenic fluid, the degree of crush and the resulting electrical properties of a twisted pair can be modulated.

In some embodiment, by increasing the hardness of a polymer insulated conductor, the conductor will retain a generally circular cross-section rather than being deformed by a compressive force. This can reduce the amount of surface-to-surface contact between two polymer insulated conductors and reduce friction or torsion forces between the insulated conductors.

In some embodiments, a polymer insulated conductor or other polymer cable component is cooled to increase the hardness prior to being subject to a compressive force. In some embodiments, the reduced temperature of the polymer cable component offsets any heat generated within the polymer cable component by the compressive force. In some embodiments, the temperature of the polymer cable component during or immediately following a compressive event is equal to or less than the ambient temperature.

In some embodiments, the disclosed invention can be utilized for twinning polymer insulated wires to form a twisted pair. Twisted pair wiring is made by twisting two polymer insulated wires around each other, typically using a machine called a twinner. The process of twinning wires to form a twisted pair creates a compressive force between the two wires at the point at which they contact one another. This compressive force increases as the pitch or twist rate of the twisted pair increases.

The purpose of twinning wires to form twisted pairs is to improve the electromagnetic compatibility of the wires. Twisted pair wiring reduces electromagnetic radiation from the pair and reduces crosstalk and electromagnetic interference between neighboring twisted pairs relative to untwisted wires. One twisted pair can be used to form a single pair ethernet cable, or multiple twisted pairs can be combined to form various other forms of cabling, including ethernet cabling. It is desirable that each insulated conductor of a twisted pair be a mirror of the other insulated conductor in the twisted pair. When the two insulated conductors in a twisted pair are mirrors of each other, this achieves improved noise cancellation between the insulated conductors and creates a balanced pair system. Often, the insulation layers around the conductors contained within a twisted pair are impacted differently by compression forces. This can cause differences between the two insulated conductors and lead to an imbalance resulting in reduced noise cancellation, an undesirable outcome for the final product.

In one embodiment, prior to feeding polymer insulated wires into a twinning machine, the insulated wire is passed through a cooling vessel. In some embodiments, the cooling vessel exposes the insulated wires to a cryogenic fluid, thereby increasing the hardness of at least the exterior surface of the polymer insulation layer. In some embodiments, the cooling vessel contains a pool of cryogenic fluid such as, for example, liquid nitrogen. In some embodiments, the cooling vessel contains a spray of cryogenic fluid. It will be appreciated that the cooling vessel may be used to expose any polymer cable component to any form of cooling medium. For clarity, the disclosed inventions will be described in the context of a cryogenic fluid however chilled air or any other gas or vapor could be used as well as chilled water or any other chilled liquid or chilled solid surfaces.

Figure 4A:
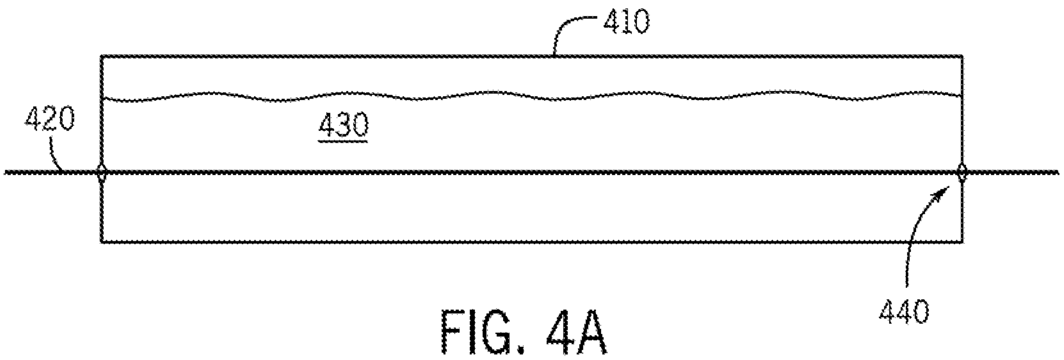
FIGS. 4 A-C illustrate schematic views of embodiments of a cooling vessel in accordance with this disclosure.

FIG. 4A shows a schematic of a cooling vessel 410 according to one embodiment. As shown in FIG. 4A, an insulated wire 420 may enter the cooling vessel 410 through a hole 440 in the cooling vessel below the surface of the cryogenic fluid 430, thereby submerging the insulated wire in a pool of cryogenic fluid 430. The cooled insulated wire 420 may exit the cooling vessel 410 through a similar hole 440 in the side of the cooling vessel. In some embodiments, a flexible gasket, membrane, or valve may be used to limit the flow of cryogenic fluid out of the cooling vessel.

Figure 4B:
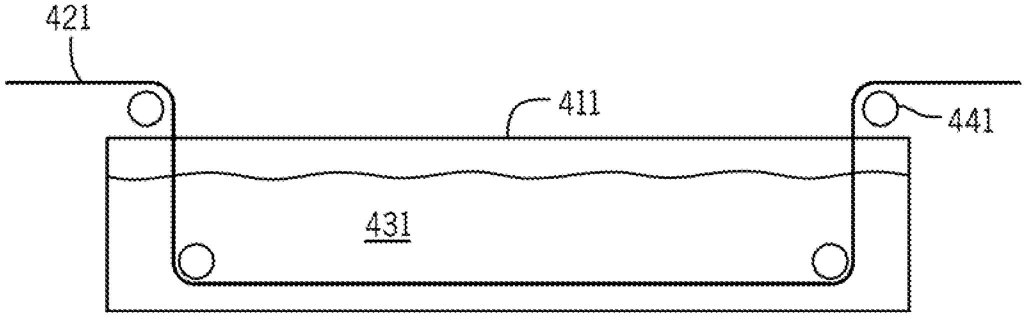

FIG. 4B shows another schematic of a cooling vessel 411 according to one embodiment. In some embodiments, the insulated wire 421 is routed downward into a pool of cryogenic fluid 431 using a wheel, roller, or wire guide 441. This allows the cooling vessel to maintain a pool of liquid without leaking. In some embodiments, the cooling vessel includes a top or lid (not shown) with a hole that allows the wire to enter the cooling vessel and reduces the total loss of cryogenic fluid due to evaporation or dissipation.

Figure 4C:
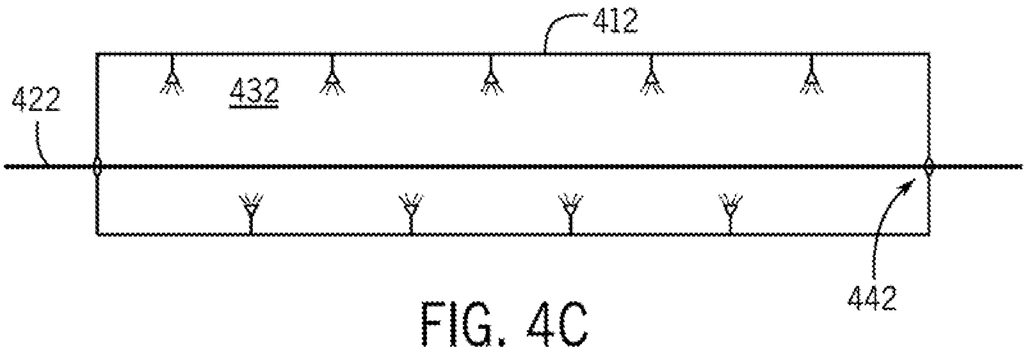

FIG. 4C shows another schematic of a cooling vessel 412 according to one embodiment. In some embodiments, the cooling vessel 412 is equipped with one or more nozzles 432 that spray cryogenic fluid or another chilled liquid or gas onto the insulated wire 422. In some embodiments, the insulated wire 422 does not physically contact the cooling vessel or associated equipment, thereby avoiding any compressive forces prior to cooling. In some embodiments, the insulated wire enters and exits the cooling chamber through a small hole 442 to be sprayed with cryogenic fluid. As there is no standing pool of cryogenic liquid in some nozzle embodiments, the loss of cryogenic fluid is less of a concern.

It will be appreciated that some embodiments include combinations of the above described cooling vessels. In some embodiments, multiple cooling vessels may be used in series in order to achieve a specific desired effect. In some embodiments, a single cooling chamber may have one, or two, or multiple insulated conductors passing through the cooling chamber simultaneously. In some embodiments, a single cooling chamber may be used to cool two wires to be formed into a single twisted pair. In some embodiments, a single cooling chamber may be used to cool a plurality of insulated wires that may be used to form a plurality of twisted pairs.

In some embodiments, the cooling vessel may be at least about 2 feet long or about 4 feet long, or about 6 feet long, or about 10 feet long, or about 15 feet long. In some embodiments, the cooling vessel is at most about 20 feet long, or about 15 feet long, or about 10 feet long, or about 8 feet long, or about 6 feet long. In some embodiments, one or more sheaves, wheels, capstans, and/or rollers may be used within the cooling vessel to redirect the path of a polymer cable component within the cooling vessel. This arrangement can allow a polymer cable component to remain within the cooling vessel for a longer period of time without increasing the length of the cooling vessel or slowing the line speed of the component. In some embodiments, a polymer cable component enters a cooling vessel in an upper vapor region of the vessel, where evaporated cryogenic vapor has risen above a cryogenic liquid, and is subsequently redirected to pass through the liquid region of the vessel where liquid cryogenic fluid remain. This arrangement allows the polymer cable component to initially transfer heat to the cryogenic vapor before contacting the cryogenic liquid, thereby reducing the total thermal load being transferred to the cryogenic liquid and increasing the total residence time of the polymer cable component within the cooling vessel.

The length of time that an insulated wire is exposed to the cryogenic fluid will depend on the length of the cooling vessel and the speed at which the insulated wire is traveling. In some embodiments, the wire is exposed to the cryogenic fluid for at least about 1 seconds, or at least about 2 seconds, or at least about 4 seconds, or at least about 6 seconds, or at least about 8 seconds, or at least about 10 seconds. In some embodiments, the wire is exposed to the cryogenic fluid for at most about 30 seconds, or at most about 20 seconds, or at most about 10 seconds, or at most about 8 seconds, or at most about 6 seconds, or at most about 4 seconds.

In some embodiments, after exiting a cooling vessel, the insulated wire enters a twinner where it is twisted around a second cooled insulated wire to form a twisted pair with less deformation of the two insulating layers. In some embodiments, an insulated wire enters a twinner within about 1 second of exiting a cooling vessel or within about 2 seconds, or within about 4 seconds of exiting a cooling vessel. In some embodiments, the cooling vessel is positioned relative to a twinner or other device that exerts compression forces on the insulated wire such that the polymer insulated wire experiences the compression force before the increased hardness of the polymer insulated wire is reduced by more than about 10% or reduced by more than about 20%, or reduced by more than about 30%. In other words, in some embodiments, the cooling vessel is positioned so that a polymer insulated wire exiting the cooling vessel experiences any subsequent compression force before the polymer insulated wire warms up significantly, thereby reducing its hardness.

Figure 5A:
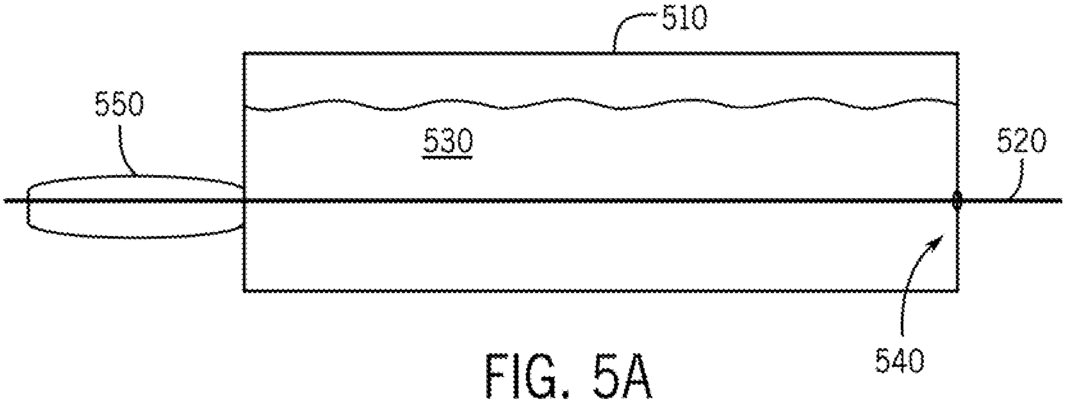
FIGS. 5A and 5B illustrate schematic views of embodiments of a cooling vessel with a secondary structure in accordance with this disclosure.

In some embodiments, one or multiple secondary structures may be positioned to maintain a colder than ambient temperature atmosphere around a polymer insulated conductor after it exits the cooling chamber. FIG. 5A illustrates one example of a cooling vessel 510 with a secondary structure 550 positioned around the polymer insulated conductor 520 as it leaves the cooling vessel. In some embodiments, the secondary structure 550 is a hollow tube arranged to maintain a chilled atmosphere around a polymer insulated wire before the wire is subject to a compression force as part of the twinning process. Secondary structure 550 could be made of any thermally conductive material including, for example, metal and/or polymer. In some embodiments, the secondary structure 550 may be a larger tube, arranged to surround multiple wires as they exit the cooling chamber in order to maintain an increased hardness prior to the wires being subjected to any compression or deformation forces. In some embodiments, the secondary structure 550 may be a tube with an adjustable length that can be extended and/or retracted in order to adjust the residence time of a polymer cable component within the tube. In some embodiments, the secondary structure includes a removable or openable portion such as a top or lid. In such embodiments, the secondary structure may be opened to allow for initial treading or lacing of a wire or cable line and then be closed in order to exclude the ambient atmosphere and retain a cooler than ambient atmosphere within the secondary structure.

In some embodiments, the secondary structure is arranged to receive a cryogenic fluid from the cooling vessel. In one example, the secondary structure may be arranged to receive cold nitrogen vapor from an evaporating pool of liquid nitrogen contained within the cooling vessel. By maintaining a cooler than ambient temperature atmosphere around the wires leaving the cooling vessel, the secondary structure may help maintain an increased hardness as the wires travel from the cooling vessel to a twinner or other subsequent step that involves a compression force. In some embodiments, any cryogenic fluid that leaks out of the cooling vessel is received by the secondary structure. In the case of cryogenic liquids, the cryogenic liquid that is received by the secondary structure may evaporate within the secondary structure, thereby creating a chilled atmosphere within the secondary structure and preventing the leak of any cryogenic liquid onto the manufacturing floor.

In some embodiments, a secondary vessel may be connected to a cooling vessel, a twinner, or both. In some embodiments, the secondary structure may direct expanding or evaporating cryogenic vapor from the cooling vessel, through the secondary structure, and into a twinner. In such embodiments, the atmosphere within the twinner may be maintained at a lower temperature than the ambient atmosphere surrounding the twinner.

While the invention is generally described in the context of exposing a polymer cable component to a cryogenic fluid, it will be appreciated that other methods of cooling the polymer cable component, thereby raising its hardness may also be used.

In some embodiments a polymer cable component may be passed through the interior of a chilled tube. The exterior of the tube may be exposed to a cooling medium, such as a chilled or cryogenic fluid, thereby reducing the temperature of the tube itself. In such embodiments, the atmosphere within the chilled tube will be indirectly cooled by the chilled or cryogenic fluid as heat is drawn from the tube into the chilled or cryogenic fluid. The polymer cable component may be cooled by its exposure to the chilled atmosphere within the tube, thereby raising the hardness of the polymer cable component. In some embodiments, the tube may be only slightly larger than the polymer cable component passing through the tube. By reducing the distance between the interior surface of the tube and the polymer cable component the degree of cooling of the polymer cable component can be controlled. In some embodiments, the tube may have a removable lid or a hingedly attached lid that allowed the tube to be opened to facilitate the initial lacing of a polymer cable component through the tube. Once the tube is closed, the outside of the tube could be exposed to a chilled or cryogenic fluid in order to establish a cooled interior atmosphere within the tube. In some embodiments, the tube may be telescopic or use modular components to increase or decrease the length of the tube during continuous operations. In some embodiments, this allows an operator to adjust the total residence time of a polymer cable component within the cooled atmosphere of the tube without stopping production to change the tube, tube length, and/or or tube components.

Figure 5B:
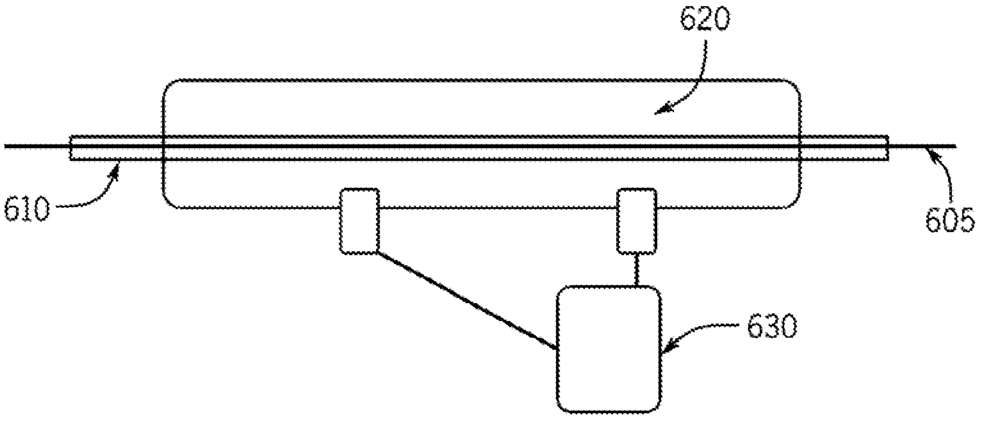

FIG. 5B schematically illustrates a chilled tube embodiment as described above. In the illustrated embodiments, tube 610 passes through a cooled material 620, thereby creating a chilled atmosphere within tube 610. A polymer cable component 605 passes through the chilled tube 610 and is exposed to the chilled atmosphere within tube 610. In the illustrated embodiments, a heat exchanger 630 may be used control the temperature of the cooled material 620. In some embodiments, the temperature of the cooled material 620 may be adjusted in response to the temperature of the atmosphere within tube 610. In some embodiments, the chilled material 620 may be a chilled liquid that is circulated around tube 610. If the atmosphere within the tube 610 increases beyond a desirable range, the chilled liquid may be circulated faster, or the temperature of the chilled liquid may be reduced until the temperature of the atmosphere within tube 610 is brought down to a desirable range.

In some embodiments, the chilled tube contains inlet holes or slits configured to allow a certain amount of the chilled material to travel into the interior of the tube. The size, shape, and number of these holes or slits may be arranged differently depending on the expected conditions. In some embodiments, the chilled material is a cryogenic liquid which is allowed to enter the tube through the holes or slits. This will reduce the temperature within the tube and also allow some direct contact between the polymer cable component and the cryogenic liquid. In some embodiments, the amount of cryogenic liquid that is allowed to enter the tube can be adjusted so that under operating conditions, all of the cryogenic liquid that enters the tube evaporates within the tube. This will prevent cryogenic liquid from leaking out of the cooling device and allow for faster and/or greater cooling of the polymer cable component.

In some embodiments, a chilled wheel, roller, or sheave may be used to increase the hardness of a polymer cable component. Wire and cable manufacturing is generally a continuous process involving a number or wheels, rollers, and/or sheaves for a variety of different purposes such as directing the process, controlling tension, and/or accumulating cabling components. When a polymer cable component contacts these wheels, at lease some compressive force is applied to the cable component. In some embodiments, a chilled or cryogenic fluid may be passed through the interior of a wheel, thereby cooling the wheel. As the solid surface of the wheel rotates, it can cool a polymer cable component in contact with the rotating surface without creating significant additional deformation forces. When the polymer cable component contacts the wheel, it will be cooled at least slightly and become harder as a result. In some embodiments, a series of chilled wheels, rollers, or sheaves can be used to increase the exposure time between the cable component and the chilled surface, thereby allowing the cable component to reach the desired degree of hardness before experiencing a subsequent compressive force.

In some embodiments, rather than using a liquid or solid cooling medium, chilled air or another chilled gas or vapor can be used to lower the temperature and increase the hardness of a polymer cable component. Seasonal variation in wire and cable manufacturing is a known phenomenon. During the warmer months, a manufacturing facility may have a higher ambient temperature. This can lead to an increase in temperature and a corresponding decrease in hardness of the polymer cable components being used in a particular facility. To address this seasonal variation, some manufacturing facilities utilize standard air conditioning to maintain a relatively constant temperature within the facility. However, increase electrical performance of the manufactured cables does not require maintaining a moderate temperature throughout the entire manufacturing facility.

In some embodiments, air conditioning equipment can be used to direct cold air directly into a twinner or into a cooling chamber surrounding a polymer cable component. By reducing the temperature of the atmosphere surrounding the polymer cable component, the hardness of the polymer can be increased shortly prior to, or during a compressive event. In some embodiments, air conditioning equipment can be used to generate air that is at a lower temperature than would be well tolerated throughout a manufacturing facility. In some embodiments, an air conditioning system may be configured to direct air that is less than about 60° F. onto a polymer cable component. In some embodiments, an air conditioning or refrigeration system may be configured to direct air that is less than about 50° F. or less than about 40° F., or less than about 30° F., or less than about 20° F., or less than about 10° F. or less than about 0° F. onto a polymer cable component. In some embodiments, an air conditioning or refrigeration system may be configured to direct air that is less than about 10° C. or less than about 5° C., or less than about 0° C., or less than about −5° C., or less than about −10° C. or less than about −15° C. onto a polymer cable component.

In some embodiments, a structure may be used to contain a colder than ambient atmosphere around a polymer cable component prior to or during a compressive event. In some embodiments, a chamber around a twinner take up device may be used to contain a colder than ambient atmosphere. It will be appreciated that specialized refrigeration equipment may be necessary to generate high volumes of very cold air for some applications. It will also be appreciated that cold air may be applied to a polymer cable component at any step in the manufacturing process where increasing the hardness would help reduce deformation due to a compressive force.

In one illustrative example, multiple twisted pairs of fluorinated ethylene propylene (FEP) insulated wire were created at a line speed of 19 m/minute or about 63 feet/minute. The twinner parameters were set to 3,000 twists per minute and a lay length of 6.2 mm. Prior to entering the twinner, the wires were passed through a cooling vessel and submerged in liquid nitrogen for varying lengths of time. The crush ratio of the resulting twisted pairs was examined using a computed tomography (CT) scan.

Table 1 below shows a table of data collected over three trials. Each trial includes four samples that were passed through a cooling vessel of varying lengths. The length of the cooling vessel was varied from zero feet (control) to 2 feet, 4 feet, and 6 feet. The twinning parameters, including line speed, described above were kept constant throughout all trials.

TABLE 1

Crush Ratios

| Length of | Trial 1 | | | Trial 2 | | | Trial 3 | | | Average |
|---|---|---|---|---|---|---|---|---|---|---|
| Cooling (ft.) | Initial OD | Crushed OD | Crush Ratio (%) | Initial OD | Crushed OD | Crush Ratio (%) | Initial OD | Crushed OD | Crush Ratio (%) | Crush Ratio (%) |
| 0 | 0.836 | 0.783 | 6.365 | 0.850 | 0.791 | 6.889 | 0.850 | 0.790 | 6.970 | 6.74 |
| 2 | 0.834 | 0.797 | 4.411 | 0.833 | 0.794 | 4.793 | 0.837 | 0.798 | 4.713 | 4.64 |
| 4 | 0.824 | 0.804 | 2.436 | 0.814 | 0.796 | 2.273 | 0.844 | 0.827 | 2.003 | 2.24 |
| 6 | 0.844 | 0.835 | 1.033 | 0.850 | 0.840 | 1.207 | 0.841 | 0.832 | 1.038 | 1.09 |

As can be seen from Table 1, the average crush ratio decreased with the increasing length of the cooling vessel. The line speed of 19 meters/minute is approximately 1 foot per second, so the length of the cooling vessel in feet is about equal to the time the insulated wire was exposed to liquid nitrogen measured in seconds.

Figure 6:
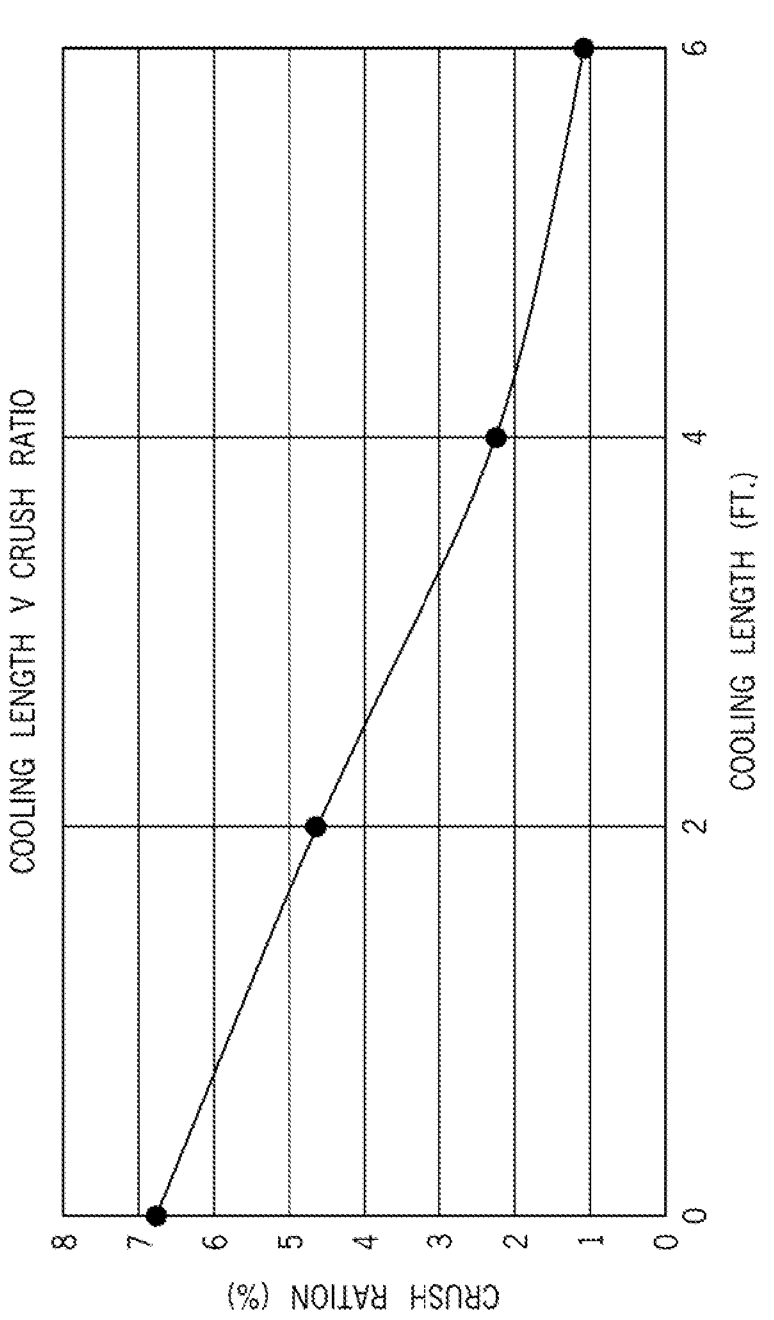
FIG. 6 shows a graph of crush ratio data.

FIG. 6 shows a graph of the data presented in Table 1. As can be seen by the graph of FIG. 6 and Table 1, the average crush ratio decreases from 6.74%, when the FEP insulated wire is not exposed to liquid nitrogen, to 1.09% when the FEP insulated wire is exposed to liquid nitrogen for about six seconds. This represents a decrease in the crush ratio of about 83% in about six seconds.

Table 2 (below) shows the surface temperature of samples of FEP insulated wire that was exposed to liquid nitrogen for varying lengths. The surface temperature was measured using a temperature probe as the FEP insulated wire was being twinned after passing through the cooling chamber. The twinning parameters, including line speed are consistent with the parameters described above.

TABLE 2

Surface Temperatures of FEP Insulated Wires

| Length of Cooling (ft.) | Surface Temperature (° C.) |
|---|---|
| 0 | 19.8 |
| 2 | −4.5 |
| 4 | −8 |
| 6 | −12 |

Figure 7:
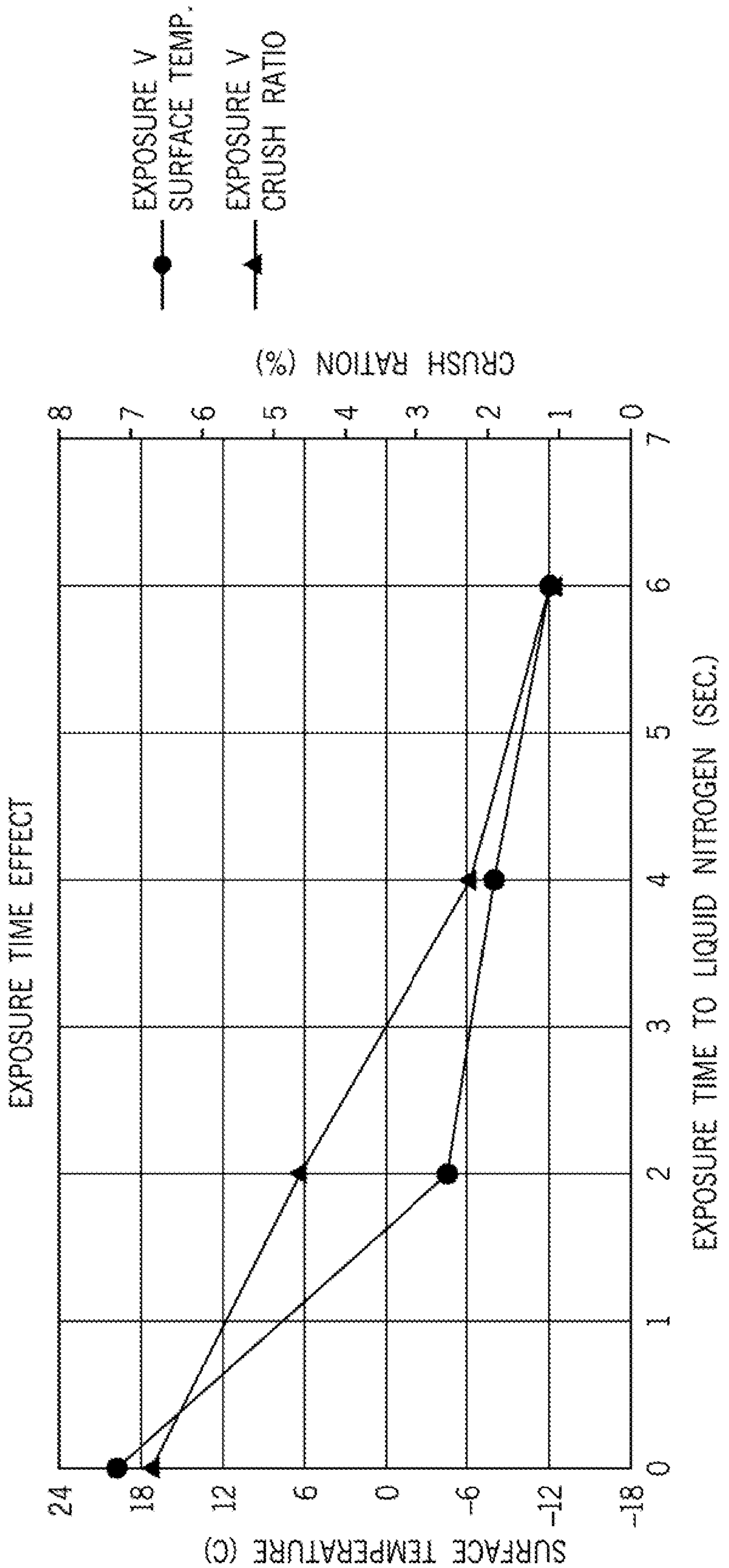
FIG. 7 shows a graph of surface temperature data and crush ratio data relative to exposure time.

FIG. 7 shows the data presented in both Table 1 and Table 2 presented on a single graph. As can be seen from FIG. 7, the surface temperature of the FEP coated wire drops significantly after about two seconds of exposure to liquid nitrogen and then continues to drop at a slower rate. The crush ratio of the FEP insulated wire drops after about two seconds of exposure to liquid nitrogen and continues to drop as the length of the cooling vessel and time the wire is exposed to liquid nitrogen increase.

The reduction in the surface temperature of the insulated wire as well as the corresponding decrease in the crush ratio show that it is not always necessary to expose the insulated wire to a cryogenic fluid for an extended period of time in order to reduce the crush ratio. In some embodiments, it is not necessary to reduce the temperature of the entire thickness of the insulation layer in order to dramatically reduce the crush ratio. The outer skin of the insulation layer can be cooled, thereby increasing the hardness of the outer portion of the insulation layer and decreasing the amount of crush created by twinning insulated wires.

Without being bound by theory, it is believed that the decreasing crush ratio is due to the increasing hardness of the outer portion of the FEP insulated wire. As the insulated wire is exposed to liquid nitrogen for a longer period of time, the thickness of the outer portion of the insulation layer with an increased hardness increases. As the wire is exposed to liquid nitrogen for a longer period of time, the degree of hardness increase at the outer surface of the polymer insulation layer may also increase.

By exposing a polymer insulated wire to liquid nitrogen, or another cryogenic fluid, for a brief time period, a skin of hardened polymer may be formed within the homogeneous polymer layer. This hardened layer of polymer reduces the deformation of the polymer insulation layer when the wire is exposed to outside forces. By reducing the deformation of the polymer insulation, the conductor to conductor distance can be maintained more consistently. In some embodiments, by using the disclosed methods, the total amount of polymer insulation used can be reduced while maintaining the same conductor to conductor distance. In some instances, reducing the deformation of the polymer insulation layer increases the electrical performance of the wire and resulting cables. Reducing the amount of deformation also aids in maintaining the shape of each insulated conductor which improves electrical consistency between the two insulated conductors of a twisted pair and maintains the balance of the twisted pair.

In some embodiments, the outer surface of the polymer insulation layer is reduced to less than 0° C. while the interior portion of the polymer insulation layer remains above about 5° C. In some embodiments, less than half of the thickness of the polymer insulation layer will have a temperature below about 5° C.

In some embodiments, the polymer insulation layer, or a portion of the polymer insulation layer, may be a foamed polymer. In such embodiments, the foamed polymer insulation includes many small pockets of air created during the manufacturing process. Air is known to be an excellent electrical insulator, therefore incorporating air pockets throughout the polymer insulation layer decreases the dielectric constant of the insulating layer. This is because the dielectric constant of air is 1.0, which is preferable to the dielectric constant of other materials such as FEP (2.0), polyethylene (2.3), and polyvinylchloride (3.5).

While air has excellent dielectric value, it provides no mechanical hardness. Therefore, foam materials or other polymers components that incorporate air will have a lower hardness than a similar component that does not incorporate air. Because air can be incorporated into a polymer cable component in any number of ways (small cells, large cells, cavities, etc.), ultimately strength will be reduced in accordance with the percentage of air substituted for solid polymer and the size of the air cavities utilized. In some embodiments, the methods for increasing hardness described herein are useful to increase the hardness of the remaining polymer material that is not substituted by air. As foamed polymer is more susceptible to deformation than solid polymer, the amount of additional material added to counteract the deformation may be increased. In some embodiments, the Shore D hardness of a foam polymer material is increased by at least about 10% relative to a similar material at 20° C. prior to or during a compressive event.

Figure 8:
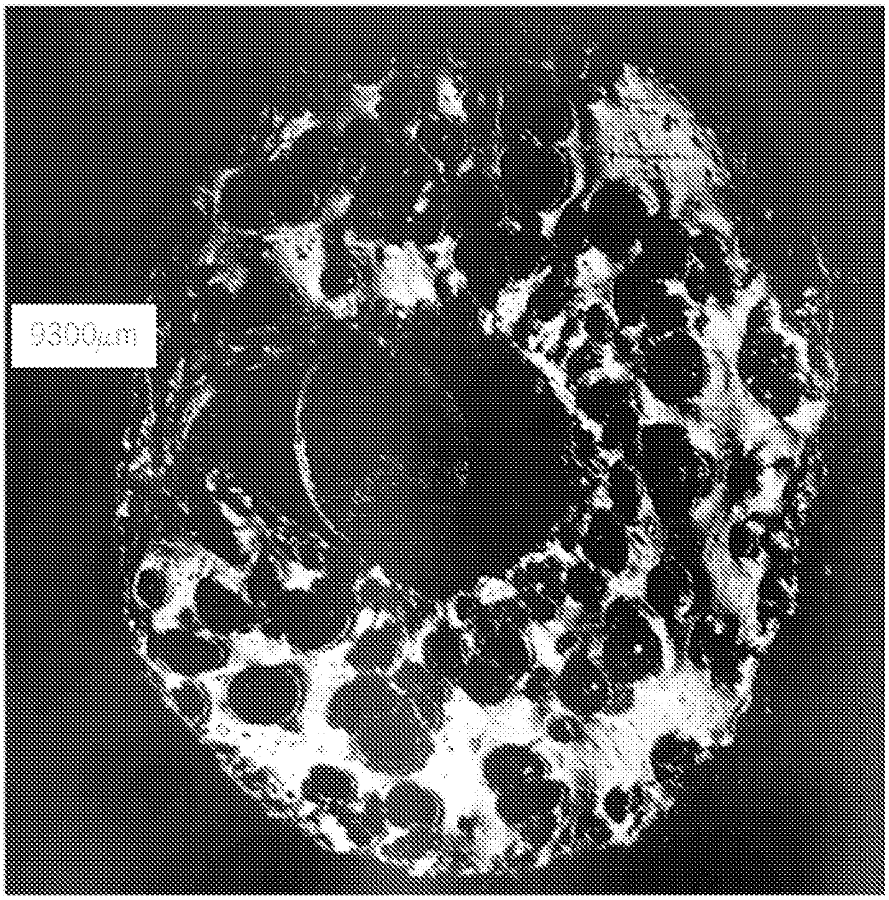
FIG. 8 shows a cross sectional image of a foam insulated conductor.

FIG. 8 shows a cross sectional image of a foam insulated conductor with several air pockets distributed throughout the insulation layer. It will be appreciated that these air pockets are closed and do not allow air, or any other fluids, to travel through the insulation layer.

In some examples, single wires insulated with foamed FEP (rather than solid FEP) were twinned on a Setic twinner and analyzed for crush ratio and electrical impedance. Samples of the foam FEP insulated wires were exposed to a cryogenic fluid for varying lengths of time. The samples that were exposed to a cryogenic fluid were compared with a sample of identical foam insulated wire that was not exposed to a cryogenic fluid.

In one example, a pair of twinned wires was used as a control and was not exposed to any cryogenic fluid while a similar pair of foam polymer insulated wires was exposed to a liquid nitrogen bath for 5.6 seconds before being twinned. The lay length of the twinned pairs made using both sets of wires was 8.5 mm. For this analysis, a six-inch sample of each of the two twinned pairs was imaged at three separate locations along its length using X-ray/CT.

As can be seen in Table 3 below, the average crush ratio of the foam insulated twinned wires decreased from an average 17.75%, when the wires were not exposed to liquid nitrogen, down to an average of 12.92% when the twinned wires were exposed to liquid nitrogen for 5.6 seconds. This represents a 27.21% improvement. The crush ratios analysis was performed using X-ray/CT. Table 3 shows the crush ratio data for each of three points on analysis in both the control and treated wires. The electrical impedance of the cryogenically cooled twisted pair also increased from 136 ohms to 146 ohms, an increase of 10 ohms or 7.4% relative to the control twisted pair.

TABLE 3

Crush Ratios of Foam Insulated Twinned Wires at 5.6 Seconds

| Exposed for 5.6 s | Initial OD (mm) | Twinned OD (mm) | Crush Raio (%) | Average Crush Ratio (%) |
|---|---|---|---|---|
| Control 1 | 1.6351 | 1.3225 | 19.12% | 17.75% |
| Control 2 | 1.6179 | 1.3098 | 19.04% | |
| Control 3 | 1.5165 | 1.2878 | 15.08% | |
| Cryo Fluid 1 | 1.3517 | 1.1838 | 12.42% | 12.92% |
| Cryo Fluid 2 | 1.5296 | 1.3154 | 14.00% | |
| Cryo Fluid 3 | 1.4874 | 1.3038 | 12.34% | |

In another example, a second pair of FEP foam insulated twinned wires was used as a control and was not exposed to any cryogenic fluid while a similar pair of wires was exposed to a liquid nitrogen bath for 9.1 seconds before being twinned. The lay length of the twinned pairs made using these wires was 8.5 mm. For this analysis as well, a six-inch sample of each of the twinned pairs was imaged at three separate locations along its length using X-ray/CT.

As can be seen in Table 4 below, the average crush ratio of the twinned wires decreased from an average 18.84% when the wires were not exposed to liquid nitrogen, down to an average of 9.74% when the wires were exposed to liquid nitrogen for 9.1 seconds. This represents a 48.3% improvement. The crush ratios analysis was performed using X-ray/CT. Table 4 shows the crush ratio data for each of three points on analysis in both the control and treated wires. The electrical impedance of the cryogenically cooled twisted pair also increased from 142 ohms to 154 ohms, an increase of 12 ohms or 8.5% relative to the control twisted pair.

TABLE 4

Crush Ratios of Foam Insulated Twinned Wires at 9.1 Seconds

| Exposed for 9.1 seconds | Initial OD (mm) | Twinned OD (mm) | Crush Raio (%) | Average Crush Ratio (%) |
|---|---|---|---|---|
| Control 1 | 1.485 | 1.159 | 21.95% | 18.84% |
| Control 2 | 1.499 | 1.238 | 17.41% | |

TABLE 4-continued

| Crush Ratios of Foam Insulated Twinned Wires at 9.1 Seconds | | | | |
|---|---|---|---|---|
| Exposed for 9.1 seconds | Initial OD (mm) | Twinned OD (mm) | Crush Raio (%) | Average Crush Ratio (%) |
| Control 3 | 1.644 | 1.362 | 17.15% | |
| Cryo Fluid 1 | 1.683 | 1.564 | 7.12% | 9.74% |
| Cryo Fluid 2 | 1.561 | 1.378 | 11.75% | |
| Cryo Fluid 3 | 1.760 | 1.578 | 10.34% | |

One of the benefits of the disclosed inventions is the ability to produce twisted pairs and/or other cable designs with improved electrical properties by increasing the hardness and reducing the amount of deformation produced during the twinning, cabling, and/or manufacturing process. One source of deformation of the insulation layers in a twisted pair is the twinning process in which two insulated conductors are twisted around each other. The degree of deformation that occurs during the twinning process is influenced by several factors including, for example, the lay length, wire tension, insulation material, hardness of the insulation, and/or amount of heat generated within the polymer insulation during the twinning process. In order to reduce the deformation as much as possible, it may be desirable to increase the hardness of the insulation material during the twinning process when the insulated conductors are subject to the greatest deformation forces. As discussed, one way to temporarily increase the hardness of the insulation layer is to reduce the temperature. In some embodiments, it is desirable to reduce the temperature of the insulation layer while the wires are being twinned.

In some examples, the relationship between exposure time to a cryogenic fluid, surface temperature, and crush ratio for both solid polymer and foam polymer insulated conductors was further explored. In the examples below, pairs of FEP insulated conductors were twinned together at a speed of 19 m/min after being exposed to a cryogenic fluid. The surface temperature of the insulation layer was measured by direct contact with a temperature probe that was placed at the first point of contact of the two insulated conductors.

Figure 9:
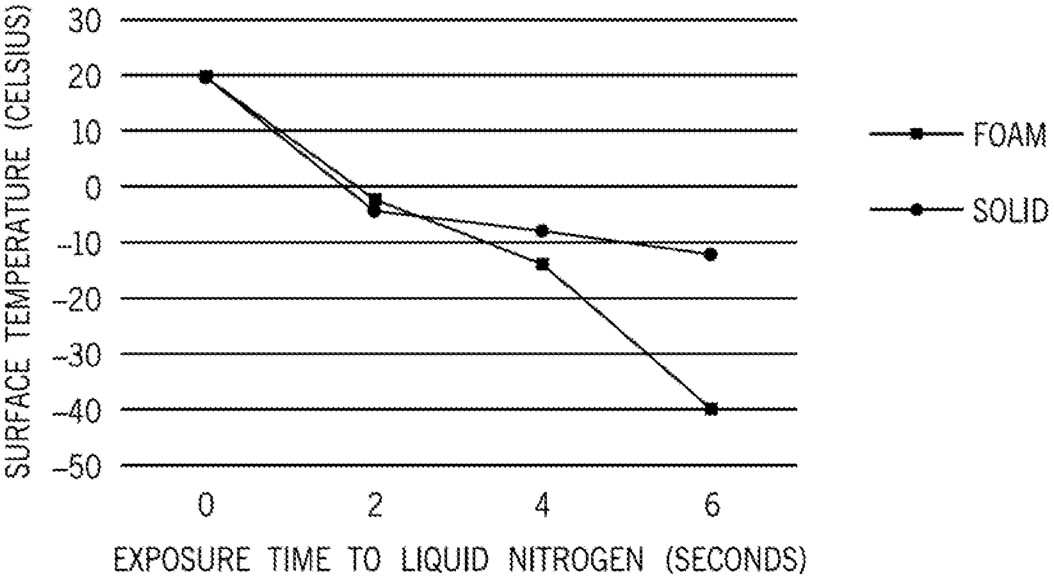
FIG. 9 shows a graph of surface temperature data for foam and solid polymer insulation relative to exposure time.

Both the foam FEP insulated and solid FEP insulated conductors were exposed to a cryogenic fluid (liquid nitrogen) for varying lengths of time and the surface temperature was measured. Table 5 shows the results of this example. FIG. 9 shows a graph of these results.

TABLE 5

| Surface Temperatures | | |
|---|---|---|
| Exposure Time (s) | Surface Temp of Solid Insulation (° C.) | Surface Temp of Foam Insulation (° C.) |
| 0 | 19.8 | 19.8 |
| 2 | −4.5 | −2.5 |
| 4 | −8 | −14 |
| 6 | −12 | −40 |

Table 5 and FIG. 9 show a significant difference in the surface temperature of the foam and solid polymer insulated conductors even when exposed to cryogenic fluid for the same amount of time. After a six second exposure to liquid nitrogen, the foam insulated conductor maintained a surface temperature well below the solid polymer insulated conductor.

The surface temperature of the insulated conductors was measured about one second after the conductors had been removed from the liquid nitrogen. Without being bound by theory, it is believed that the surface of the solid polymer insulation warms up faster than the surface of the foam insulation layer. The foam insulation layer contains a number of enclosed air pockets. It is possible the air entrapped within these air pockets cools while the foam insulated wire is immersed in liquid nitrogen and then the cooled air slows the warming of the surrounding insulation layer. In other words, the chilled air pockets within the foam insulation layer may help to maintain a lower surface temperature of the foam insulation layer compared to the solid polymer insulation layer. Over time, both the solid polymer insulation layer and the foam insulation layer will warm up to ambient temperature, but the foam insulation layer may maintain a significantly colder temperature for a longer period of time.

In some embodiments, a cable is made without significantly deforming the polymer cable components incorporated in the cable. Many polymer cable components have a generally circular cross section with many about equal diameters. Similarly, generally circular cross section of many polymer cable components will have many radii that are all about equal to each other before the cable is compressed or deformed. To be clear, before the polymer cable component is compressed or deformed, the radii with the maximum length is about equal to the radius with the minimum length. While there is some natural deviation in the wall thickness of a polymer cable component, the maximum and minimum radii are generally within 3% of each other. In some polymer cable components, the initial maximum and minimum radii may be within 5% or each other prior to being compressed or deformed.

In some embodiments, the generally circular cross section of a polymer cable component is preserved after the polymer cable component is subjected to a compressor or deformation force. By increasing the hardness of the polymer cable component as described herein, the polymer component may be less deformed, thereby maintaining its generally circular cross section. In some embodiments, after the polymer cable component is subjected to a compressive force, the maximum and minimum length radii are within about 10% of each other. In some embodiments, the maximum and minimum length radii are within about 8% or about 5% of each other. In some embodiments, the maximum and minimum length radii are within about 15% or about 12% of each other. It will be appreciated that the closer to equal the maximum and minimum length radii are to each other, the closer to circular the cross section is and generally the less deformed the polymer cable component.

In some embodiments, by increasing the hardness of the polymer cable component by cooling the cable component for about 10 seconds or less, the polymer component may be less deformed after being subjected to a compressor or deformation force. In some embodiments, after the polymer cable component is subjected to a compressive force, the maximum and minimum length diameters are within about 10% of each other. In some embodiments, the maximum and minimum length diameters are within about 8% or about 5% of each other. In some embodiments, the maximum and minimum length diameters are within about 15% or about 12% of each other. It will be appreciated that the closer to equal the maximum and minimum length diameters are to each other, the closer to circular the cross section is and generally the less deformed the polymer cable component.

Twinning the insulated conductors while they are still in a cooled state, and thus have a higher hardness, is one way to reduce the amount of deformation during the twinning process. In some embodiments, this leads to a lower crush ratio and improved electrical properties of the resulting twisted pair. In some embodiments, the amount of time an insulated conductor is exposed to a cryogenic fluid and/or the amount of time a cooled insulated conductor is exposed to ambient temperature prior to being twinned may be adjusted in order to modulate the electrical properties of the resulting twisted pair.

In some embodiments, the crush ratio and/or associated electrical properties of individual conductors or twisted pairs may be adjusted in order to produce multiple twisted pairs with about the same propagation delay. In some embodiments, twisted pairs with shorter lay lengths may be twinned while the individual insulated conductors are at a lower temperature, and therefore have a higher hardness, in order to produce a twisted pair with a reduced propagation delay relative to a twisted pair with a longer lay length. In some embodiments, twisted pairs with a longer lay length may be twinned while the individual insulated conductors are at a higher temperature relative to a twisted pair with a shorter lay length in order to produce a twisted pair with a higher propagation delay relative to a twisted pair with a shorter lay length. In some embodiments, the surface temperature of the insulated conductors that make up a first twisted pair may be adjusted relative to the surface temperature of the insulated conductors that make up a second twisted pair in order to create a first and second twisted pair that have about equal propagation delays over 100 meters, or propagation delays over 100 meters that are within 10 nanoseconds of each other, or propagation delays over 100 meters that are within 15 nanoseconds of each other, or propagation delays over 100 meters that are within 25 nanoseconds of each other, or propagation delays over 100 meters that are within 50 nanoseconds of each other. It will be appreciated that the surface temperature of an insulated conductor may be modulated by adjusting the time interval for which the insulated conductor is exposed to a cryogenic fluid, or by adjusting the time interval after an insulated conductor is removed from the cryogenic fluid but before the conductor is twinned or subject to other compression forces. It will also be appreciated that other methods of cooling, as described herein, could be used other than exposure to a cryogenic fluid. In all forms of cooling, the total degree of cooling can be modulated by controlling the temperature of the cooling materials and/or the time the polymer cable component is exposed to the cooling material. Similarly, regardless of the method of cooling used, the temperature of the polymer cable component when it is subjected to a compression or deformation force can be controlled by adjusting the amount of time the polymer cable component is exposed to ambient atmosphere after being cooled and prior to being subjected to a force.

In some embodiments a first, second, third, and/or fourth pair of polymer insulated conductors, each pair comprising two polymer insulated conductors, are cooled temporarily to increase the hardness of each pair to a degree. In some embodiments, the degree of hardness increase may be different for each pair. Once a pair of polymer insulated conductors is at the desired hardness, the pair is twisted together to form a first, second, third, and/or fourth twisted pair. Each twisted pair has a propagation delay over 100 meters. In some embodiments, the difference in propagation delay over 100 meters for the first, second, third, and fourth propagation delays over 100 meters are within 50 nanoseconds of each other. In some embodiments, the propagation delays are all within 25 nanoseconds of each other. In some embodiments, the first, second, third, and fourth propagation delay over 100 meters have less than about 25 nanoseconds of delay skew.

In some embodiments, the first, second, third and/or fourth pairs of polymer insulated conductors are cooled for different time periods in order to reach the desired hardness for each pair individually. In some embodiments, the cooling periods are all less than about 20 seconds, or all less than about 15 seconds, or all less than about 10 seconds. In some embodiments, first time period is between about 8-10 seconds, the second time period is between about 6-8 seconds, and the third time period is between about 4-6 seconds. In some embodiments, the fourth time period is less than about 4 seconds and may be zero seconds, indicating that one of the four pairs may not be significantly cooled at all.

In some embodiments, the time period of cooling and/or the degree of increase in the hardness of a polymer insulated conductor is related to the expected lay length of a twisted pair made from that polymer insulated conductor. In general, the shorter the lay length, the longer the cooling period and/or the greater the increase in hardness prior to twinning relative to other pairs of conductors.

In some embodiments, a first, second, third, and/or fourth twisted pairs have a first, second, third, and/or fourth lay length respectively. The first lay length being shorter than the second lay length and the second lay length being shorter than the third lay length. In some embodiments, the first cooling time period is longer than the second cooling time period, and the second cooling time period is longer than the third cooling time period.

In some embodiments, the first, second, third, and/or fourth twisted pairs have a first, second, third, and/or fourth crush ratio respectively. In some embodiments, the first crush ratio is less than the second crush ratio, and the second crush ratio is less than the third crush ratio.

In some embodiments, the first, second, third, and fourth twisted pairs have a first, second, third, and fourth signal velocity respectively. In some embodiments, the first signal velocity is greater than the second signal velocity, and the second signal velocity is greater than the third signal velocity.

In some embodiments, the first, second, third, and/or fourth pairs of polymer insulated conductors each have a different increased hardness. In some embodiments, the increased hardness of the first pair of polymer insulated conductors is greater than the increase hardness of the second pair of polymer insulated conductors, and the increase hardness of the second pair of polymer insulated conductors is greater than the increase hardness of the third pair of polymer insulated conductors.

It will be appreciated that when two insulated conductors are twinned together, the generally circular cross section of each insulated conductor deforms at least slightly. The closer to circular the cross section of each insulated conductor, the larger the amount of air that is retained in the interstices between the two insulated conductors. When more air is retained in the interstices, the overall dielectric constant of the twisted pair of conductors is reduced and the velocity of propagation is increased. By cooling polymer insulated conductors and increasing the hardness while the conductors are twinned to form a twisted pair, the polymer insulation is deformed less and a more circular cross-section is maintained. It will be appreciated that the dielectric constant of the insulation material itself is not increased or decreased. However, the dielectric constant of the resulting twisted pair may be reduced as the insulation layer retains its generally circular cross-section and incorporates a larger amount of air into the interstices of the twisted pair. In some embodiments, the purpose of cooling a polymer insulated conductor is to retain a larger amount of air within the interstices of the resulting twisted pair.

In some examples, the temperature of the conductors within a twisted pair was analyzed both during and after exposure to a cryogenic fluid (liquid nitrogen). This analysis was based on the electrical resistance of the conductors using the equation shown below. Equation 1:

$$R=R_{ref}[1+\alpha(T-T_{ref})]$$

Where:

R=Conductor resistance at temperature T;

$R_{ref}$=Conductor resistance at a reference temperature $T_{ref}$;

α=Coefficient of resistance of the conductor material at $T_{ref}$;

$T_{ref}$=the reference temperature (° C.) that a is specified at for the conductor material;

T=Conductor temperature (° C.).

In one example, the a of copper at 20° C. is known to be 0.00393 $K^{-1}$. $R_{ref}$ was determined to be 1.25 Ohms based on the calculations described below. To analyze the temperature of the conductors, a twisted pair was connected to a hand-held cable analyzer that recorded the resistance of the conductors in real time. The insulated conductors were immersed in a liquid nitrogen bath and the resistance was recorded over time. Equation 1 (above) was then solved for T.

In this example, a 24'9" length of FEP insulated copper wire was used. The resistance of the 24'9" wire is known to be 1.51 Ohms. The resistance of 6" of wire is known to be 0.26 Ohms. To calculate the value of $R_{ref}$, the resistance value of 6" of copper wire is subtracted from the resistance value of 24'9" of copper wire in order to subtract the approximate resistance of any other components in the circuit that are not the insulated conductor. Once $R_{ref}$ is determined to be 1.25 Ohms, Equation 1 can be solved for T using the measured value of R.

Figure 10:
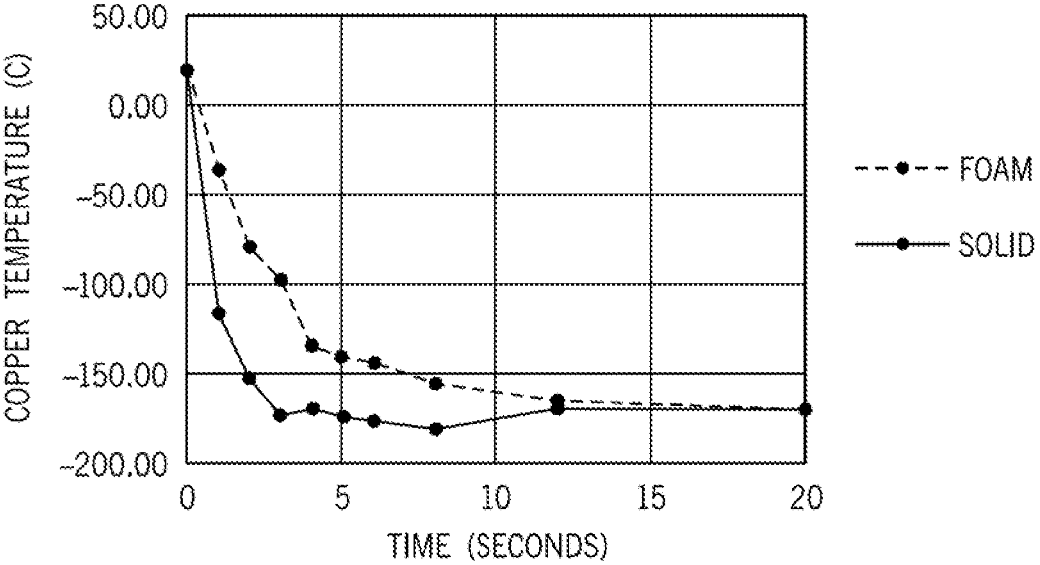
FIG. 10 shows the temperature of foam and solid polymer insulated copper conductors over time.
Figure 11:
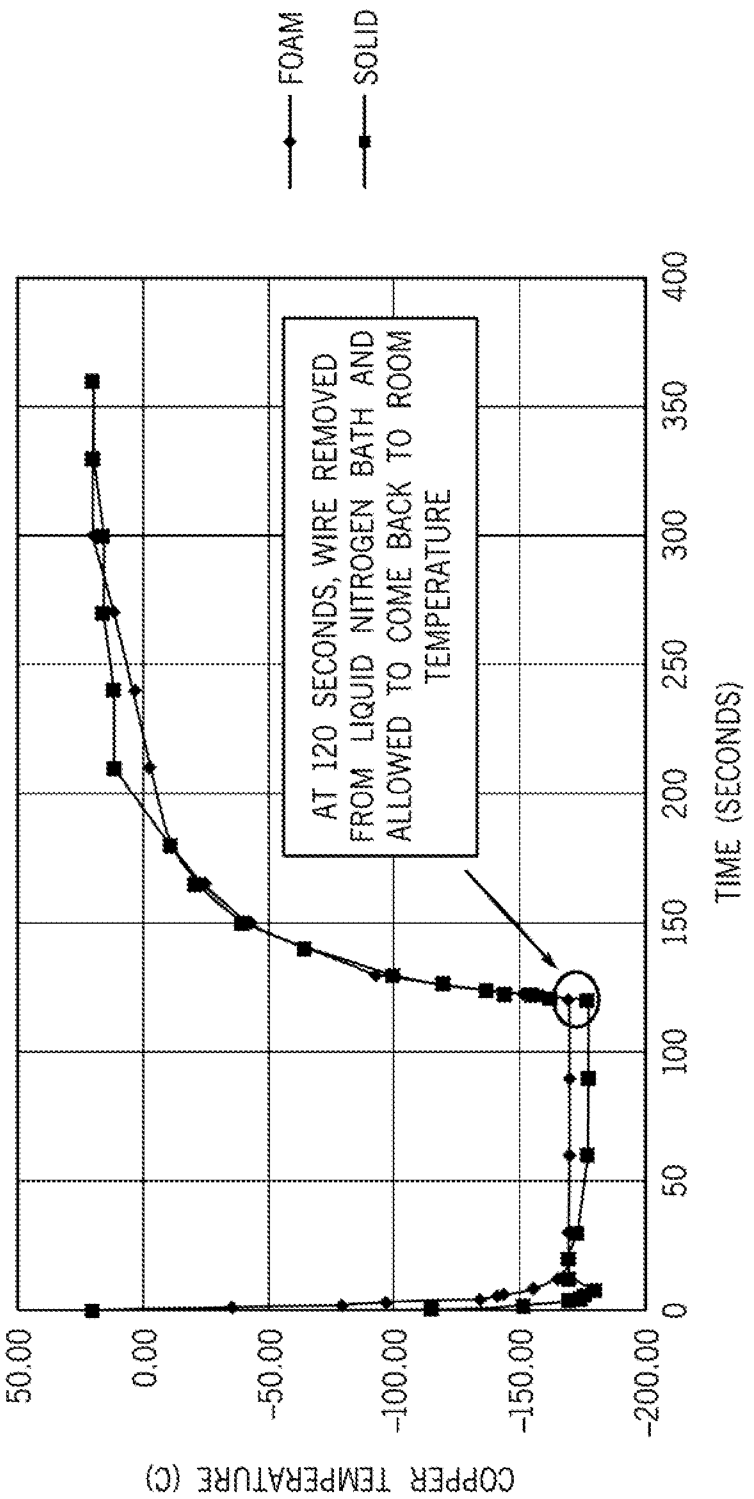
FIG. 11 shows the temperature of foam and solid polymer insulated copper conductors over time.

The calculated temperature of the copper conductors over time is shown in FIGS. 10 and 11. FIG. 10 shows more detail of the first 20 seconds after immersing the conductors in liquid nitrogen. FIG. 11 shows the temperature of the conductors as they are immersed in liquid nitrogen and after they are removed from the liquid nitrogen as well. The conductors were placed in the liquid nitrogen bath at time=0. The conductor temperature decreased rapidly during the first five to ten seconds before leveling off at about −176° C. The cables were allowed to remain in the liquid nitrogen bath for 120 seconds. When the conductors were removed from the liquid nitrogen bath at 120 seconds, the conductor temperature started to warm back up as shown in FIG. 11. Both the solid insulation and foam insulation conductors reached about 0° C. about 40 seconds after being removed from the liquid nitrogen. As can be seen from FIGS. 10 and 11, the solid and foam insulated conductors maintained generally similar temperatures relative to each other as they were cooled in liquid nitrogen and as they warmed up after being removed from the liquid nitrogen.

While the disclosed invention has been generally described in terms of twinning twisted pairs, it can be applied to a broad variety of other applications.

In some embodiments, when two insulated conductors are brought together to form a twisted pair, additional tapes, fillers, or hollow tubes can be added or incorporated into the twisted pair. In the case of tapes, they can be added between the insulated conductors, outside the twisted pair unit, and/or surrounding the twisted pair unit.

Figure 12:
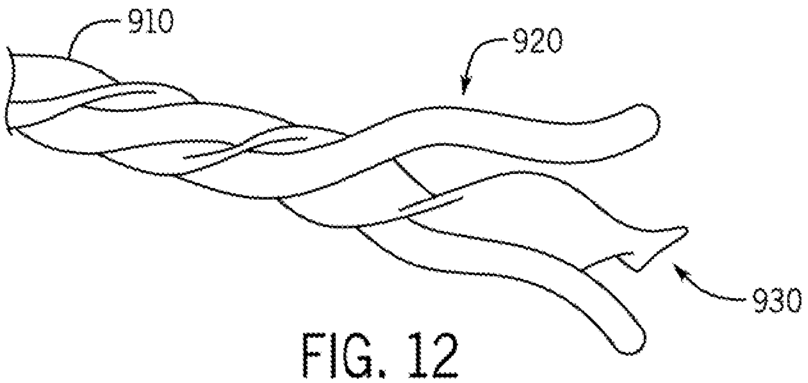
FIG. 12 illustrates a schematic view of an embodiment of a twisted pair in accordance with this disclosure.

FIG. 12 shows a schematic of a twisted pair incorporating tape according to an embodiment. As shown in FIG. 12, a tape 930 may be placed in between the two insulated conductors 920 of the twisted pair 910. The tape 930 incurs forces during the twisting of the twisted pair. As a result of these forces, the tape 930 may be compressed or otherwise deformed during the twinning process. The deformation of the tape 930 can lead to increased capacitance, increased insertion loss, lowered electrical impedance, and/or other undesirable impacts on the electrical properties of the resulting twisted pair. By increasing the hardness of the tape 930 shortly before exposing the tape to the forces of the twinning process, the deformation of the tape may be reduced, and the electrical properties of the resulting twisted pair may be preserved or enhanced. As described elsewhere herein, the hardness of the tape may be increased by exposing the tape to a cryogenic fluid.

Figure 13:
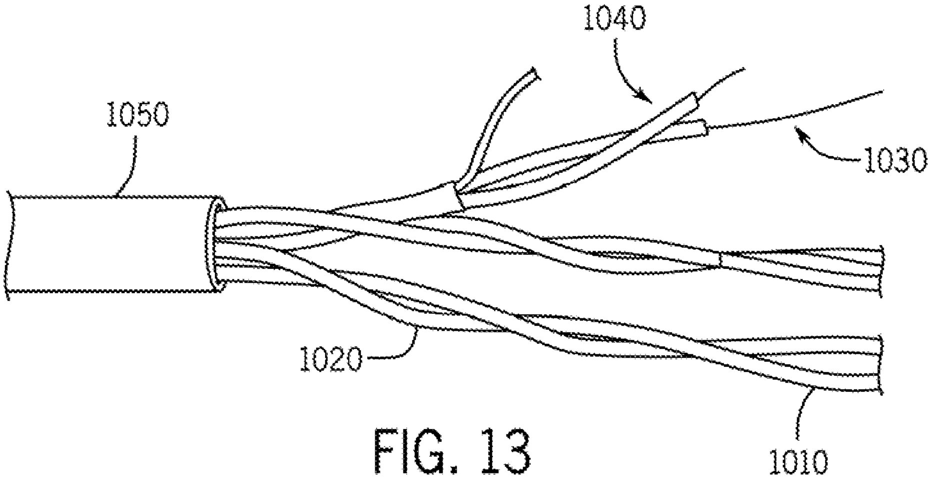
FIG. 13 illustrates a view of an embodiment of a cable in accordance with this disclosure.

FIG. 13 schematically illustrates an embodiment in which a tape is wrapped around a twisted pair. In some embodiments, one or more than one twisted pair 1010 can be surrounded by a tape 1020. Each twisted pair 1010 may contain two conductors 1030 surrounded by insulation layers 1040. In some cables, multiple twisted pairs 1010 are surrounded by a jacket 1050. The tape 1020 can be formed tightly around the twisted pair 1010, thereby creating deformation and raising capacitance, reducing impedance, and/or raising insertion loss. In some embodiments, the tape 1020 may include a combination of a metal and a polymer insulation material. As described, the polymer material may be susceptible to compression or other forms of deformation. In some embodiments, before the tape is wrapped around the twisted pair, the tape is passed through a cooling chamber where it is immersed, sprayed, or otherwise exposed to a cryogenic fluid or other cooling medium. By exposing the tape to a cryogenic fluid and increasing the hardness of the polymer, the tape may become more rigid and resist deformation. It is believed that the amount of air between the twisted pair and the layer of tape surrounding the twisted pair may be increased through higher rigidity (i.e. increased stiffness) of the tape. This is because the stiffer tape will not mold itself around the insulated conductors as closely and will maintain a larger amount of air space within the interior of the tape wrap relative to a polymer tape with a lower hardness. Increasing the amount of air trapped between the tape and the twisted pair will improve the electrical performance of the wires or resulting cable. Air is a strong dielectric material. Increasing the volume of air within a cable or within an insulation layer generally has a positive impact on the electrical performance of the resulting wire and/or cable.

Figure 14:
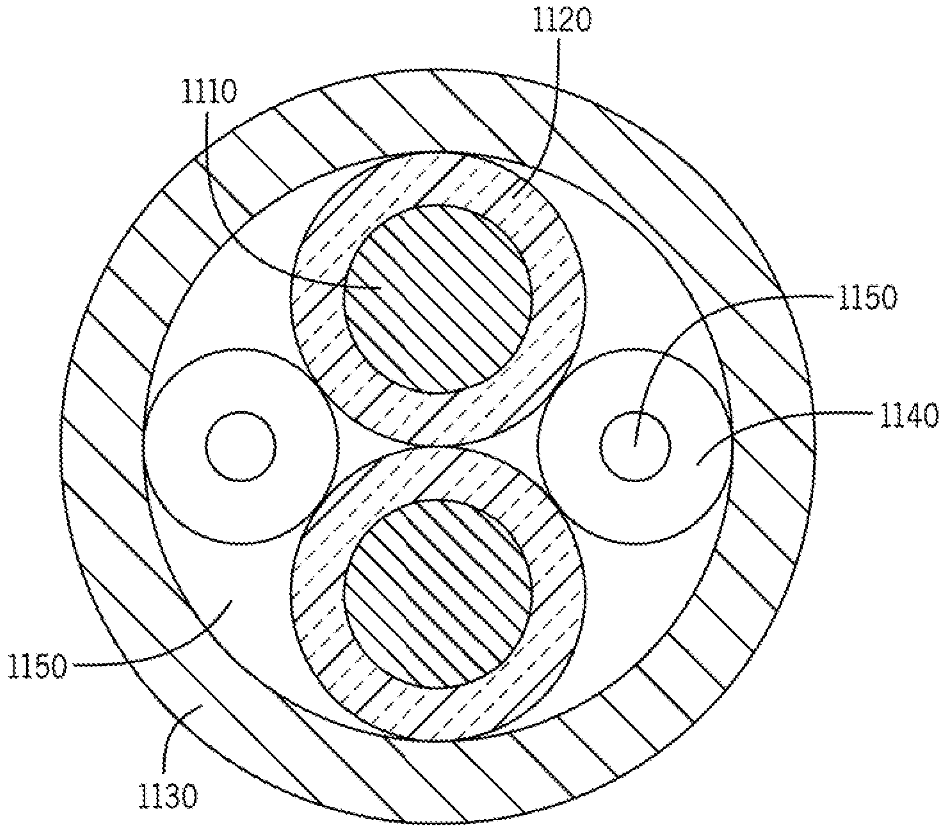
FIG. 14 illustrates a schematic cross section view of an embodiment of a cable in accordance with this disclosure.

FIG. 14 schematically illustrates a cross section of an embodiment in which hollow tubes are incorporated into a twisted pair cable. FIG. 14 shows a cable comprising two conductors 1110, each surrounded by an insulation layer 1120. The insulated conductors are positioned within a jacket 1130. In some embodiments, a twisted pair may be combined with hollow tubes 1140 and/or fillers that are positioned in the interstices of the two insulated conductors to create additional air space 1150 within the jacket 1130. These hollow tubes 1140 are typically made of polymer materials and may be compressed or otherwise deformed as they are compressed against the insulated wires of the twisted pair during the twinning process. When the hollow tubes or fillers are deformed, the amount of air contained within the hollow tube and/or contained within the jacket may be reduced. Additionally, if the hollow tubes or fillers are deformed, the pair to pair spacing may be decreased or be made inconsistent, thereby increasing the amount of crosstalk between different twisted pairs. In some cases, the reduced pair to pair spacing may also increase capacitance, increase insertion loss, reduce impedance and/or otherwise degrade the electrical performance of a resulting cable.

By increasing the hardness of the hollow tubes 1140 or fillers by exposing them to a cryogenic fluid, they are more able to resist being deformed and collapsing into the interstices of the twisted pair, thereby maintaining the air spaces 1150 and improving electrical performance. The air pockets formed between the hollow tubes 1140 and the interstices of the pair are helpful to electrical performance. This is because the dielectric constant of air is 1.0, which is preferable to the dielectric constant of other materials such as FEP (2.0), polyethylene (2.3), and polyvinylchloride (3.5). In some embodiments, maximizing air content is helpful to wire and cable electrical performance.

Figure 15:
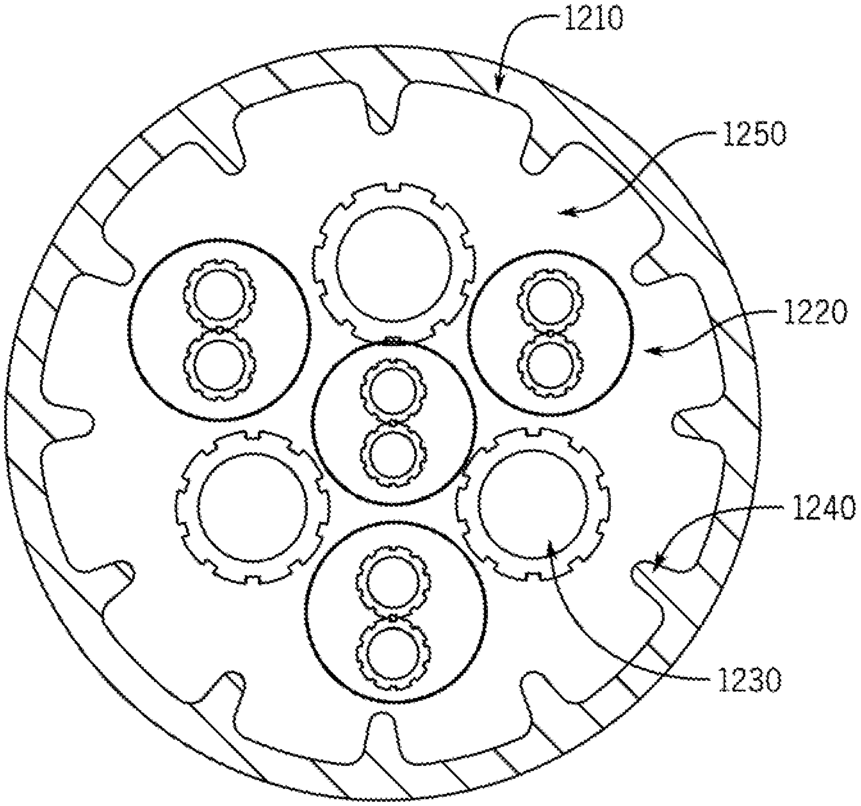
FIG. 15 illustrates a schematic cross section view of an embodiment of a cable in accordance with this disclosure.

FIG. 15 schematically illustrates a cross section of an embodiment in which projections are used to increase air space, reduce material costs, and/or reduce weight. In some embodiments, the jacket 1210, twisted pair 1220, and/or hollow tubes 1230 include projections 1240 or striations on the interior and/or exterior surface to create additional air space 1250. In some embodiments, the projections 1240 and/or striations are susceptible to deformation. In such embodiments, increasing the hardness of the hollow tube 1230, including the striations and/or projections 1240, to prevent deformation or collapse of the projections 1240 can help to maintain and/or maximize the air space 1250 within a cable.

In some embodiments, the projections from hollow tubes, insulation layers, or a jacket layer are formed during profile extrusion of the cable component. In some embodiments, the projections can be easily compressed or deformed. Hardening the surface by exposing the material to a cryogenic fluid can help reduce the impact of forces against the projections, thereby maintaining the air volume that would be present if the projections were not compressed or deformed.

It will be appreciated that not only polymer insulated wires may be exposed to cryogenic fluid, but hollow tubes, filler tubes, tapes, jackets, and/or other polymer cabling components may be exposed to cryogenic fluid or another cooling medium to increase the hardness. By reducing deformation of the cable components, air volume within the cable may be maintained or increased and the electrical performance of the cable improved relative to a similar cable that is allowed to compress or deform.

Figure 16:
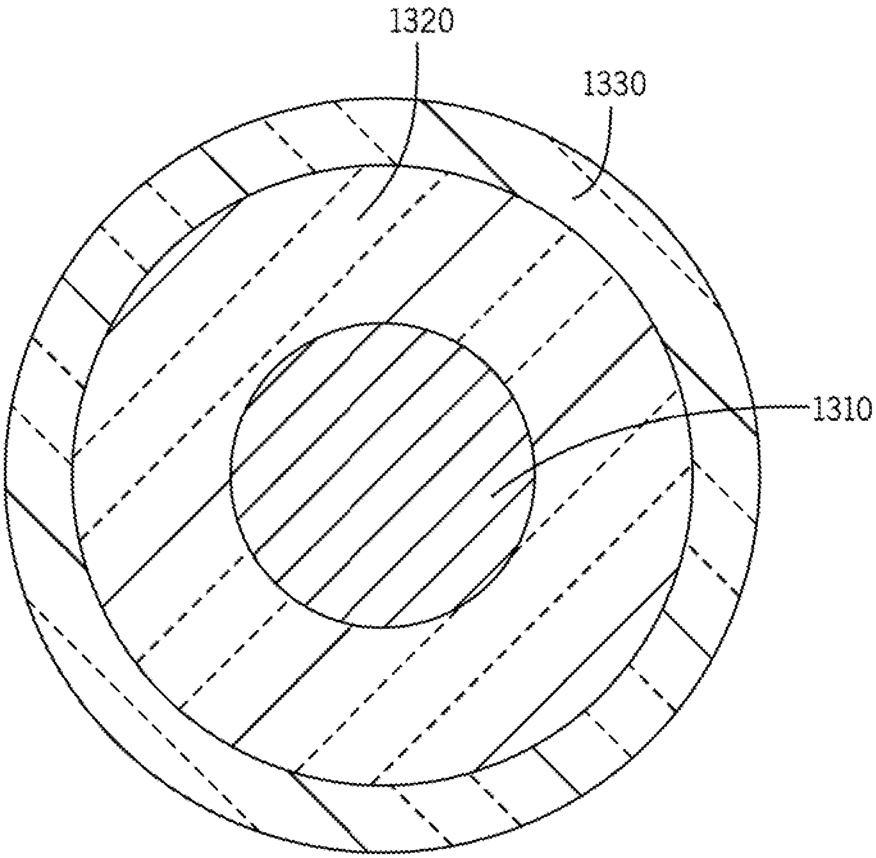
FIG. 16 illustrates a schematic cross section view of an embodiment of an insulated conductor in accordance with this disclosure.

FIG. 16 schematically illustrates a cross section of an embodiment in which a conductor is insulated by multiple insulating layers. In some embodiments, multiple layers of different insulation materials may be used to surround a conductor. In some embodiments, a layer of a outer material with a higher intrinsic hardness may be used to help reduce the compression of a layer of a softer inner material. In some embodiments, a layer of foam insulation 1320 may be used to insulate the conductor 1310. The hardness of a foamed insulation layer can be significantly lower than a solid insulation layer of the same polymer material because the foam insulation contains many discrete air pockets. The foam insulation layer may therefore be more susceptible to compression during manufacturing. A skin layer 1330 of a material with a higher hardness than the underlying foam insulation 1320 may be used to reduce compression of the foam insulation 1320. By exposing the insulated conductor (including the foam insulation and skin) to a cryogenic fluid, the hardness of the outer portions of the insulation material can be temporarily increased in order to reduce compression or deformation of the insulation layers during the manufacturing or cabling process. It will be appreciated that the entire thickness of the inner foam insulation layer may not need to be cooled in order for the outer portions of the foam insulation layer to have a temporarily increased hardness and resist compression during the cabling process. It will also be appreciated that the skin 1330 may or may not be a foam itself. In some embodiments, the skin will be a solid polymer designed to protect the underlying foam insulation. In some embodiments, the skin layer will include a different polymer than the foam insulation layer.

In some cable embodiments, separator tapes, cross-webs, and/or star fillers are utilized between twisted pair units to separate the twisted pair units from each other. Deformation of these separators can occur due to the forces experienced during the cabling process, thereby reducing the air volume within a cable and negatively impacting the electrical performance of the cable.

Figure 17:
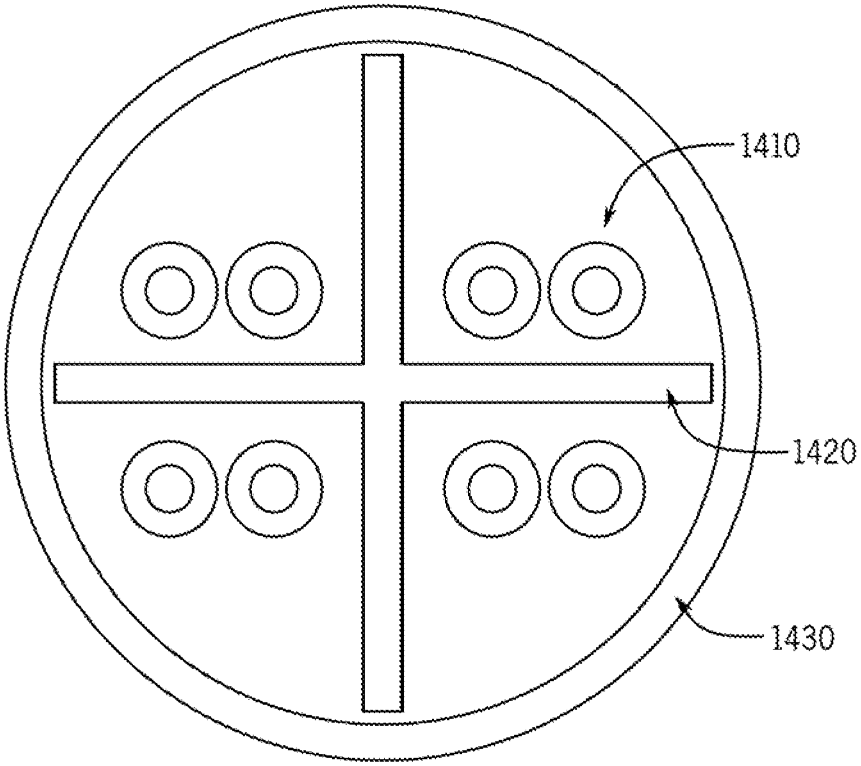
FIG. 17 illustrates a schematic cross section view of an embodiment of a cable in accordance with this disclosure.

FIG. 17 schematically illustrates a cross section of an embodiment in which multiple twisted pairs are separated by a cross web. In the embodiment shown in FIG. 17, the twisted pairs 1410 are separated from each other by a polymer cross web 1420. This reduces the amount of electromagnetic interference between the twisted pairs 1420. The cross web 1420 and twisted pairs are housed in a jacket 1430.

In some embodiments, separator tapes, cross-webs, and/or star fillers are extruded polymer shapes without the benefit of a metal backing or rigid internal element. The polymer separators may be made of high dielectric material (3.0 or greater). In some embodiments, the separators may be made of a foam material, thereby improving their dielectric property and also increasing their susceptibility to deformation. During the cabling process, the cable components are generally subjected to multiple compression or deformation forces. By exposing a separator tape, cross-web, or star filler to a cryogenic fluid and temporarily increasing the hardness prior to or during the cabling process, compression or deformation of the separators or other components may be reduced, thereby increasing the air volume within the cable and improving the electrical performance of the resulting cable.

In some embodiments, a polymer cable component may be hardened prior to being compressed in order to reduce the degree of deformation to the polymer cable component. In some embodiments, a polymer cable component may be hardened prior to being compressed so that the polymer cable component can withstand a greater compressive force while compressive to about the same degree as if the cable had not been hardened prior to being compressed.

In some embodiments, a first twisted pair is made by operating a twinning apparatus or twinner at a first line speed. The resulting first twisted pair has a certain first crush ratio. Another twisted pair can be made by cooling polymer insulated conductors to increase the hardness of the polymer insulation layers and then twinning the polymer insulated conductors by operating the cable twinning apparatus at a second, faster, speed to produce a second twisted pair with a second crush ratio. In some embodiments, the second twisted pair is made at the faster second speed and has about the same crush ratio as the first twisted pair. In some embodiments, the second crush ratio is within about 10% of the first crush ratio. In some embodiments, the second crush ratio is less than the first crush ratio. In some embodiments, the second speed is at least about 15% faster than the first speed. In some embodiments, the second speed is at least about 25% faster than the first speed.

In some embodiments, the twinner or twinning apparatus used will have a rated speed for particular types of wire and cable products. In some embodiments, the first speed described above is the rated speed for a given twinner and cable product and the second speed is at least about 10% faster than the rated speed for the same product. In some embodiments, the first line speed is about 60 feet per minute and the second speed is about 70 feet per minute. In some embodiments, the first line speed is about 160 feet per minute and the second speed is about 180 feet per minute. In some embodiments, the first line speed is about 220 feet per minute and the second speed is about 275 feet per minute.

Figure 18:
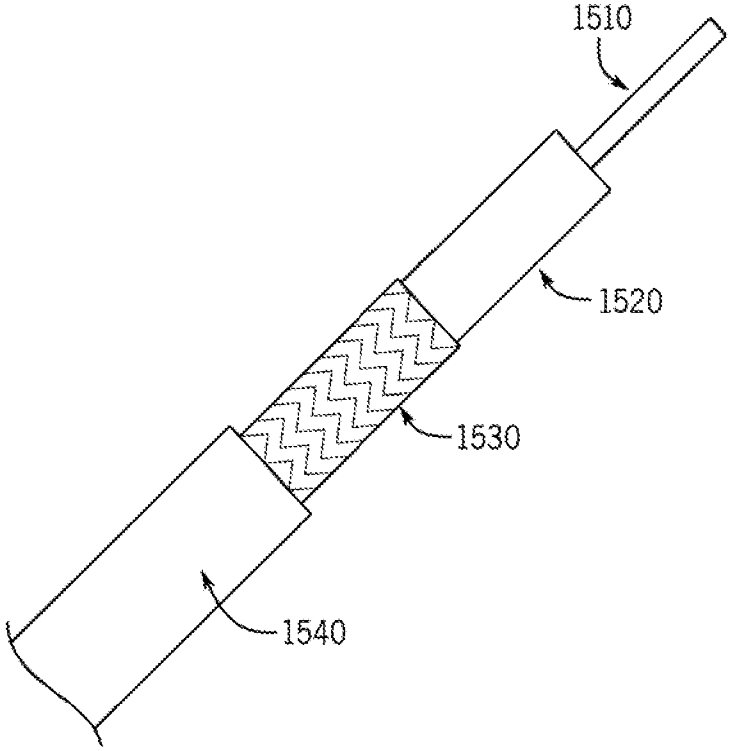
FIG. 18 illustrates a schematic view of an embodiment of a cable in accordance with this disclosure.

FIG. 18 schematically illustrates a cross section of an embodiment in which a wire includes a metal braid. In some embodiments a conductor 1510 is insulated by a polymer insulation layer 1520 and a wire braid 1530 is constructed over the insulation layer 1520. The wire braid 1530 may be made of a metal such as copper, or be plated with silver or tin. The wire braid 1530 may contain multiple metal strands which are woven together. When the braid is applied to the polymer insulation layer 1520, the individual metal strands that make up the braid may create impressions in the surface and/or compress the polymer insulation layer 1520, thereby negatively impacting the electrical properties of the cable. In some embodiments, multiple polymer cable components such as insulated conductors and hollow tubes, are cabled together using a metal braid. In such embodiments, each of the polymer cable components that contacts a metal strand may be deformed by the compression forces of the metal strands thereby negatively impacting the electrical properties of the resulting cable.

In some instances, braid impressions on the polymer insulation layer are repeating at regular intervals. This can negatively impact cyclical electrical signals which repeat at about the same regular interval or frequency or any harmonic thereof. By increasing the hardness of the polymer insulation layer prior to applying a braid or metal strand, the impressions, compression, and other deformation of the polymer insulation layer may be reduced.

In some embodiments, a cooling chamber, or other structure containing a cooling medium, located shortly before a braiding machine is less than about 5 feet in length, or less than about 3 feet in length, or less than about 1 foot in length. Due to the relatively slow line speed of most braiding machines, the footprint of the cooling chamber can be reduced without decreasing the residence time of a polymer cable component within the cooling chamber.

In one non-limiting embodiment, a non-insulated copper wire was used to simulate the impressions made in a polymer cable component during the metal braiding process. A metal braid is typically applied over a polymer cable component by weaving or braiding several individual metal strands together over the polymer component. As these individual strands are braided together, they compress and deform the polymer component underneath. To simulate this deformation process, a twining machine was used to twin one conductor insulated with foam FEP and one non-insulated copper wire. As the non-insulated copper wire was twisted around the foam FEP insulation, the indentations left in the foam FEP insulation layer can be examined. The bare copper wire was a 24 AWG wire and the FEP foam insulated conductor had an outer diameter of about 82.68 mils or about 2.1 mm.

Samples were created using a 6.2 mm lay length and the twinner running at 1400 twists per minute and 30 feet per minute. Samples were collected after exposing the FEP foam insulation to liquid nitrogen for 10 seconds and without the use of the cooling chamber as a control. The depth of the impressions left by the copper wire on the foam insulation was analyzed using laser microscopy.

Upon initial visual inspection, the polymer insulation layer that was not exposed to liquid nitrogen was deformed into a generally helical shape when it was twinned with the bare copper wire. The polymer insulation that was exposed to liquid nitrogen for 10 seconds, thereby increasing its hardness, appeared to be generally straight with the copper wire wrapped helically around the straight foam insulation layer. The foam FEP insulation layer appeared to be unchanged by the twinning process with the bare copper wire.

The depth of the impression made by the bare copper wire into the FEP foam insulation layer was measured three times at each of three locations, before the twinner take-up, inside of the twinner bow, and at the twinner take-up reel. The data is presented below in Table 6.

TABLE 6

| Impression Depth | | | | | | |
|---|---|---|---|---|---|---|
| | Locations | | | | | |
| | Before Take-Up | | Inside the Bow | | At the Take-Up Reel | |
| | Control | After 10 s Exposure | Control | After 10 s Exposure | Control | After 10 s Exposure |
| Sample 1 Impressions (μm) | 40 | 0 | 100 | 0 | 615 | 70 |
| Sample 2 Impressions (μm) | 90 | 40 | 70 | 0 | 700 | 400 |
| Sample 3 Impressions (μm) | | 0 | 130 | 50 | 540 | 380 |
| Average Depth of Impression (μm) | 65.00 | 13.33 | 100.00 | 16.67 | 618.33 | 283.33 |
| Average Depth of Impression (mils) | 2.56 | 0.52 | 3.94 | 0.66 | 24.34 | 11.15 |
| Reduction in Impressions v. Control (μm) | | 40 | | 100 | | 545 |

TABLE 6-continued

| Impression Depth | | | | | | |
|---|---|---|---|---|---|---|
| | Locations | | | | | |
| | Before Take-Up | | Inside the Bow | | At the Take-Up Reel | |
| | Control | After 10 s Exposure | Control | After 10 s Exposure | Control | After 10 s Exposure |
| Reduction in Impressions v. Control (mils) | | 2.03 | | 3.28 | | 13.19 |
| Reduction in Impressions v. Control (%) | | 79.49% | | 83.33% | | 54.18% |

As the twinned pair moves from before the take-up, to inside of the bow, to the take-up reel, the amount of force and the number of total compressive events increases and the lay length decreases. The distance and time elapsed since the polymer insulation left the cooling chamber also increases, thereby allowing the hardness of the polymer insulation to decrease as the polymer returns to ambient temperature.

As can be seen in Table 6, at every location, the samples that were exposed to liquid nitrogen for 10 seconds showed a significant reduction in the impressions formed by the copper wire. Accordingly, it can be expected that a metal braided shielding layer applied on top of a polymer insulation layer will deform the polymer insulation layer less if the polymer insulation layer is hardened by cooling the polymer prior to the braid being applied. Wire and cable products with a less deformed polymer insulation layer will generally have improved electrical properties relative to wire and cable products with compressed or otherwise deformed polymer insulation layers.

In some embodiments, during the cabling process, when individual insulated conductor and/or other cable components are bundled together, compression and/or deformation may occur. This deformation can result in compression of insulation layers, forcing of insulated conductors into cross-web or other separators, and/or collapse of jacketing layers. During the cabling process, the twisting of an existing twisted pair can cause the twist rate of the twisted pair to increase, thereby creating additional compression forces within the existing twisted pair. Hardening the cable components by temporarily increasing the hardness during the cabling process can help reduce or avoid deformation of the various cable components, both individually and relative to each other. By exposing the cabling components to a cryogenic fluid prior to and/or during the cabling process, the desired arrangement of the cable can be maintained. Avoiding deformation maximizes the amount of air space within a cable and improves the electrical performance. Allowing the physical arrangement of the cable to be deformed has a negative impact on the electrical performance of the cable.

As explained herein, air is a favorable dielectric material, however air provides no physical support to prevent conductors from contacting each other. Insulators are therefore utilized to prevent contact and reduce interference between conductors. In order to improve the electrical performance of an insulating layer, air may be introduced into the insulation via air channels (profile extrusion) or foaming (creating air bubbles within the insulation material). Because air itself has no physical strength, introducing air into the insulation layers decreases the overall hardness of an insulator. The lower hardness results in greater compression or deformation as a result of the same external forces. By exposing the insulating elements to a cryogenic fluid and temporarily increasing the hardness of the insulating layer, the deformation created during the manufacturing process can be mitigated. In some embodiments, introducing air into the insulation layers allows the cryogenic fluid to cool the closed air pockets. This can help maintain the insulating layer at a reduced temperature for a longer period of time relative to a solid insulating layer without any air pockets.

In some embodiments, a lighter, smaller, and/or more useful cable may be produced by increasing the hardness of the polymer cable components prior to or during manufacturing. Less total insulation material may be required to achieve the same electrical performance if the cable components are not compressed or otherwise deformed. The total thickness of insulation layers may be reduced if the insulation layer is compressed less due to the increase in hardness during manufacturing.

In some embodiments, un-twisted wires may benefit from having the hardness of a polymer insulation layer temporarily increased. For example, the polymer insulation layer of single polymer insulated conductors may be deformed as the wire is contacted by rollers, guide bars, or other equipment during a manufacturing process. A polymer insulation layer could also be deformed when two wires are joined to form an un-twisted pair.

Many cables contain more than one twisted pair. In order to reduce electrical interference between the twisted pairs, each twisted pair within a cable may have a different lay length or a different number of twists per meter. The difference in lay length as well as other differences in the twisted pair can lead to certain twisted pairs having a faster or slower signal velocity. One factor that can lead to one twisted pair having a faster or slower signal velocity is the amount of air in the interstices between the two insulated conductors of a twisted pair. The more the conductors in a twisted pair are deformed by the compressive forces of twinning, the less air remains in the interstices. The less the conductors in a twisted pair are deformed by the compressive forces of twinning, the more air remains in the interstices, the lower the dielectric constant of the twisted pair, and the faster the signal velocity of the twisted pair. In addition to air being contained in the interstices of a twisted pair, air may be contained in between the various components within a cable. In some cable embodiments, air pockets may be formed between twisted pairs, between twisted pairs and cross members, between twisted pairs and filler tubes, and/or within hollow tubes. In general, the more air that is contained within the cable, the better the electrical properties of the cable.

In certain applications, data may be transferred using multiple twisted pairs within a single cable. In order for that data to be properly processed, the data must be sent through the twisted pairs and received from each of the twisted pairs at a particular time. In some embodiments, different lay lengths are used to reduce electrical noise between the different twisted pairs. It is common for four pairs to be used to transmit a signal. Using different lay lengths for each of these four pairs can cause the conductor path to be shorter or longer for one twisted pair than another. For example, a twisted pair with a longer lay length, and fewer twists per inch, will have a shorter conductor path than a twisted pair that has a shorter lay length and more twists per inch.

In many applications, it is important the signals on each twisted pair arrive at about the same time. Different conductor lengths may cause signals to arrive at different times. This can cause an effect called delay skew. In some embodiments, it is beneficial to slow down or not modulate the signal that arrives first (shortest conductor pair path)—and speed up the one that would naturally arrive last (longest conductor pair path).

The difference between a signal received from the twisted pair with the fastest signal velocity and the slowest signal velocity is referred to as delay skew. It is desirable to have a delay skew of less than 25 ns. In some applications a delay skew of less than 50 ns is acceptable.

As discussed, deformation of the polymer insulation layers in a twisted pair can impact the electrical performance of the twisted pair, including the signal velocity. The tighter the twist, or the shorter the lay length of a twisted pair, the greater the compression forces exerted during twinning and, typically, the greater the degree of deformation of the polymer insulation layer and the subsequent reduction of air dielectric between the insulated conductors.

In some embodiments, multiple twisted pairs will be exposed to a cryogenic fluid for differing amount of time in order to adjust the signal velocity and reduce the delay skew of the resulting cable. By exposing polymer insulated conductors to a cryogenic fluid for varying amounts of time, the desired amount of deformation of the polymer layer may be introduced. By controlling the degree of polymer deformation, the desired amount of air within the twisted pair interstices may be controlled. While the deformation generally has a negative impact on the electrical properties of the resulting twisted pair, by being able to control the degree of the negative impact, the signal velocity across multiple twisted pairs can be standardized and a cable with reduced delay skew across multiple twisted pairs can be created.

In one non-limiting example, four twisted pairs are manufactured to be incorporated into a single Ethernet cable. The polymer insulated conductors that form each of the four twisted pairs are exposed to a cryogenic fluid prior to being twinned. The polymer insulated conductors that form the twisted pair with the longest lay length may be exposed to a cryogenic fluid for about, for example, two seconds in order to reduce the degree of deformation of the polymer insulation layer. The polymer insulated conductors that form the twisted pair with the shortest lay length may be exposed to a cryogenic fluid for about, for example, ten seconds in order to reduce the degree of deformation of the polymer insulation layer and preserve a larger portion of the air dielectric between insulated conductors. The polymer insulated conductors that form the twisted pairs with more medium lay lengths may be exposed to a cryogenic fluid for a time period between two and ten seconds. By exposing the wires that make up the different twisted pairs to cryogenic fluid for different amounts of time, the signal velocity of the resulting twisted pairs can be tuned and the delay skew of the resulting cable can be reduced.

While the dielectric constant of a given polymer may be known, the total amount of insulation material and air space surrounding a conductor within a twisted pair is a function of the original polymer insulated conductor, the cable design, and the degree of deformation of the various cable components introduced during the manufacturing process. In the case of a foamed polymer insulation layer, the amount of air space surrounding a conductor may be closely related to the degree of deformation of the polymer insulation layer.

For a given conductor, the dielectric constant is inversely related to the velocity of propagation. Accordingly, the time a signal takes to travel down a given length of a twisted pair is also related to the dielectric constant. The higher the total dielectric constant (insulation layer combined with air space) surrounding a conductor the longer a signal will take to travel through the twisted pair. By controlling the degree of deformation of the various cable components, including, for example, insulation layers, twisted pairs, hollow tubes, filler tubes, and/or jacketing, the electrical performance of a twisted pair and/or cable can be modulated. By combining twisted pairs with known or controlled signal velocity, a cable with a reduced delay skew can be manufactured.

The velocity of propagation for a twisted pair may be directly measured using commercially available instrumentation. The measured value of the velocity of propagation may be used to determine the combined dielectric constant (E) using the equations below.

| | | |
|---|---|---|
| VELOCITY OF PROPAGATION | $V_p = \frac{100}{\sqrt{\varepsilon}}$ | % |
| TIME DELAY | $t_d = 1.016\sqrt{\varepsilon}$ | nsec/ft |

By measuring the velocity of propagation directly, the combined dielectric constant (E) can be calculated to account for the dielectric effect of both the polymer insulation and the air space surrounding a conductor.

In one non-limiting examples, if the velocity of propagation of a twisted pair is measured to be 68%. Based on the equations above, the combined dielectric constant is calculated to be 2.16. Using the time delay calculation, also provided above, the time delay of a signal traveling through this twisted pair would equal about 1.5 nanoseconds per foot. If a second twisted pair was manufactured and the polymer insulated wires are exposed to a cryogenic fluid prior to being twinned together the amount of airspace surrounding the conductor may be increased resulting in an improved velocity of propagation. If the improved velocity of propagation is 70%, only a 2% increase, the resulting combined dielectric constant is calculated to be 2.04 and the calculated time delay is 1.45 ns/foot. Over the length of 330 feet of twisted pair, the difference of 0.05 nanoseconds per foot between the two twisted pairs results in a total difference in signal delay of 16.5 nanoseconds. By exposing the polymer insulated conductors to cryogenic fluid for specific amounts of time, the combined dielectric constant and velocity of propagation may be controlled. This allows the development of higher velocity twisted pairs and also allows the creation of cables with reduced delay skew.

By exposing polymer insulated conductors to a cryogenic fluid for varying amounts of time, the desired amount of deformation of the polymer layer may be introduced. While the deformation generally has a negative impact on the electrical properties of the resulting twisted pair, by being able to control the degree of the negative impact, the signal velocity across multiple twisted pairs can be standardized and a cable with reduced delay skew can be created.

In some embodiments, a twinner may be adjusted to run at a faster or slower line speed in order to control the amount of time an insulated conductor is exposed to cryogenic fluid. In some embodiments, multiple cooling vessels of different lengths may be used to expose polymer insulated conductors to cryogenic fluid for different amounts of time. In some embodiments displacement blocks, or an adjustable partition may be used in order to control the portion of a cooling vessel that actually contains cryogenic fluid, thereby allowing a single cooling vessel to be used to expose a polymer to cryogenic fluid for differing amounts of time. By using displacement blocks or an adjustable partition, a fraction of the cooling vessel can be left without cryogenic fluid, functionally creating a variable length cooling vessel.

In some embodiments, one or more sheaves, wheels, capstans, and/or rollers may be used within the cooling vessel to redirect the path of a polymer cable component within the cooling vessel. This arrangement can allow a polymer cable component to remain within the cooling vessel for a longer period of time without increasing the length of the cooling vessel or slowing the line speed of the component. In some embodiments, a polymer cable component enters a cooling vessel in an upper vapor region of the vessel, where evaporated cryogenic vapor has risen above a cryogenic liquid, and is subsequently redirected to pass through the liquid region of the vessel where liquid cryogenic fluid remain. This arrangement allows the polymer cable component to initially transfer heat to the cryogenic vapor before contacting the cryogenic liquid, thereby reducing the total thermal load being transferred to the cryogenic liquid and increasing the total residence time of the polymer cable component within the cooling vessel. In some embodiments, the redirecting wheels may be adjustable in order to control the total residence time of a polymer cable component within a cooling vessel.

It will be appreciated that cables can be made with one, or more than one twisted pairs including, for example, two, three, four, six, or eight, twisted pairs. Each twisted pair in a cable may be exposed to a cryogenic fluid for a unique predetermined amount of time in order to regulate the signal velocity. By regulating the signal velocity, the delay skew of the resulting cable can be reduced.

In some embodiments a cable jacket is formed around a twisted pair or other cable components using an extruder with a profile die. The cable components are passed through the extruder die and a polymer is extruded around the cable components to form the jacket. In some embodiments, the cable jacket is exposed to a cryogenic fluid after being extruded around the cable components in order to avoid deformation of the cable jacket.

In some embodiments a polymer may be exposed to a cryogenic fluid after being extruded to form a polymer shape including, but not limited to, a hollow tube, a solid tube, a rectangular shape, an irregular shape, a shape with projections, indentations or cavities, or any other profile design. By exposing the extruded polymer shape to a cryogenic fluid after the shape has been extruded, the hardness of the extruded shape may be increased over a relatively short distance. In some embodiments, exposure to a cryogenic fluid may be used to adjust the crystalline structure of the extruded shape and/or control the physical properties of the resulting polymer shape. In some embodiments, the extruded polymer may be exposed to a water bath prior to being exposed to a cryogenic fluid. By exposing the extruded polymer shape to a cryogenic fluid, the resulting polymer may be easier to handle, mill, machine, or cut. The resulting polymer may resist deformation and/or produce less shavings, dust, swarf, or unusable material during processing. In some embodiments, by adjusting the crystalline structure of a polymer cable component, improved tensile and elongation properties may be achieved.

In some embodiments, a cryogenic cooling vessel may be incorporated into an in-line continuous or semi-continuous process. In some embodiments, a twinning machine may be configured to incorporate a cryogenic cooling chamber before, during, and/or after the twinning machine twins polymer insulated conductors to form a twisted pair. In some embodiments, a cabling machine may be configured to incorporate a cryogenic cooling chamber before, during, and/or after the cabling machine gathers and/or twists cable components to form a cable core.

In some embodiments, a cryogenic cooling vessel includes a vessel arranged to contain a cryogenic liquid, a liquid level sensor such as, for example, a float switch, an inlet arrange to provide cryogenic liquid, and/or an exhaust arrange to remove the vaporized cryogenic fluid. In some cryogenic cooling vessel an entrance is arranged to allow a polymer component, such as, for example, a polymer insulated conductor, to enter the cooling vessel and an exit is arrange to allow the polymer component to exit the cooling vessel. In some embodiments, the entrance and exit each have a diameter that is less than 0.3 mm larger than the diameter of the polymer sample. In some embodiments, the entrance and/or exit are arranged with profiled shapes in order to accommodate various profile polymer samples such as, for example, a cross web. In some embodiments, the cooling vessel incorporates sensors and/or labeling devices for maintaining consistent wire or cable quality during operation and/or line stoppages.

In some embodiments, a cooling vessel is arranged to expose polymer insulated conductors to a cryogenic fluid prior to first contact between the polymer insulated conductors. The point of first contact may be several feet before the polymer insulated conductors actually enter the twinning machine take-up. At the point of first contact compression forces between the polymer insulated conductors exist but may be weak relative to the peak compression forces generated when the polymer insulated conductors are twinned together. In some embodiments, a cooling vessel is arranged to expose polymer insulated conductors to a cryogenic fluid after the point of first contact but prior to the polymer insulated conductors entering the twinning machine.

In some embodiments, an automated cryogenic exposure system may be utilized as part of an inline continuous or semi-continuous process. An automated cryogenic exposure system may be used with a twinning line, cabling line, jacketing line, and/or any other process in which a polymer member may be compressed or deformed.

In some embodiments, a cryogenic exposure system includes a cooling vessel with a variable length, variable component pathway, multiple component pathways, one or more sensors arranged to determine the diameter of a wire, twisted pair, cable core, or cable, and/or a machine automation controller.

In one non-limiting example, an optical sensor may be used to measure the diameter of one or two polymer insulated conductors that are being unspooled at the beginning of a twisted pair twinning process. As described herein, the polymer insulated conductors may be passed through a cooling vessel containing a cryogenic fluid, such as liquid nitrogen, to raise the hardness of at least a portion of the polymer insulation layer. After passing through the cooling vessel, the two polymer insulated conductors are twisted together to form a twisted pair. A second optical sensor may be used to measure the width of the final twisted pair.

By measuring the diameter of both of the polymer insulated conductors before they contact each other, the two diameters may be combined to determine the potential width of the resulting twisted pair if the polymer insulation layers do not experience any crush or deformation. In some embodiments, the potential zero-deformation width may also be determined by measuring the diameter of one of the polymer insulated conductors at the beginning of the twinning process and doubling it.

When measuring the width of the resulting twisted pair, an optical sensor may measure the width of the twisted pair as it passes through a beam, such as a photon beam emitted by the optical sensor. It will be appreciated that the peak width measurements are used to represent the width of the twisted pair when the individual conductors are oriented in a plane perpendicular to the beam of the optical sensor. When the two conductors of the twisted pair are stacked in line with the beam of the optical sensor, the width measured may be about equivalent to the width of one insulated conductor and is not representative of the width of the twisted pair. The measured width of the twisted pair can be compared to the theoretical zero crush width to determine the crush ratio of the twisted pair in real time.

As part of a twisted pair cable design, a desired crush ratio may be established to achieve the desired electrical properties. If the measured crush ratio is determined to be higher than the desired crush ratio setpoint, the cooling vessel may be adjusted to extend the length during which a polymer insulated conductor is exposed to a cryogenic fluid. By extending the length of the cooling vessel that contains cryogenic fluid, the exposure time of the polymer insulated conductor can be increased and the hardness of the polymer insulated conductor may be increased before it is exposed to the compression forces of the twinning process. By increasing the hardness of the polymer insulated conductors prior to twinning, the crush ratio of the resulting twisted pair may be reduced. In some embodiments, the twinner speed may be adjusted to help increase or decrease both the residence time of an insulated conductor in the cryogenic fluid and/or the compression forces created by the twinning process.

In some embodiments, the optical sensors and variable length cooling vessel may be connected to one or more processors or machine automation controllers in order to create an automated quality control process. When the measured crush ratio deviates from the desired crush ratio setpoint, a controller may cause the variable length cooling vessel to respond by either extending or contracting the length of the portion of the cooling vessel that contains cryogenic fluid and/or extending or contracting the length of a component pathway within the cooling vessel by adjusting the position of redirecting wheels. By automatically adjusting the length of the portion of the cooling vessel that contains cryogenic fluid, the exposure time of the polymer insulated conductor to the cryogenic fluid and therefore the hardness of the polymer insulation layer may be modulated. By modulating the hardness of the polymer insulation layer, the crush ratio of the twisted pair may be controlled.

In some embodiments, minor modifications to the variable length cooling vessel may occur on a continuous basis. Having granular and/or automated control over the length of the cooling vessel and therefore the exposure time of the polymer insulated conductor to the cryogenic fluid allows the crush ratio to be controlled and maintained despite a large variety of potentially complicating factors including, but not limited to, ambient temperature, ambient sunlight, relative humidity, line speed, lay length, twinner parameters, twinner design, the type of polymer insulation used, whether the polymer insulation is foamed or solid, and/or the degree to which the polymer insulation is foamed, differences in polymer insulated conductors from reel to reel, and many others.

In some embodiments multiple cooling vessels may be used to control the total exposure time of a polymer insulated conductor to a cryogenic fluid. By using multiple separate cooling vessels, different methods of applying the cryogenic fluid to the polymer insulation may be used on the same polymer insulation. For example, a first cooling vessel may immerse a polymer conductor in a bath of cryogenic fluid while a second cooling vessel may use a cryogenic fluid spray. It will be appreciated that any number of cooling vessels may be used in any of numerous configurations. By altering the configuration of some or all of the multiple cooling vessels, the exposure time of the polymer insulated conductor and the temperature of the polymer insulated conductor at the time of twinning or other compression force may be controlled in an adjustable manner.

Traditionally, obtaining the desired degree of crush required a trial and error process in which a reel of twisted pair was fabricated and the electrical properties of the resulting reel were tested. If the electrical properties were not within a predetermined specification, the reel would be labeled as non-conforming and one of many variables would be changed. Then another reel of twisted pair would be made and the electrical properties of that reel tested. This trial and error process required a significant amount of time and resulted in a loss of materials. As the physical properties of polymer insulated conductors and the resulting twisted pairs are known to impact the electrical properties, by controlling the degree of crush in a twisted pair, the electrical properties of the twisted pair may also be controlled. The disclosed continuous and/or automated process may be used to obtain the desired physical properties and therefore the desired electrical properties in less time and with less wasted materials.

Figure 19A:
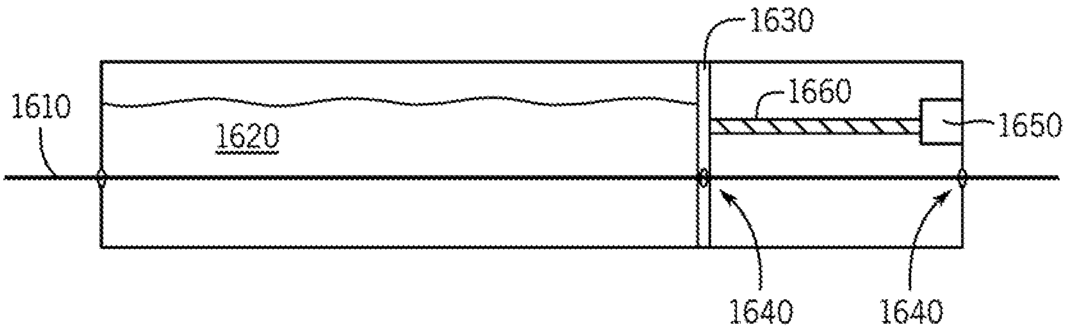
FIGS. 19 A-C illustrate schematic views of embodiments of a cooling vessel in accordance with this disclosure.
Figure 19B:
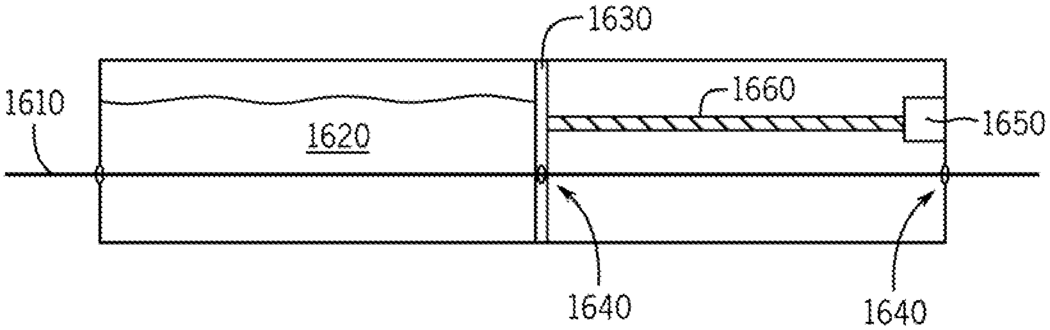
Figure 19C:
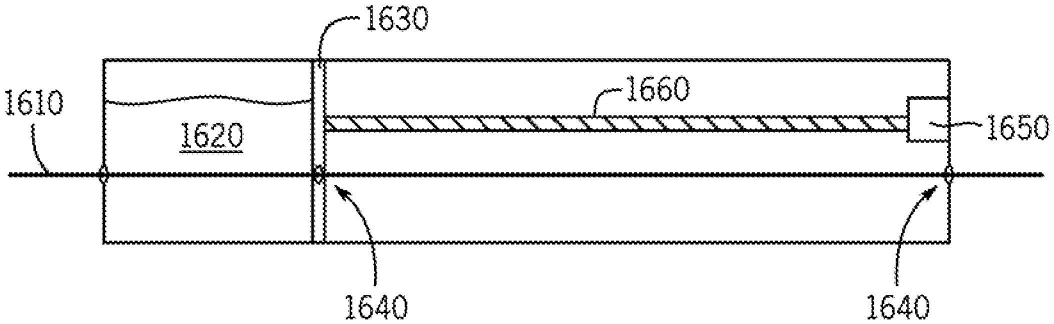

FIGS. 19 A-C show schematic views of a variable length cooling vessel according to one embodiment. As shown in FIG. 19A, a variable length cooling vessel may include a partition 1630 arranged to move forward and backward in order to change the length of the cooling vessel that contains cryogenic fluid 1620. The partition 1630 may be controlled by a motor 1650 connected to a threaded rod or screw drive 1660. As shown in FIG. 19A, a polymer insulated conductor 1610 may enter the cooling vessel through a hole 1640. After passing through the portion of the cooling vessel that does not contain cryogenic fluid 1620, the polymer insulated conductor may pass through the partition 1630 through a similar hole 1640. After passing through the partition 1630, the polymer insulated conductor 1610 is exposed to cryogenic fluid 1620. As shown in FIGS. 19B and 19C, the location of the partition 1630 can be controlled using the motor 1650 and/or screw drive 1660 in order to extend or reduce the portion of the cooling vessel that contains cryogenic fluid 1620. By modulating the length of the portion of the cooling vessel than contains cryogenic fluid, the time the polymer insulated conductor is exposed to the cryogenic fluid may be controlled. By controlling the time the polymer insulated conductor is exposed to a cryogenic fluid, the crush ratio and ultimately the electrical performance of a twisted pair or cable can be controlled.

In some embodiments, the motor, screw drive, or other mechanism for controlling the position of the partition in a variable length cooling vessel may be operably connected to a machine controller. In some embodiments, a machine controller may be used to control the position of redirection wheels inside the cooling vessel to adjust the length of the component pathway within the cooling vessel. This dynamic component pathway may be controlled to adjust the residence time of a polymer cable component within the cooling vessel. The machine controller may be in data communication with one or more processors that are in data communication with a first sensor for determining the diameter of a polymer insulated conductors and a second sensor for determining the width of the twisted pair. The processors and machine controller may compare the diameter of the polymer insulated conductor and the width of the resulting twisted pair to determine the crush ratio and compare the determined crush ratio to a predetermined desired crush ratio setpoint. The machine controller may then direct the motor and/or screw drive to adjust the exposure time of the polymer insulated conductor to a cryogenic fluid until the determine crush ratio is about equal to the desired crush ratio setpoint. While the cryogenic exposure system described above is explained in the context of a twinning system, it will be appreciated that the system may be applied to any other process in which a polymer component may be compressed or deformed.

Figure 20A:
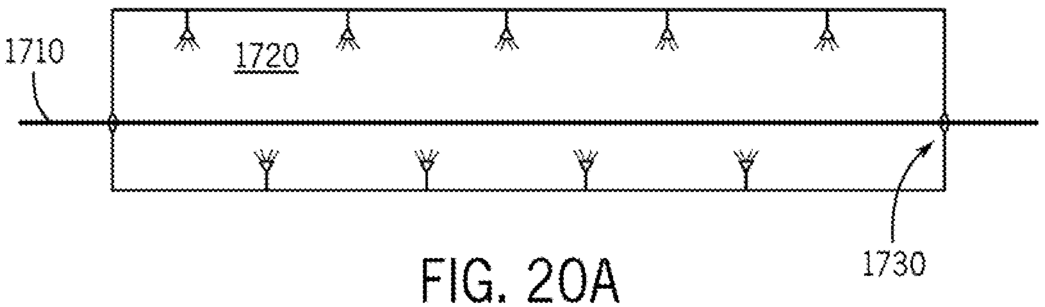
FIG. 20 A-C illustrate schematic views of embodiments of a cooling vessel in accordance with this disclosure.
Figure 20B:
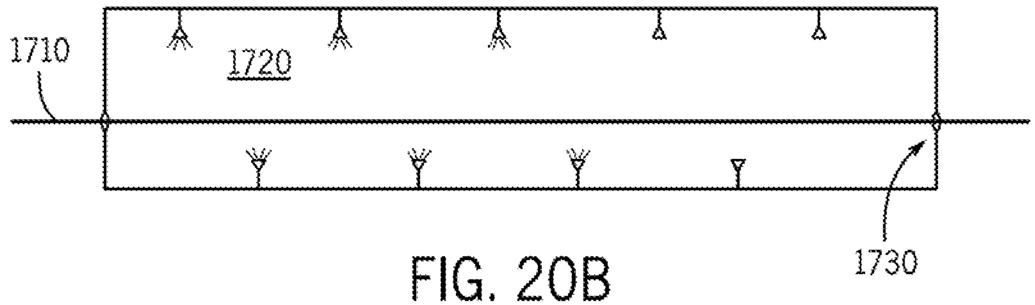
Figure 20C:
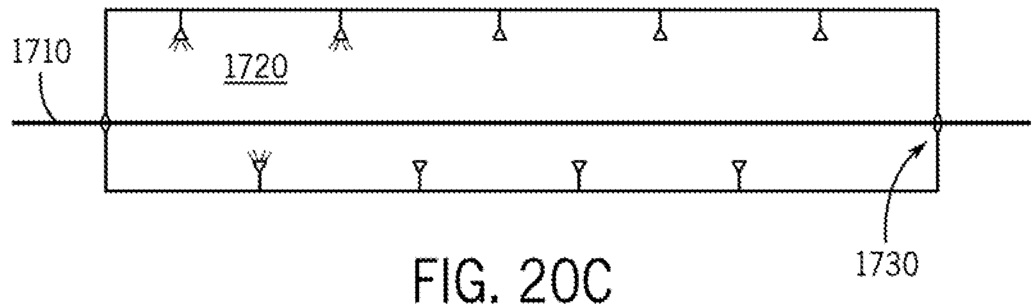

In some embodiments, a cooling vessel contains nozzles configured to spray cryogenic fluid onto a polymer component. In some embodiments, rather than change the physical size of the cooling chamber containing a cryogenic fluid, some of a plurality of nozzles may be closed, bypassed, or otherwise prevented from spraying cryogenic fluid. This allows the exposure time of a polymer component to be controlled and the resulting crush ratio of a polymer component to be controlled as discussed above FIGS. 20 A-C show schematic views of a variable spray cooling vessel according to one embodiment. As shown in FIG. 20A, a polymer insulated conductor 1710 may enter the cooling vessel through a hole 1730. Cryogenic spray nozzles 1720 may be activated to expose the polymer insulated conductor 1710 to a cryogenic fluid. As shown in FIG. 20A, all of a plurality of spray nozzles 1720 may be activated in order to expose the polymer insulated conductor to the maximum amount of cryogenic fluid. As shown in FIG. 20B, a portion of the plurality of cryogenic spray nozzles 1720 may be deactivated in order to reduce the exposure time of the polymer insulated conductor to the cryogenic fluid. As shown in FIG. 20C, still more of the spray nozzles 1720 may be deactivated to reduce the exposure time of the polymer insulated conductor to the cryogenic fluid. In some embodiments, the flow rate of the cryogenic fluid through one or more than one nozzle may also be regulated in order to adjust the hardness of a polymer component passing through the cooling vessel. In some embodiments, all of the spray nozzles may be deactivated and the polymer component may not be exposed to a cryogenic fluid at all. By adjusting the flow of at least one of a plurality of cryogenic nozzles, the exposure time of a polymer insulated conductor to a cryogenic fluid may be adjusted. In some embodiments, the flow of a cryogenic fluid through the nozzles of a cooling vessel may be adjusted in response to a measured crush ratio in order to closely control the crush ratio of a twisted pair or the deformation of any other polymer component passing through the cooling vessel.

In some embodiments, reducing the crush or deformation of polymer insulated conductors, cables, cable jackets, and other cable components allows those components to be made using less polymer materials while maintaining or improving electrical performance. By using less polymer material, the resulting cables have less flammable material and a lower fuel load. Cables with a lower fuel load are more likely to pass the UL 910 Steiner Tunnel test.

In some embodiments, the step of adding additional insulation and/or jacketing materials to compensate for the expected deformation creates a new set of problems. For example, many cables must pass certain flame and smoke standards, which ensure the cables are safe for use within a building or residence. One element of a cable's propensity to propagate a flame and generate smoke is the amount of material contained within it, commonly referred to as "fuel load." Generally, when the amount of fuel (in this case polymer insulation or jacketing material) is increased, the result is more smoke generation or flame propagation from the cable under test.

An example of fuel load testing is the UL 910 Steiner Tunnel test, which is related to ASTM E84, NFPA 255, UL 723 and ULC S102. In this test, a bundle of cable, in a noncombustible horizontal box or tunnel 24 feet×1.8 feet×1 feet is subjected to a flame. The flame intensity is set to 89 kilowatts, and air is moved through the tunnel to simulate a plenum ceiling situation. Materials tested to these standards are required to exhibit a maximum flame spread distance of 5 feet, a maximum peak optical density of 0.5, and a maximum average optical density of 0.15.

Design engineers generally choose materials that are optimized for cost and for meeting the required fuel load standards. A potential problem occurs when extra materials are added to compensate for cable deformation due to forces incurred during the making of these cables. This extra material increases fuel load, drives up cost, and limits the type of materials that may be employed. As an example, some Cat 6A cables shorter lay lengths which create higher compressive forces during manufacturing. These cables typically use FEP and PVC resins for insulation, due to the higher than normal deformations encountered during the making of these products. Some other end Cat 6 cables utilize longer lay lengths and experience comparatively reduced compression forces during manufacturing. These cables therefore need less additional insulation to compensate for deformation. This lower fuel load allows other less costly materials and/or to be utilized.

In some embodiments, a cable is manufactured by temporarily increasing the hardness of a polymer cable component prior to or during a compressive event. The increased hardness reduces the degree of deformation experienced during the compressive event and therefore, less additional insulation material is required to achieve the desired electrical performance. In some embodiments, increasing the hardness of a polymer cable component allows for a reduced total fuel load in the resulting cable, thereby allowing the cable to pass the UL 910 Steiner Tunnel test, whereas a similar cable that did not experience an increase in hardness and included additional polymer material to offset the increased depression would not pass the UL 910 Steiner Tunnel test.

In some embodiments, cables with a lower fuel load of more cost-effective materials may be developed that would not have passed the UL 910 Steiner Tunnel test without the reduced fuel load. In some embodiments, cables made using the disclosed technology contain a reduced fuel load and are less likely to propagate flame or smoke.

In some embodiments, cables created using the disclosed technology may have a smaller outer diameter. This may allow existing buildings to be retrofitted with modern high performance cables that have an equal or smaller diameter as the lower performance cables that were used previously.

In some embodiments, a wire and cable product has a certain amount of polymer insulation and/or other polymer cable component that contribute to its fuel load. In some embodiments, the fuel load is designed to produce a flame travel distance of equal to or less than about five feet, a peak optical density of smoke equal to or less than about 0.5 and/or an average optical density equal to or less than about 0.15 when measured according to the Steiner Tunnel test method of ASTM E84 as referenced in ASTM E84, UL910, NFPA 255, UL 723 or ULC S102.

In some embodiments, a polymer cable component is cooled and/or hardened before going through a compressive event. Due to the hardening, the polymer cable component is able to provide the desired electrical properties as it was not deformed as much as it would have been if the polymer cable component had not been cooled and/or hardened before being compressed.

In some embodiments, because a polymer cable component is deformed less after it is hardened, less total polymer may be incorporated into a wire and cable product, thereby reducing the total fuel load of the wire and cable product. In some embodiments, reduced fuel load wire and cable products have a capacitance value of less than about 20 pf/ft. In some embodiments, reduced fuel load wire and cable products have an impedance value of between about 50 ohms and 150 ohms, or between about 75 ohms and 125 ohms, or equal to about 100 ohms. In some embodiments, reduced fuel load wire and cable products have a velocity of propagation of between about 62% and 80%, or between about 66% and 70%.

In some manufacturing facilities, there is ample room to slowly cool down a very hot insulated conductor or other polymer cable component after it has been extruded. In some facilities, this initial cooling step involves exposing the recently extruded polymer component to ambient air or water contained within a trough for an extended period of time. As wire and cable manufacturing is generally a continuous process with the cable component traveling quickly, each of these cooling methods can require a significant amount of space, for example, greater than about 40 feet. The long distance required to allow the extruded polymer components to cool requires a large amount of manufacturing floor space. Additionally, these cooling methods do not generally bring the temperature of the polymer cable component down below the ambient temperature.

In some embodiments, a faster reduction in temperature is advantageous both to save time and to reduce the footprint of an extruder manufacturing operation. In some embodiments, a cooling chamber with chilled or cryogenic fluid can be used to rapidly cool a polymer cable component shortly after it is extruded. In some embodiments, a cooling chamber after an extruder is less than about 10 feet long, or less than about 8 feet long, or less than about 5 feet long, or less than about 3 feet long.

In one non-limiting example, the Shore D hardness of a solid FEP plaque was measured as described below. An injection molded plaque of solid FEP polymer was used throughout this example. The plague was 61 mm in length, 61 mm in width, and 2 mm in height. The Shored D hardness of the solid FEP plaque was measured at ambient temperature of about 20° C. The plaque was then exposed to liquid nitrogen for different lengths of time by submerging the plaque in a pool of liquid nitrogen. The Shore D hardness of the plaque was measured after different exposure times. The data is shown in FIG. 21.

Figure 21:
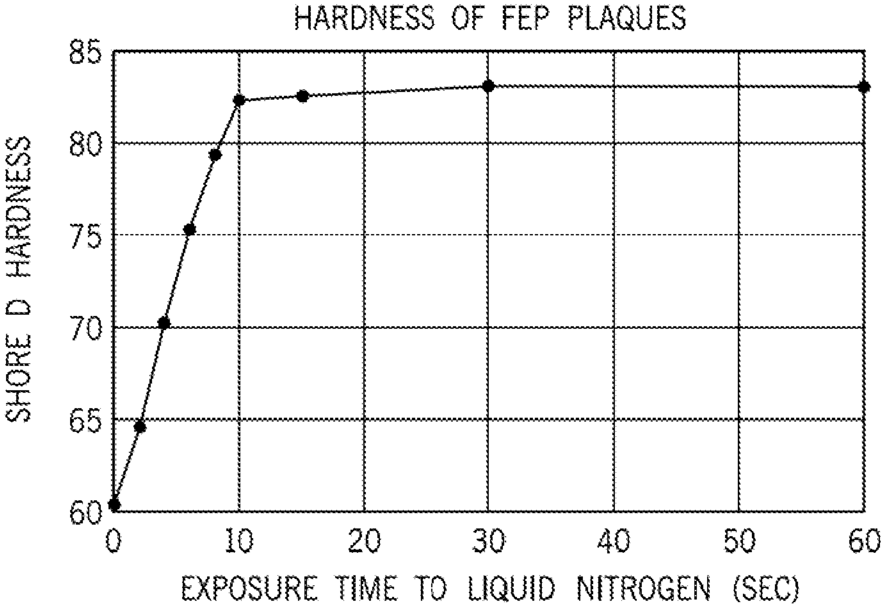
FIG. 21 shows a graph of Shore D hardness of solid FEP relative to exposure time to liquid nitrogen.

As can be seen in FIG. 21, the Shore D hardness of the FEP plaque increases from about 60 to about 83 after being exposed to liquid nitrogen for about 10 seconds. After about 10 seconds of exposure to liquid nitrogen, the FEP plaque reached a maximum hardness of about 83. Continued exposure to liquid nitrogen beyond 10 seconds did not continue to increase the hardness of the FEP plaque.

In a subsequent example, the Shore D hardness of a solid FEP plaque was measured as the plaque returned to ambient temperature after being exposed to liquid nitrogen for a specified period of time. The plaque was submerged in liquid nitrogen for the either 6, 10, or 30 seconds, and then removed from the liquid nitrogen. For each of the three trials, the Shore D hardness of the plaque was measured at specified time intervals until the plaque returned to ambient temperature.

Figure 22:
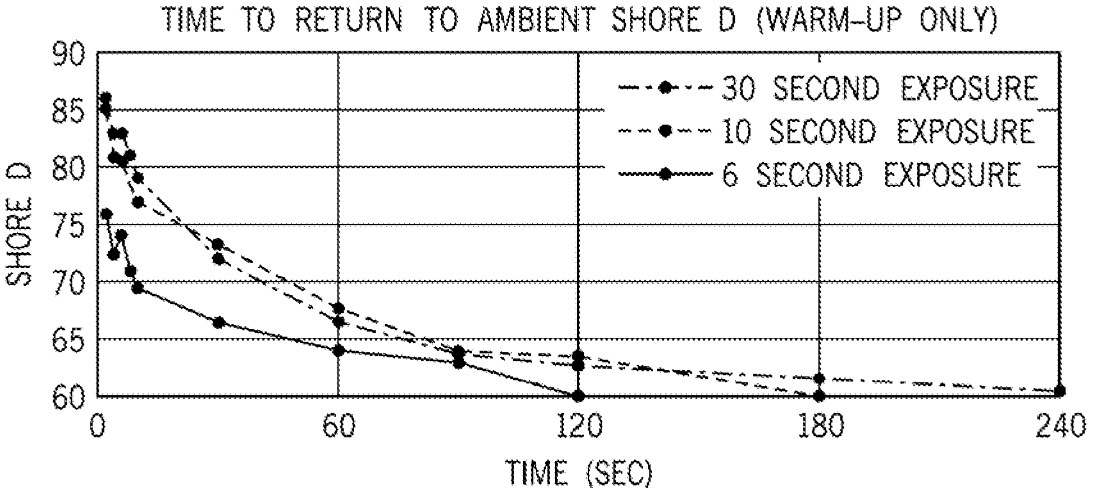
FIG. 22 shows a graph of Shore D hardness of solid FEP relative to exposure time to ambient atmosphere after exposure to liquid nitrogen.

FIG. 22 shows the Shore D hardness of the plaque as it returns to ambient temperature after being submerged in liquid nitrogen for either 6, 10, or 30 seconds. As shown in FIG. 22, there is relatively little difference in the change in hardness over time between the sample exposed to liquid nitrogen for 10 seconds and the sample exposed to liquid nitrogen for 30 seconds. This correlates with the data shown in FIG. 21 suggesting that the FEP plague reached its maximum hardness after about 10 seconds of exposure to liquid nitrogen. The plaque exposed to liquid nitrogen for six seconds likely reached a lower initial Shore D hardness of about 76 which decreased as the plaque was exposed to ambient conditions.

Figure 23A:
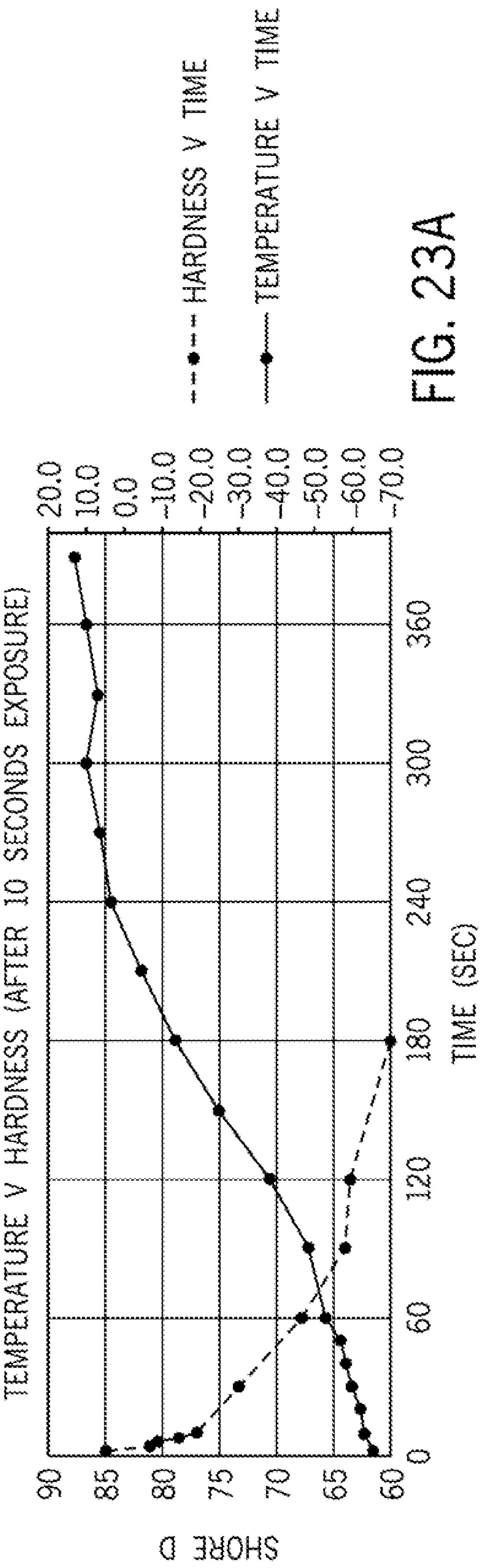
FIGS. 23 A-C show graphs of Shore D hardness of solid FEP relative to exposure time to ambient atmosphere after exposure to liquid nitrogen.
Figure 23B:
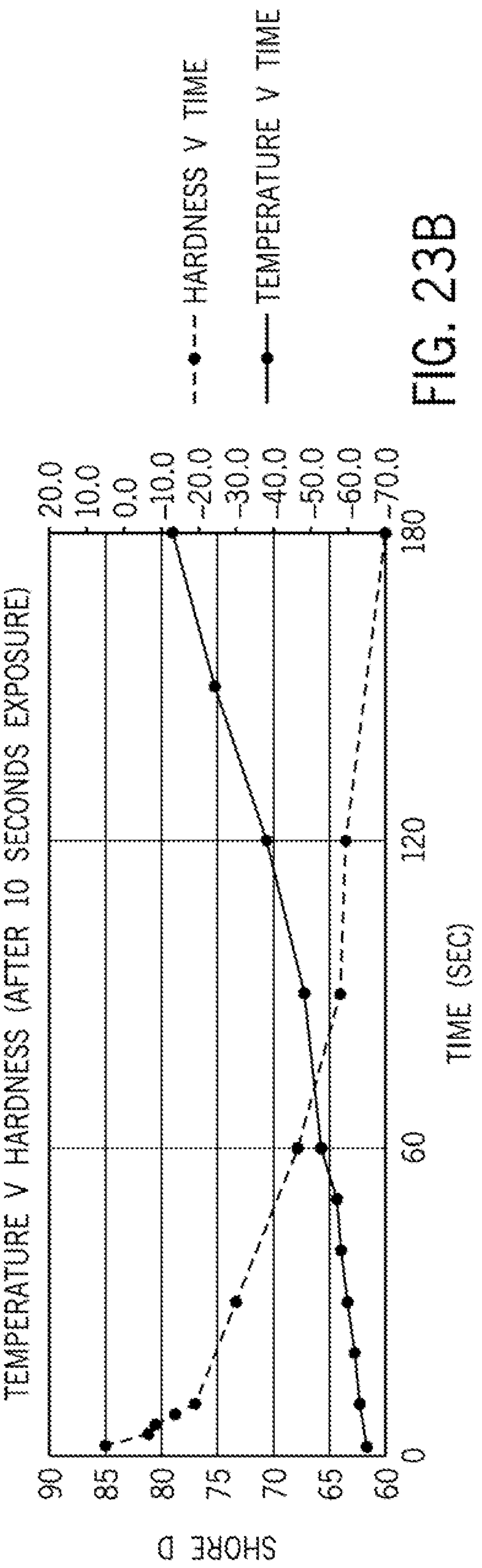
Figure 23C:
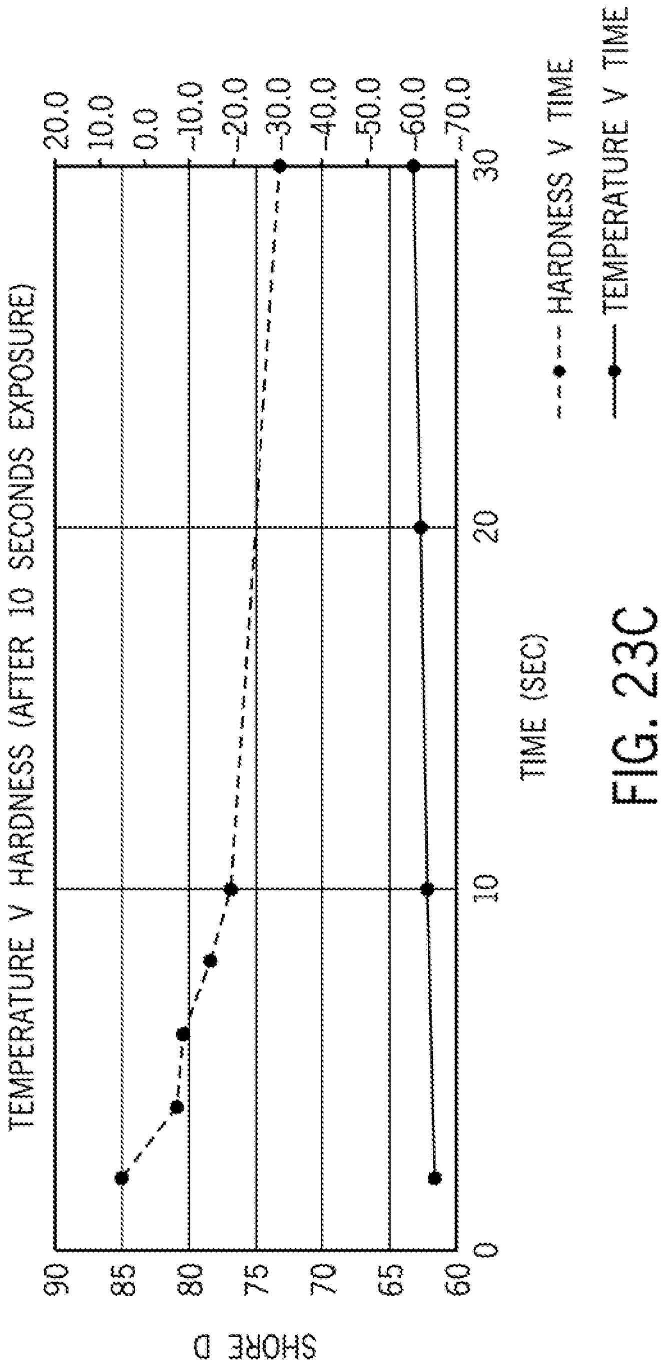

In a subsequent example, a solid FEP plaque was submerged in liquid nitrogen for 10 seconds and then removed. The Shore D hardness and the temperature of the plaque (in ° C.) were measured as the plaque returned to ambient temperature. FIGS. 23A-23C show this data over different period of time.

FIG. 23A shows the drop in Shore D hardness and rise in temperature of the solid FEP plaque over about 390 seconds. FIG. 23B shows the drop in Shore D hardness and rise in temperature of the solid FEP plaque over about 180 seconds. FIG. 23C shows the drop in Shore D hardness and rise in temperature of the solid FEP plaque over about 30 seconds. It should be noted that in FIGS. 23A-C, the temperature data below −60° C. is a projection rather than a direct measurement.

In another non-limiting example, the Shore D hardness of foam FEP was measured. To make the foam FEP sample, FEP foam insulated wire was wrapped tightly around a plaque of solid FEP. The Shore D hardness of the foam FEP insulated wire was measured at an ambient temperature of about 20° C. The FEP foam insulated wire was then exposed to liquid nitrogen for different lengths of time by submerging the FEP foam insulated wire in a pool of liquid nitrogen. The Shore D hardness of the foam FEP was measured after different exposure times. The data is shown in FIG. 24.

Figure 24:
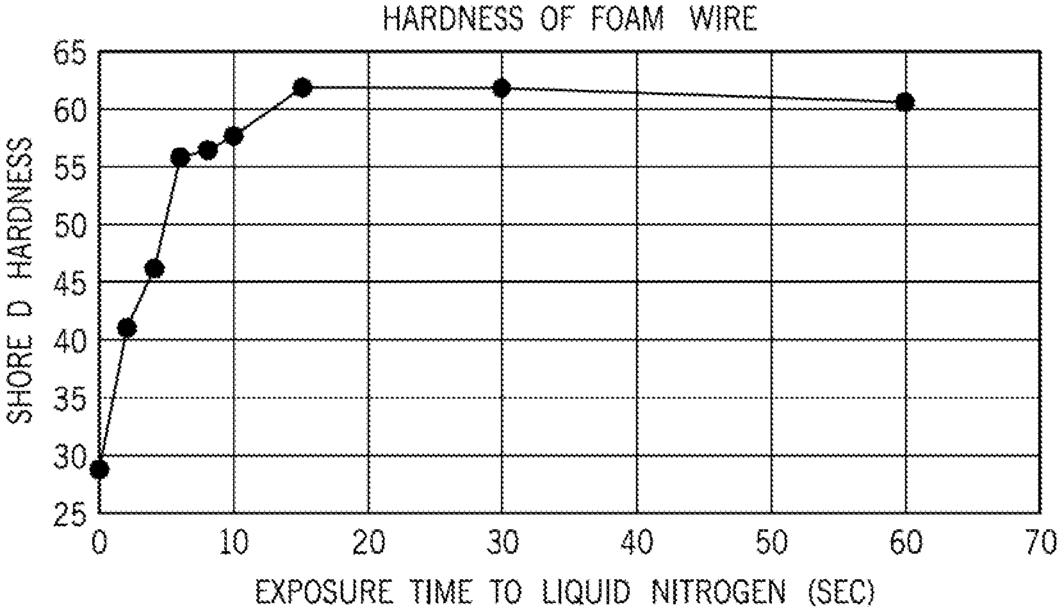
FIG. 24 shows a graph of Shore D hardness of foam FEP relative to exposure time to liquid nitrogen.

As shown in FIG. 24, the Shore D hardness of the FEP foam is about 29 at ambient temperature and rises to about 63 after being exposed to liquid nitrogen for about 15 seconds. Once the foam FEP reaches a Shore D hardness of about 63, the Shore D hardness plateaus and does not significantly increase after additional exposure time to the liquid nitrogen.

Figure 25:
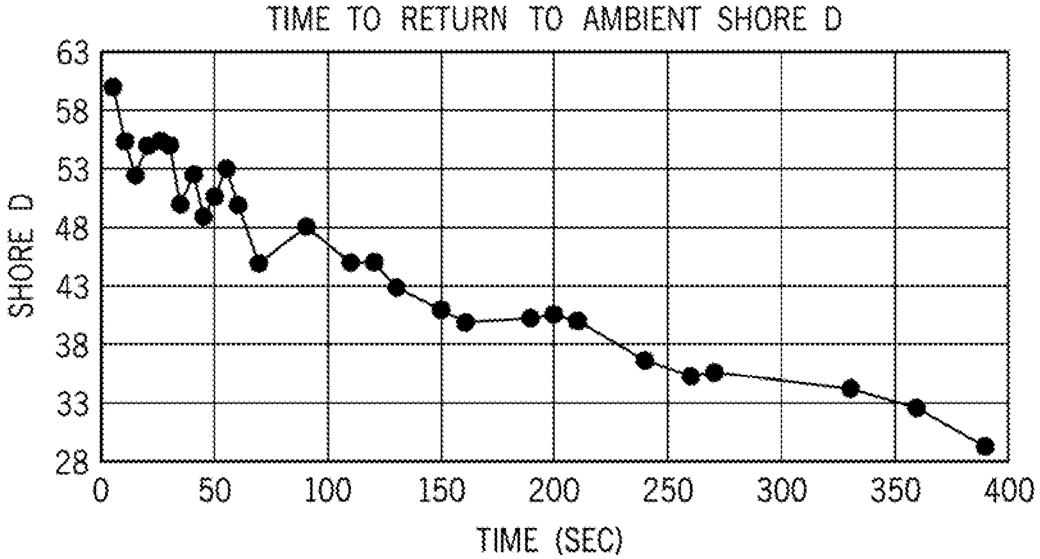
FIG. 25 shows a graph of Shore D hardness of foam FEP relative to exposure time to ambient atmosphere after exposure to liquid nitrogen.

FIG. 25 shows the Shore D hardness of the FEP foam insulated wire as it returns to ambient temperature after being submerged in liquid nitrogen for 10 seconds. As the foam FEP is exposed to ambient temperature for a longer period of time, the Shore D hardness decreases until it reaches the Shore D hardness of about 29 at ambient temperature.

Figure 26:
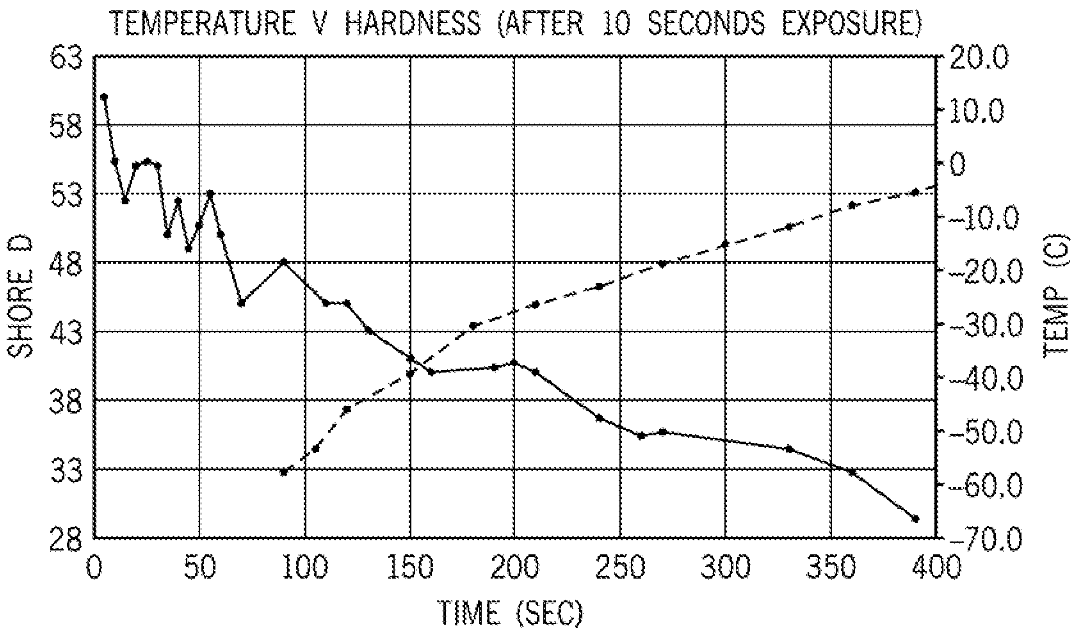
FIG. 26 shows a graph of Shore D hardness of foam FEP relative to exposure time to ambient atmosphere after exposure to liquid nitrogen.

In a subsequent example, foam FEP insulated wire was submerged in liquid nitrogen for 10 seconds and then removed. The Shore D hardness and the temperature of the foam FEP insulated wire were measured as the foam FEP returned to ambient temperature. FIG. 26 shows this data over a period of time.

FIG. 26 shows the drop in Shore D hardness and rise in temperature of the solid FEP plaque over about 390 seconds. It should be noted that initial temperature data below about −55° C. was not collected.

Figure 27:
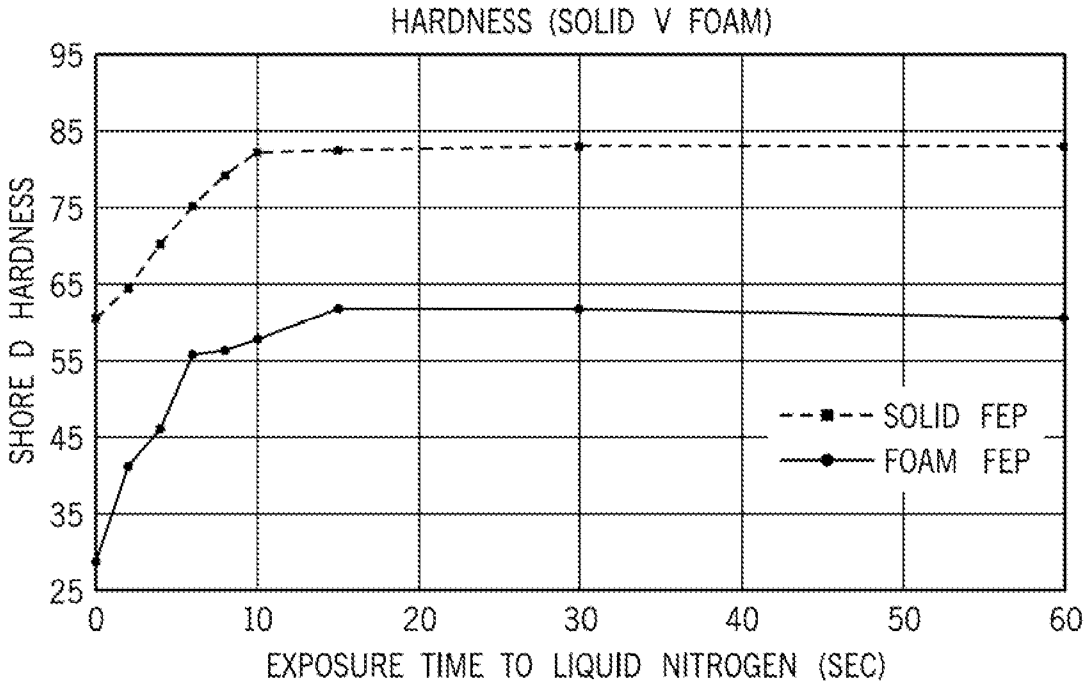
FIG. 27 shows a comparison of the Shore D hardness of solid and foam FEP relative to exposure time to liquid nitrogen.

FIG. 27 shows the Shore D hardness of both solid FEP and to foam FEP as they are exposed to liquid nitrogen over time. As can be seen by FIG. 27, the Shore D hardness for solid FEP generally stops increasing after about ten seconds. The Shore D hardness for foam FEP generally stops increasing after about 15 seconds.

Figure 28:
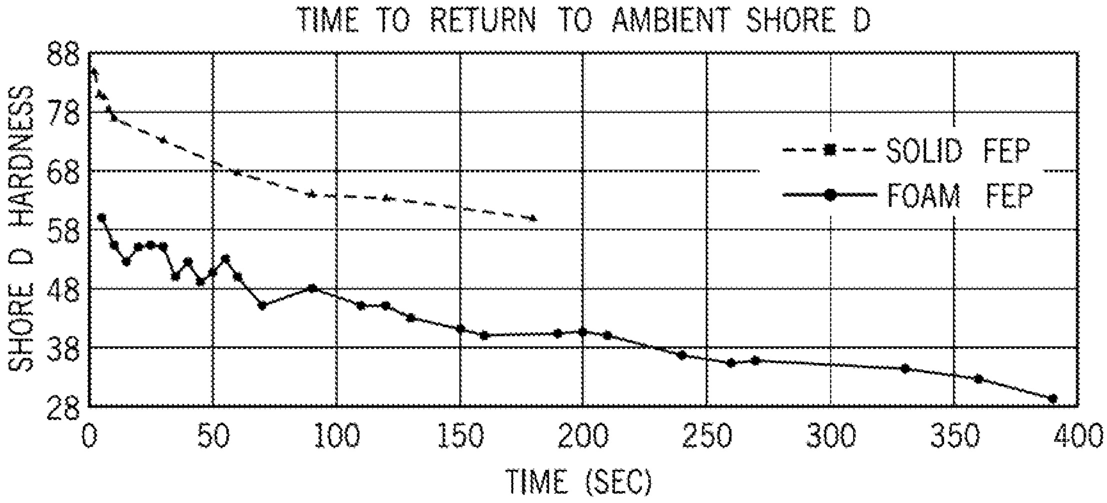
FIG. 28 shows a comparison of Shore D hardness of solid and foam FEP relative to exposure time to ambient atmosphere after exposure to liquid nitrogen.

FIG. 28 shows the Shore D hardness of both solid FEP and foam FEP as they are exposed to ambient conditions after being exposed to liquid nitrogen for ten seconds. Notably, the Shore D hardness of the foam FEP decreased more slowly and took more than three-minutes longer than the solid FEP to return to its Shore D hardness at ambient temperature.

Figure 29:
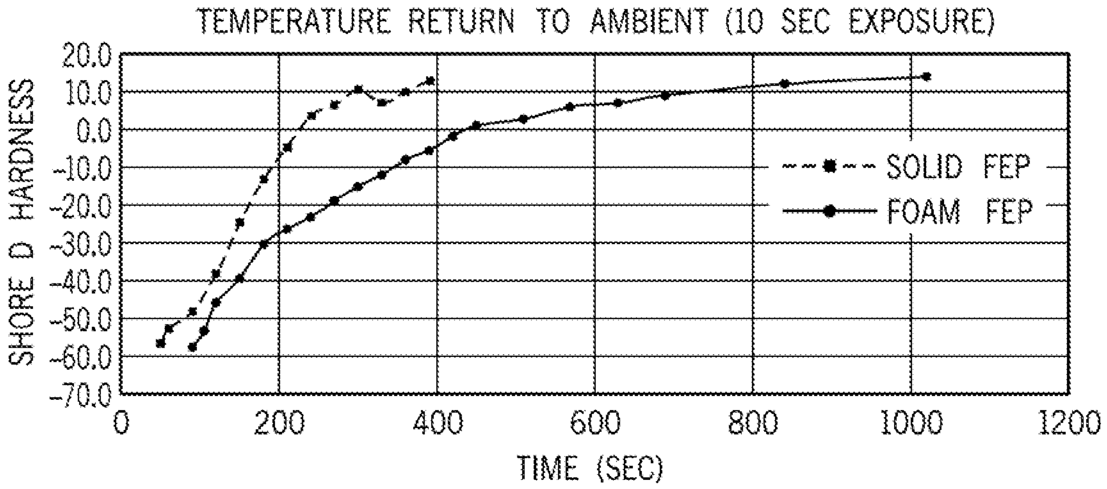
FIG. 29 shows a comparison of the temperature of solid and foam FEP relative to exposure time to ambient atmosphere after exposure to liquid nitrogen.

FIG. 29 shows the temperature of solid FEP and foam FEP as they are exposed to ambient conditions after being exposed to liquid nitrogen for ten seconds. The temperature of the foam FEP increased more slowly and took more than ten minutes longer than the solid FEP to return to ambient temperature.

Without being bound by theory, it is believed that the air pockets within the foam FEP change temperature more slowly than the solid FEP. Accordingly, the foam FEP insulation takes longer to reach its lowest temperature and associated increased hardness when exposed to liquid nitrogen. The foam FEP also takes longer to return to its ambient temperature and associated hardness after being removed from the liquid nitrogen.

While the above examples are described in terms of solid and foam FEP, it will be appreciated that similar data could easily be gathered for any form and type of polymer. Once the rate at which the hardness of a polymer returns to ambient hardness is understood, the hardness of a polymer cable component when it is subjected to a compressive event can be controlled by modulating the amount of time the polymer component is exposed to ambient temperatures after leaving a cooling vessel. In some embodiments, the distance between a cooling vessel and/or the line speed of a manufacturing line may be adjusted in order to reach the desired hardness of a polymer cable component at the point of compressor or deformation.

It will be similarly appreciated that the amount of cooling time (e.g., exposure time to a cryogenic fluid or other cooling medium) can be alternatively, or additionally adjusted in order to reach the desired hardness of a polymer cable component at the point that it is subjected to a compression force or other deforming force.

In some embodiments, the methods described herein for increasing hardness generate at least about a 10% increase in the Shore D hardness of a polymer cable component prior to the component experiencing a compressive force or at the time the polymer cable component experiences a compressive force relative to a similar component at ambient temperature.

In some embodiments, the methods for increasing hardness described herein generate at least about a 10% increase in Shore D hardness in a polymer cable component relative to a similar component, made of the same polymers, at 20° C. In some embodiments, the methods for increasing hardness described herein generate at least about a 10% increase in Shore D hardness in a polymer cable component relative to a similar component at 20° C. and reduce the deformation caused by a compressive event by at least about 0.0005 inches.

In some embodiments, at least about a 10% increase in Shore D hardness relative to a similar component at ambient temperature is generated using a cooling chamber that is less than about 10 feet in length.

It will be appreciated that for all cases, a 10% increase in Shore D hardness can be converted to other hardness tests such as Britnell, Meyer, Vickers, Rockwell, and other Shore Durometer scales such as Shore A.

For reference, Shore D durometer testing is described in ASTM D2240 and ISO 868. The hardness value is determined by the penetration of a durometer indenter foot into a sample. Shore Hardness measurements are dimensionless and range from between 0 to 100. The higher the Shore hardness number, the harder and more resistant to deformation the material. In some embodiments, the disclosed methods for increasing hardness are most advantageous for base materials which exhibit a shore hardness of between 40 and 80.

The methods, systems, and embodiments described herein are generally directed to adjusting the hardness of polymer components. The polymers contemplated herein include, but are not limited to thermoplastics, thermosets, rubbers, and/or elastomers, each of which may be foamed or solid and may contain a variety of additives and/or fire retardants. Specific polymers contemplated include, but are not limited to: Linear low density polyethylene-LLDPE, High density polyethylene-HDPE, Polyethylene-PE, Perfluoroalkoxy alkanes-PFA, Polytetrafluoroethylene-PTFE, Polyvinylidene fluoride-PVDF, ethylene chlorotrifluoroethylene-ECTFE, tetrafluoroethylene perfluoromethylvinylether-MFA, Polyphenylene sulfide-PPS, Polyether ether ketone-PEEK, Polyetherketone-PEK, Polyethylenimine-PEI, Fluorinated Ethylene Propylene-FEP, Ethylene tetrafluoroethylene-ETFE, Ethylene fluoroethylene Propylene-EFEP, Polypropylene-PP, Nylon-PA, polyvinylchloride-PVC, polycarbonate-PC, Acrylonitrile butadiene styrene-ABS, Polystyrene-PS, Polyesters like Polyethylene terephthalate (PET), Polyimides-PI, polyamide-imide-PAI, Natural rubber, Synthetic rubber, Fluorelastomer-FKM, and blends or alloys thereof.

Disclosed embodiments include, a method of reducing the impact of a compressive force on a polymer cable component, the method comprising: providing a polymer cable component with a first hardness, wherein the first hardness is the hardness of the polymer cable component under ambient conditions; temporarily changing the hardness of the polymer cable component to a second hardness, wherein the second hardness is different than the first hardness; subjecting the polymer cable component to a compressive force; and allowing the polymer cable component to return to the first hardness. In some embodiments, the polymer cable component is subjected to the compressive force while the polymer cable component is at the second hardness. In some embodiments, the compressive force produces less deformation of the polymer cable component at the second hardness relative to the polymer cable component at the first hardness. In some embodiments, the second hardness is greater than the first hardness. In some embodiments, the step of temporarily changing the hardness of the polymer cable component comprises cooling the polymer cable component. In some embodiments, the step of cooling the polymer cable component comprises exposing the polymer cable component to a chilled fluid. In some embodiments, the step of cooling the polymer cable component comprises exposing the polymer cable component to a chilled solid surface. In some embodiments, the chilled solid surface rotates. In some embodiments, the step of cooling the polymer cable component comprises exposing the polymer cable component to a cryogenic liquid. In some embodiments, the polymer cable component is exposed to a cryogenic liquid for about ten seconds or less. In some embodiments, the polymer cable component is exposed to a cryogenic liquid for between six seconds and ten seconds. In some embodiments, the step of cooling the polymer cable component comprises exposing the polymer cable component to a chilled gas. In some embodiments, the chilled gas is between 15° C. and −10° C. In some embodiments, the polymer cable component comprises an outer surface, an interior bulk, and an interior surface, and wherein the step of cooling the polymer cable component comprises cooling the outer surface of the polymer cable component. In some embodiments, the polymer cable component is a polymer insulation surrounding a circumference of a conductor. In some embodiments, the polymer cable component is a fluoropolymer insulation surrounding a circumference of a conductor. In some embodiments, the polymer cable component is no longer cooled for less than or equal to ten seconds before being subjected to the compressive force. Some embodiments, further comprise the step of ceasing to cool the polymer cable component less than or equal to five seconds before the polymer cable component is subjected to the compressive force.

Additional disclosed embodiments include a method of manufacturing a communication cable comprising: providing a polymer cable component with a first cross-section radius and a second cross-section radius, wherein the first cross-section radius is the maximum distance from the center of the polymer cable component to the edge of the polymer cable component along a cross-section and second cross-section radius is the minimum distance from the center of the polymer cable component to the edge of the polymer cable component along a cross-section, and wherein the first cross-section radius is about equal to the second cross-section radius+/−3%, and wherein the polymer cable component has a first hardness, wherein the first hardness is the hardness of the polymer cable component under ambient conditions; temporarily changing the hardness of the polymer cable component to a second hardness, wherein the second hardness is greater than the first hardness; subjecting the polymer cable component to a compressive force, wherein after the compressive force, the first cross-section radius is about equal to the second cross-section radius+/−10%. In some embodiments, the compressive force produces less deformation of the polymer cable component at the second hardness relative to the polymer cable component at the first hardness. In some embodiments, the step of temporarily changing the hardness of the polymer cable component comprises cooling the polymer cable component. In some embodiments, the step of cooling the polymer cable component comprises exposing the polymer cable component to a chilled fluid. In some embodiments, the step of cooling the polymer cable component comprises exposing the polymer cable component to a cryogenic liquid. In some embodiments, the step of cooling the polymer cable component comprises exposing the polymer cable component to a chilled gas. In some embodiments, the polymer cable component is no longer cooled for less than or equal to ten seconds before being subjected to the compressive force. Some embodiments further comprise the step of ceasing to cool the polymer cable component less than or equal to five seconds before the polymer cable component is subjected to the compressive force. In some embodiments, the polymer cable component is a polymer insulation surrounding a circumference of a conductor. In some embodiments, the polymer cable component is a fluoropolymer insulation surrounding a circumference of a conductor. Additional disclosed embodiments include a method of manufacturing a communication cable comprising: providing a polymer cable component with a first diameter and a second diameter, wherein the first diameter and second diameter are perpendicular to each other, and wherein the first diameter is about equal to the second diameter+/−3%, and wherein the polymer cable component has a first hardness, wherein the first hardness is the hardness of the polymer cable component under ambient conditions; temporarily changing the hardness of the polymer cable component to a second hardness, wherein the second hardness is greater than the first hardness; subjecting the polymer cable component to a compressive force, wherein after the compressive force, the first diameter is about equal to the second diameter+/−10%; and allowing the polymer cable component to return to the first hardness. In some embodiments, the polymer cable component is subjected to the compressive force while the polymer cable component is at the second hardness. In some embodiments, the compressive force produces less deformation of the polymer cable component at the second hardness relative to the polymer cable component at the first hardness. In some embodiments, the second hardness is greater than the first hardness. In some embodiments, the step of temporarily changing the hardness of the polymer cable component comprises cooling the polymer cable component. In some embodiments, the step of cooling the polymer cable component comprises exposing the polymer cable component to a chilled solid surface. In some embodiments, the chilled solid surface rotates. In some embodiments, the step of cooling the polymer cable component comprises exposing the polymer cable component to a cryogenic liquid. In some embodiments, the step of cooling the polymer cable component comprises exposing the polymer cable component to a chilled gas. In some embodiments, the chilled gas is between 15° C. and −10° C.

Additional disclosed embodiments include a method of manufacturing a communication cable comprising: providing a first, second, third, and fourth pair of polymer insulated conductors, wherein each pair of polymer insulated conductors comprises two polymer insulated conductors, and wherein each polymer insulated conductor has a first hardness, wherein the first hardness is the hardness of the polymer insulated conductor at ambient conditions; temporarily changing the hardness of the polymer insulated conductors in the first, second, and third pairs of polymer insulated conductors to a second hardness, wherein the second hardness is different than the first hardness; twisting the polymer insulated conductors of the first pair together to form a first twisted pair, the first twisted pair having a first propagation delay over 100 meters; twisting the polymer insulated conductors of the second pair together to form a second twisted pair, the second twisted pair having a second propagation delay over 100 meters, twisting the polymer insulated conductors of the third pair together to form a third twisted pair, the third twisted pair having a third propagation delay over 100 meters, twisting the polymer insulated conductors of the fourth pair together to form a fourth twisted pair, the fourth twisted pair having a fourth propagation delay over 100 meters, wherein the difference in propagation delay over 100 meters for the first, second, third, and fourth propagation delays over 100 meters are within 50 nanoseconds of each other. In some embodiments, the first, second, third, and fourth propagation delay over 100 meters have less than about 25 nanoseconds of delay skew. In some embodiments, the step of temporarily changing the hardness of the polymer insulated conductors comprises cooling the polymer insulated conductors. In some embodiments, the step of temporarily changing the hardness of the polymer insulated conductors in the first, second, third, and fourth pair of polymer insulated conductors comprises cooling the polymer insulated conductors in the first, second, third, and fourth pairs for a first, second, third, and fourth time period respectively. In some embodiments, the first time period is longer than the second time period, and the second time period is longer than the third time period. In some embodiments, the first time period is between about 8-10 seconds, the second time period is between about 6-8 seconds, and the third time period is between about 4-6 seconds. In some embodiments, the first, second, third, and fourth twisted pairs have a first, second, third, and fourth lay length respectively, the first lay length being shorter than the second lay length and the second lay length being shorter than the third lay length. In some embodiments, the first, second, third, and fourth twisted pairs have a first, second, third, and fourth lay length respectively, the first lay length being shorter than the second lay length and the second lay length being shorter than the third lay length, and wherein the first time period is longer than the second time period, and the second time period is longer than the third time period. In some embodiments, the polymer insulated conductors of the first, second, third, and fourth twisted pairs have a first, second, third, and fourth crush ratio respectively. In some embodiments, the first crush ratio is less than the second crush ratio, and wherein the second crush ratio is less than the third crush ratio. In some embodiments, the first, second, third, and fourth twisted pairs have a first, second, third, and fourth signal velocity respectively. In some embodiments, the first signal velocity is greater than the second signal velocity, and wherein the second signal velocity is greater than the third signal velocity. In some embodiments, the first, second, third, and fourth pairs of polymer insulated conductors each have a different second hardness. In some embodiments, the second hardness of the first pair of polymer insulated conductors is greater than the second hardness of the second pair of polymer insulated conductors, and wherein the second hardness of the second pair of polymer insulated conductors is greater than the second hardness of the third pair of polymer insulated conductors. Additional embodiments relate to a method of manufacturing a communication cable comprising: providing a first pair of polymer insulated conductors and a second pair of polymer insulated conductors, wherein each pair of polymer insulated conductors comprises two polymer insulated conductors, and wherein each polymer insulated conductor has a first hardness, wherein the first hardness is the hardness of the polymer insulated conductor at ambient conditions; temporarily changing the hardness of the polymer insulated conductors in the first pair of polymer insulated conductors to a second hardness, wherein the second hardness is different than the first hardness; twisting the polymer insulated conductors of the first pair together to form a first twisted pair, the first twisted pair having a first propagation delay over 100 meters; twisting the polymer insulated conductors of the second pair together to form a second twisted pair, the second twisted pair having a second propagation delay over 100 meters, wherein the first propagation delay over 100 meters and second propagation delay over 100 meters are within 25 nanoseconds of each other. In some embodiments, the step of temporarily changing the hardness of the polymer insulated conductors in the first and second pair of polymer insulated conductors comprises cooling the polymer insulated conductors in the first and second pairs.

Some disclosed embodiments relate to a system for manufacturing wire and cable products comprising: a pay-out configured to pay out a polymer cable component; a cooling vessel configured to receive the polymer cable component, wherein the cooling vessel contains a chilled fluid; and a take-up configured to take up the polymer cable component. In some embodiments, the cooling vessel contains liquid nitrogen. Some embodiments further comprise a secondary structure configured to receive the polymer cable component, wherein the interior of the secondary structure is in fluid communication with the interior of the cooling chamber. In some embodiments, the cooling vessel contains liquid nitrogen and wherein nitrogen vapor travels from the interior of the cooling vessel to the interior of the secondary structure. In some embodiments, the secondary structure is a hollow tube. In some embodiments, the atmosphere within the cooling vessel is at less than ambient temperature. In some embodiments, the cooling vessel is thermally insulated. Some embodiments, further comprise refrigeration equipment and wherein the refrigeration equipment is configured to provide chilled air to the cooling vessel. In some embodiments, the polymer cable component is a polymer insulated conductors, and further comprising a twinner configured to receive a first polymer insulated conductor and a second polymer insulated conductor and form a twisted pair. In some embodiments, the atmosphere within the twinner is at less than ambient temperature. Some embodiments, further comprise a secondary structure configured to receive the polymer cable component, wherein the interior of the secondary structure is in fluid communication with the interior of the cooling chamber, and wherein the secondary structure is in fluid communication with the interior of the twinner. Additional embodiments relate to a system for manufacturing wire and cable products comprising a pay-out configured to pay out a polymer cable component; a cooling surface configured to contact the polymer cable component, and a take-up configured to take up the polymer cable component. In some embodiments, the cooling surface is a chilled roller. Some embodiments, further comprise a plurality of chilled rollers.

Still more disclosed embodiments relate to a method of manufacturing a low fuel-load wire and cable product, the method comprising: establishing a desired electrical property of a wire and cable product, wherein the wire and cable product includes a polymer cable component wherein the polymer cable component has a first fuel load and a first hardness, and wherein the polymer cable component has a flame travel distance of equal to or less than about five feet, a peak optical density of smoke equal to or less than about 0.5 and an average optical density equal to or less than about 0.15 when measured according to the Steiner Tunnel test method of ASTM E84, and wherein first hardness is the hardness of the polymer cable component under ambient conditions; temporarily changing the hardness of the polymer cable component to a second hardness, wherein the second hardness is greater than the first hardness; causing a first amount of deformation to the polymer cable component by subjecting the polymer cable component to a compressive force while the polymer cable component is at the second hardness; and forming a wire and cable product using the polymer cable component, wherein the wire and cable product meets the established desired electrical property when the polymer cable component is deformed a first amount of deformation but would not meet the desired electrical property if the polymer cable component were deformed by a second amount of deformation, wherein the second amount of deformation is the amount the polymer cable component would have deformed when subject to the compressive force if the polymer cable component were at the first hardness. In some embodiments, the polymer cable component is a polymer insulation layer around a conductive wire. In some embodiments, the wire and cable product is a twisted pair. In some embodiments, the wire and cable product produces a flame travel distance of less than four feet when measured by the Steiner Tunnel test method of ASTM E84. In some embodiments, the wire and cable product produces a peak optical density of smoke of less than 0.4 when measured by the Steiner Tunnel test method of ASTM E84. In some embodiments, the wire and cable product produces an average optical density of less than 0.15 when measured by the Steiner Tunnel test method of ASTM E84. In some embodiments, the desired electrical property of a wire and cable product is a capacitance value of less than about 20 pf/ft. In some embodiments, the desired electrical property of a wire and cable product is impedance value of between about 75 ohms and 125 ohms. In some embodiments, the desired electrical property of a wire and cable product is a velocity of propagation of between about 62% and 80%.

Additional disclosed embodiments relate to a \ method of forming a twisted pair comprising: operating a cable twinning apparatus at a first speed to produce a first twisted pair with a first crush ratio; providing a first polymer insulated conductor comprising a first conductor electrically insulated by a first polymer insulation layer; providing a second polymer insulated conductor comprising second conductor electrically insulated by a second polymer insulation layer; exposing at least the first polymer insulated conductor to a cryogenic fluid; and operating the cable twinning apparatus at a second speed to produce a second twisted pair with a second crush ratio, wherein the second twisted pair comprises the first and second polymer insulated conductor and wherein the second speed is faster than the first speed. In some embodiments, the second crush ratio is within 10% of the first crush ratio. In some embodiments, the second crush ratio is less than the first crush ratio. In some embodiments, the second speed is at least 15% faster than the first speed. In some embodiments, the second speed is at least 25% faster than the first speed. In some embodiments, the first speed is the rated speed of the cable twinning apparatus for a wire and cable product and wherein the second speed is at least 10% faster than the first speed. In some embodiments, the second speed is at least 10% faster than the first speed and wherein the second crush ratio is less than the first crush ratio. In some embodiments, the first speed is at least 60 feet per minute and wherein the second speed is at least 70 feet per minute. In some embodiments, the first speed is at least 160 feet per minute and wherein the second speed is at least 180 feet per minute. In some embodiments, the first speed is at least 220 feet per minute and wherein the second speed is at least 275 feet per minute. In some embodiments, the cryogenic fluid is liquid nitrogen.

Those skilled in the art will recognize improvements and modification to the preferred embodiments of the present disclosure. All such improvements and modifications are considered within the scope of the concepts disclosed herein and the claims that follow. It is to be understood that any given elements of the disclosed embodiments of the invention may be embodied in a single structure, a single step, a single substance, or the like. Similarly, a given element of the disclosed embodiment may be embodied in multiple structures, steps, substances, or the like.

The foregoing description illustrates and describes the processes, machines, manufactures, compositions of matter, and other teachings of the present disclosure. Additionally, the disclosure shows and describes only certain embodiments of the processes, machines, manufactures, compositions of matter, and other teachings disclosed, but, as mentioned above, it is to be understood that the teachings of the present disclosure are capable of use in various other combinations, modifications, and environments and are capable of changes or modifications within the scope of the teachings as expressed herein, commensurate with the skill and/or knowledge of a person having ordinary skill in the relevant art. The embodiments described herein above are further intended to explain certain best modes known of practicing the processes, machines, manufactures, compositions of matter, and other teachings of the present disclosure and to enable others skilled in the art to utilize the teachings of the present disclosure in such, or other, embodiments and with the various modifications required by the particular applications or uses. Accordingly, the processes, machines, manufactures, compositions of matter, and other teachings of the present disclosure are not intended to limit the exact embodiments and examples disclosed herein. Any section headings herein are provided only for consistency with the suggestions of 37 C.F.R. § 1.77 or otherwise to provide organizational queues. These headings shall not limit or characterize the invention(s) set forth herein.

The following is claimed:

1. A method of reducing the impact of a compressive force on a polymer cable component, the method comprising:

providing a polymer cable component with a first hardness, wherein the first hardness is the hardness of the polymer cable component under ambient conditions;

temporarily changing the hardness of the polymer cable component to a second hardness, wherein the second hardness is greater than the first hardness;

subjecting the polymer cable component to a compressive force while the polymer cable component is at the second hardness; and allowing the polymer cable component to return to the first hardness after subjecting the polymer cable component to the compressive force, wherein the step of temporarily changing the hardness of the polymer cable component comprises cooling the polymer cable component, and the step of cooling the polymer cable component comprises exposing the polymer cable component to a cryogenic liquid for between six seconds and ten seconds.

2. The method of claim 1, wherein the polymer cable component is a fluoropolymer insulation surrounding a circumference of a conductor.

3. The method of claim 1, wherein the cryogenic liquid is liquid nitrogen.

4. The method of claim 1, wherein the step of subjecting the polymer cable component to a compressive force comprises forming a twisted pair.

5. The method of claim 1, wherein the step of subjecting the polymer cable component to a compressive force comprises twinning the polymer cable component with another polymer cable component.

6. The method of claim 1, wherein the step of subjecting the polymer cable component to a compressive force comprises forming a cable comprising the polymer cable component.

* * * * *